US012282274B2

(12) United States Patent
Sueoka

(10) Patent No.: US 12,282,274 B2
(45) Date of Patent: Apr. 22, 2025

(54) IMAGE FORMING APPARATUS CAPABLE OF FORMING TEST IMAGES ON DIFFERENT SIDES OF RECORDING MATERIALS

(71) Applicant: CANON KABUSHIKI KAISHA, Tokyo (JP)

(72) Inventor: Takenori Sueoka, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/102,446

(22) Filed: Jan. 27, 2023

(65) Prior Publication Data

US 2023/0244161 A1 Aug. 3, 2023

(30) Foreign Application Priority Data

Jan. 31, 2022 (JP) ................................ 2022-013805

(51) Int. Cl.

*G03G 15/16* (2006.01)
*G03G 15/00* (2006.01)
*G03G 15/20* (2006.01)
*G03G 15/23* (2006.01)

(52) U.S. Cl.

CPC ..... *G03G 15/1675* (2013.01); *G03G 15/2064* (2013.01); *G03G 15/234* (2013.01); *G03G 15/5058* (2013.01); *G03G 2215/2083* (2013.01)

(58) Field of Classification Search

None

See application file for complete search history.

(56) References Cited

U.S. PATENT DOCUMENTS

| | | | | |
|---|---|---|---|---|
| 7,912,392 | B2 * | 3/2011 | Yoshinaga | G03G 15/6579 399/407 |
| 8,681,371 | B2 * | 3/2014 | Hirose | G06K 15/027 358/1.9 |
| 8,843,003 | B2 * | 9/2014 | Nakao | G03G 15/6561 399/15 |
| 9,501,015 | B2 * | 11/2016 | Kakishima | G03G 15/235 |
| 10,585,376 | B2 | 3/2020 | Muryama et al. | |
| 10,990,051 | B2 * | 4/2021 | Omata | G03G 15/5062 |
| 11,249,422 | B2 | 2/2022 | Omata | |
| 2022/0317608 | A1 | 10/2022 | Minato et al. | |
| 2022/0317610 | A1 | 10/2022 | Minato et al. | |

FOREIGN PATENT DOCUMENTS

| | | |
|---|---|---|
| JP | 2013-037185 A | 2/2013 |
| JP | 2019-066804 A | 4/2019 |
| JP | 2021-162824 A | 10/2021 |

* cited by examiner

*Primary Examiner* — Arlene Heredia

(74) *Attorney, Agent, or Firm* — Venable LLP

(57) ABSTRACT

An image forming apparatus includes an image bearing member, a transfer device, a voltage applying portion, a fixing device, and a controller. During execution of an operation in an output mode, the controller is capable of selectively executing: an operation in which test images formed on a first side of a first recording material are fixed and then the first recording material is outputted without forming the test images on a second side of the first recording material and then in which a second recording material is passed through the fixing device without forming the test images on a first side of the second recording material and then the test images are transferred onto a second side of the second recording material.

11 Claims, 25 Drawing Sheets

| FIRST SIDE | | WATER CONTENT (g/Kg) | | | | |
|---|---|---|---|---|---|---|
| | | ≤ 0.9 | ··· | 8.9 | ··· | 21.5 ≤ |
| BASIS WEIGHT (g/m²) | · | · | | · | | · |
| | 76～90 | 1000V | ··· | 500V | ··· | 200V |
| | 91～105 | 1150V | ··· | 600V | ··· | 250V |
| | 106～128 | 1300V | ··· | 700V | ··· | 300V |
| | · | · | | · | | · |

| SECOND SIDE | | WATER CONTENT (g/Kg) | | | | |
|---|---|---|---|---|---|---|
| | | ≤ 0.9 | ··· | 8.9 | ··· | 21.5 ≤ |
| BASIS WEIGHT (g/m²) | · | · | | · | | · |
| | 76～90 | 1300V | ··· | 700V | ··· | 300V |
| | 91～105 | 1450V | ··· | 800V | ··· | 350V |
| | 106～128 | 1600V | ··· | 900V | ··· | 400V |
| | · | · | | · | | · |

Fig. 5

ΔN=1_1 SIDE

| No→ | -20 | -19 | -18 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|---|---|---|---|---|---|---|---|---|---|---|---|---|---|---|---|---|---|---|---|
| ADJUST PITCH NO. n 1 | -20 | -20 | -20 | -20 | -20 | -19 | -18 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 11 | 11 | 11 | 11 | 11 |
| 2 | -19 | -19 | -19 | -19 | -19 | -18 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 12 | 12 | 12 | 12 | 12 |
| 3 | -18 | -18 | -18 | -18 | -18 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 13 | 13 | 13 | 13 | 13 |
| 4 | -17 | -17 | -17 | -17 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 14 | 14 | 14 | 14 | 14 |
| 5 | -16 | -16 | -16 | -16 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 15 | 15 | 15 | 15 | 15 |
| 6 | -15 | -15 | -15 | -15 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 16 | 16 | 16 | 16 | 16 |
| 7 | -14 | -14 | -14 | -14 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 17 | 17 | 17 | 17 | 17 |
| 8 | -13 | -13 | -13 | -13 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 18 | 18 | 18 | 18 | 18 |
| 9 | -12 | -12 | -12 | -12 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 19 | 19 | 19 | 19 | 19 |
| 10 | -11 | -11 | -11 | -11 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 20 | 20 | 20 | 20 | 20 |
| T→ | -16 | -16 | -16 | -16 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 15 | 15 | 15 | 15 | 15 |

Fig. 14A-1

ΔN=1_2 SIDE

| | No→ | -20 | -19 | -18 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| | T→ | -16 | -16 | -16 | -16 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 15 | 15 | 15 | 15 | 15 |
| ADJUST PITCH NO. n | 1 | -20 | -20 | -20 | -20 | -20 | -19 | -18 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 11 | 11 | 11 | 11 | 11 |
| | 2 | -19 | -19 | -19 | -19 | -19 | -18 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 12 | 12 | 12 | 12 | 12 |
| | 3 | -18 | -18 | -18 | -18 | -18 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 13 | 13 | 13 | 13 | 13 |
| | 4 | -17 | -17 | -17 | -17 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 14 | 14 | 14 | 14 | 14 |
| | 5 | -16 | -16 | -16 | -16 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 15 | 15 | 15 | 15 | 15 |
| | 6 | -15 | -15 | -15 | -15 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 16 | 16 | 16 | 16 | 16 |
| | 7 | -14 | -14 | -14 | -14 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 17 | 17 | 17 | 17 | 17 |
| | 8 | -13 | -13 | -13 | -13 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 18 | 18 | 18 | 18 | 18 |
| | 9 | -12 | -12 | -12 | -12 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 19 | 19 | 19 | 19 | 19 |
| | 10 | -11 | -11 | -11 | -11 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 20 | 20 | 20 | 20 | 20 |

Fig. 14A-2

ΔN=2_1 SIDE

| ADJUST PITCH NO. n \ No→ | -20 | -19 | -18 | -17 | -16 | -15 | -14 | -13 | -12 | -11 | -10 | -9 | -8 | -7 | -6 | -5 | -4 | -3 | -2 | -1 | 0 |
|---|---|---|---|---|---|---|---|---|---|---|---|---|---|---|---|---|---|---|---|---|---|
| 1 | -20 | -19 | -20 | -19 | -20 | -19 | -20 | -19 | -20 | -19 | -18 | -17 | -16 | -15 | -14 | -13 | -12 | -11 | -10 | -9 | -8 |
| 2 | -18 | -17 | -18 | -17 | -18 | -17 | -18 | -17 | -18 | -17 | -16 | -15 | -14 | -13 | -12 | -11 | -10 | -9 | -8 | -7 | -6 |
| 3 | -16 | -15 | -16 | -15 | -16 | -15 | -16 | -15 | -16 | -15 | -14 | -13 | -12 | -11 | -10 | -9 | -8 | -7 | -6 | -5 | -4 |
| 4 | -14 | -13 | -14 | -13 | -14 | -13 | -14 | -13 | -14 | -13 | -12 | -11 | -10 | -9 | -8 | -7 | -6 | -5 | -4 | -3 | -2 |
| 5 | -12 | -11 | -12 | -11 | -12 | -11 | -12 | -11 | -12 | -11 | -10 | -9 | -8 | -7 | -6 | -5 | -4 | -3 | -2 | -1 | 0 |
| 6 | -10 | -9 | -10 | -9 | -10 | -9 | -10 | -9 | -10 | -9 | -8 | -7 | -6 | -5 | -4 | -3 | -2 | -1 | 0 | 1 | 2 |
| 7 | -8 | -7 | -8 | -7 | -8 | -7 | -8 | -7 | -8 | -7 | -6 | -5 | -4 | -3 | -2 | -1 | 0 | 1 | 2 | 3 | 4 |
| 8 | -6 | -5 | -6 | -5 | -6 | -5 | -6 | -5 | -6 | -5 | -4 | -3 | -2 | -1 | 0 | 1 | 2 | 3 | 4 | 5 | 6 |
| 9 | -4 | -3 | -4 | -3 | -4 | -3 | -4 | -3 | -4 | -3 | -2 | -1 | 0 | 1 | 2 | 3 | 4 | 5 | 6 | 7 | 8 |
| 10 | -2 | -1 | -2 | -1 | -2 | -1 | -2 | -1 | -2 | -1 | 0 | 1 | 2 | 3 | 4 | 5 | 6 | 7 | 8 | 9 | 10 |
| T→ | -12 | -11 | -12 | -11 | -12 | -11 | -12 | -11 | -12 | -11 | -10 | -9 | -8 | -7 | -6 | -5 | -4 | -3 | -2 | -1 | 0 |

| ADJUST PITCH NO. n \ No→ | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 1 | -7 | -6 | -5 | -4 | -3 | -2 | -1 | 0 | 1 | 2 | 1 | 2 | 1 | 2 | 1 | 2 | 1 | 2 | 1 | 2 |
| 2 | -5 | -4 | -3 | -2 | -1 | 0 | 1 | 2 | 3 | 4 | 3 | 4 | 3 | 4 | 3 | 4 | 3 | 4 | 3 | 4 |
| 3 | -3 | -2 | -1 | 0 | 1 | 2 | 3 | 4 | 5 | 6 | 5 | 6 | 5 | 6 | 5 | 6 | 5 | 6 | 5 | 6 |
| 4 | -1 | 0 | 1 | 2 | 3 | 4 | 5 | 6 | 7 | 8 | 7 | 8 | 7 | 8 | 7 | 8 | 7 | 8 | 7 | 8 |
| 5 | 1 | 2 | 3 | 4 | 5 | 6 | 7 | 8 | 9 | 10 | 9 | 10 | 9 | 10 | 9 | 10 | 9 | 10 | 9 | 10 |
| 6 | 3 | 4 | 5 | 6 | 7 | 8 | 9 | 10 | 11 | 12 | 11 | 12 | 11 | 12 | 11 | 12 | 11 | 12 | 11 | 12 |
| 7 | 5 | 6 | 7 | 8 | 9 | 10 | 11 | 12 | 13 | 14 | 13 | 14 | 13 | 14 | 13 | 14 | 13 | 14 | 13 | 14 |
| 8 | 7 | 8 | 9 | 10 | 11 | 12 | 13 | 14 | 15 | 16 | 15 | 16 | 15 | 16 | 15 | 16 | 15 | 16 | 15 | 16 |
| 9 | 9 | 10 | 11 | 12 | 13 | 14 | 15 | 16 | 17 | 18 | 17 | 18 | 17 | 18 | 17 | 18 | 17 | 18 | 17 | 18 |
| 10 | 11 | 12 | 13 | 14 | 15 | 16 | 17 | 18 | 19 | 20 | 19 | 20 | 19 | 20 | 19 | 20 | 19 | 20 | 19 | 20 |
| T→ | 1 | 2 | 3 | 4 | 5 | 6 | 7 | 8 | 9 | 10 | 9 | 10 | 9 | 10 | 9 | 10 | 9 | 10 | 9 | 10 |

Fig. 14B-1

ΔN=2_2 SIDE

| No→ | | -20 | -19 | -18 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| T→ | | -12 | -11 | -12 | -11 | -12 | -11 | -12 | -11 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 9 | 10 | 9 | 10 | 9 | 10 | 9 | 10 | 9 | 10 |
| ADJST PTCH NO. n | 1 | -20 | -19 | -20 | -19 | -20 | -19 | -20 | -19 | -20 | -19 | -18 | -17 | -16 | -15 | -14 | -13 | -12 | -11 | -10 | -9 | -8 | -7 | -6 | -5 | -4 | -3 | -2 | -1 | 0 | 1 | 2 | 1 | 2 | 1 | 2 | 1 | 2 | 1 | 2 | 1 | 2 |
| | 2 | -18 | -17 | -18 | -17 | -18 | -17 | -18 | -17 | -18 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 3 | 4 | 3 | 4 | 3 | 4 | 3 | 4 | 3 | 4 |
| | 3 | -16 | -15 | -16 | -15 | -16 | -15 | -16 | -15 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 5 | 6 | 5 | 6 | 5 | 6 | 5 | 6 | 5 | 6 |
| | 4 | -14 | -13 | -14 | -13 | -14 | -13 | -14 | -13 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 7 | 8 | 7 | 8 | 7 | 8 | 7 | 8 | 7 | 8 |
| | 5 | -12 | -11 | -12 | -11 | -12 | -11 | -12 | -11 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 9 | 10 | 9 | 10 | 9 | 10 | 9 | 10 | 9 | 10 |
| | 6 | -10 | -9 | -10 | -9 | -10 | -9 | -10 | -9 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 11 | 12 | 11 | 12 | 11 | 12 | 11 | 12 | 11 | 12 |
| | 7 | -8 | -7 | -8 | -7 | -8 | -7 | -8 | -7 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 13 | 14 | 13 | 14 | 13 | 14 | 13 | 14 | 13 | 14 |
| | 8 | -6 | -5 | -6 | -5 | -6 | -5 | -6 | -5 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 15 | 16 | 15 | 16 | 15 | 16 | 15 | 16 | 15 | 16 |
| | 9 | -4 | -3 | -4 | -3 | -4 | -3 | -4 | -3 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 17 | 18 | 17 | 18 | 17 | 18 | 17 | 18 | 17 | 18 |
| | 10 | -2 | -1 | -2 | -1 | -2 | -1 | -2 | -1 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 19 | 20 | 19 | 20 | 19 | 20 | 19 | 20 | 19 | 20 |

Fig. 14B-2

ΔN=3_1 SIDE

| | No→ | -20 | -19 | -18 | -17 | -16 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| ADJST PTCH NO. n | 1 | -20 | -19 | -18 | -20 | -19 | -18 | -20 | -19 | -18 | -20 | -19 | -18 | -20 | -19 | -18 | -17 | -16 | -15 | -14 | -13 | -12 | -11 | -10 | -9 | -8 | -7 | -9 | -8 | -7 | -9 | -8 | -7 | -9 | -8 | -7 | -9 | -8 | -7 | -9 | -8 | -7 |
| | 2 | -17 | -16 | -15 | -17 | -16 | -15 | -17 | -16 | -15 | -17 | -16 | -15 | -17 | -16 | -15 | -14 | -13 | -12 | -11 | -10 | -9 | -8 | -7 | -6 | -5 | -4 | -6 | -5 | -4 | -6 | -5 | -4 | -6 | -5 | -4 | -6 | -5 | -4 | -6 | -5 | -4 |
| | 3 | -14 | -13 | -12 | -14 | -13 | -12 | -14 | -13 | -12 | -14 | -13 | -12 | -14 | -13 | -12 | -11 | -10 | -9 | -8 | -7 | -6 | -5 | -4 | -3 | -2 | -1 | -3 | -2 | -1 | -3 | -2 | -1 | -3 | -2 | -1 | -3 | -2 | -1 | -3 | -2 | -1 |
| | 4 | -11 | -10 | -9 | -11 | -10 | -9 | -11 | -10 | -9 | -11 | -10 | -9 | -11 | -10 | -9 | -8 | -7 | -6 | -5 | -4 | -3 | -2 | -1 | 0 | 1 | 2 | 0 | 1 | 2 | 0 | 1 | 2 | 0 | 1 | 2 | 0 | 1 | 2 | 0 | 1 | 2 |
| | 5 | -8 | -7 | -6 | -8 | -7 | -6 | -8 | -7 | -6 | -8 | -7 | -6 | -8 | -7 | -6 | -5 | -4 | -3 | -2 | -1 | 0 | 1 | 2 | 3 | 4 | 5 | 3 | 4 | 5 | 3 | 4 | 5 | 3 | 4 | 5 | 3 | 4 | 5 | 3 | 4 | 5 |
| | 6 | -5 | -4 | -3 | -5 | -4 | -3 | -5 | -4 | -3 | -5 | -4 | -3 | -5 | -4 | -3 | -2 | -1 | 0 | 1 | 2 | 3 | 4 | 5 | 6 | 7 | 8 | 6 | 7 | 8 | 6 | 7 | 8 | 6 | 7 | 8 | 6 | 7 | 8 | 6 | 7 | 8 |
| | 7 | -2 | -1 | 0 | -2 | -1 | 0 | -2 | -1 | 0 | -2 | -1 | 0 | -2 | -1 | 0 | 1 | 2 | 3 | 4 | 5 | 6 | 7 | 8 | 9 | 10 | 11 | 9 | 10 | 11 | 9 | 10 | 11 | 9 | 10 | 11 | 9 | 10 | 11 | 9 | 10 | 11 |
| | 8 | 1 | 2 | 3 | 1 | 2 | 3 | 1 | 2 | 3 | 1 | 2 | 3 | 1 | 2 | 3 | 4 | 5 | 6 | 7 | 8 | 9 | 10 | 11 | 12 | 13 | 14 | 12 | 13 | 14 | 12 | 13 | 14 | 12 | 13 | 14 | 12 | 13 | 14 | 12 | 13 | 14 |
| | 9 | 4 | 5 | 6 | 4 | 5 | 6 | 4 | 5 | 6 | 4 | 5 | 6 | 4 | 5 | 6 | 7 | 8 | 9 | 10 | 11 | 12 | 13 | 14 | 15 | 16 | 17 | 15 | 16 | 17 | 15 | 16 | 17 | 15 | 16 | 17 | 15 | 16 | 17 | 15 | 16 | 17 |
| | 10 | 7 | 8 | 9 | 7 | 8 | 9 | 7 | 8 | 9 | 7 | 8 | 9 | 7 | 8 | 9 | 10 | 11 | 12 | 13 | 14 | 15 | 16 | 17 | 18 | 19 | 20 | 18 | 19 | 20 | 18 | 19 | 20 | 18 | 19 | 20 | 18 | 19 | 20 | 18 | 19 | 20 |
| | T→ | -8 | -7 | -6 | -8 | -7 | -6 | -8 | -7 | -6 | -8 | -7 | -6 | -8 | -7 | -6 | -5 | -4 | -3 | -2 | -1 | 0 | 1 | 2 | 3 | 4 | 5 | 3 | 4 | 5 | 3 | 4 | 5 | 3 | 4 | 5 | 3 | 4 | 5 | 3 | 4 | 5 |

Fig. 14C-1

ΔN=3_2 SIDE

| | No→ | -20 | -19 | -18 | -17 | -16 | -15 | -14 | -13 | -12 | -11 | -10 | -9 | -8 | -7 | -6 | -5 | -4 | -3 | -2 | -1 |
|---|---|---|---|---|---|---|---|---|---|---|---|---|---|---|---|---|---|---|---|---|---|
| | T→ | -8 | -7 | -6 | -8 | -7 | -6 | -8 | -7 | -6 | -8 | -7 | -6 | -8 | -7 | -6 | -5 | -4 | -3 | -2 | -1 |
| ADJST PITCH NO. n | 1 | -20 | -19 | -18 | -20 | -19 | -18 | -20 | -19 | -18 | -20 | -19 | -18 | -20 | -19 | -18 | -17 | -16 | -15 | -14 | -13 |
| | 2 | -17 | -16 | -15 | -17 | -16 | -15 | -17 | -16 | -15 | -17 | -16 | -15 | -17 | -16 | -15 | -14 | -13 | -12 | -11 | -10 |
| | 3 | -14 | -13 | -12 | -14 | -13 | -12 | -14 | -13 | -12 | -14 | -13 | -12 | -14 | -13 | -12 | -11 | -10 | -9 | -8 | -7 |
| | 4 | -11 | -10 | -9 | -11 | -10 | -9 | -11 | -10 | -9 | -11 | -10 | -9 | -11 | -10 | -9 | -8 | -7 | -6 | -5 | -4 |
| | 5 | -8 | -7 | -6 | -8 | -7 | -6 | -8 | -7 | -6 | -8 | -7 | -6 | -8 | -7 | -6 | -5 | -4 | -3 | -2 | -1 |
| | 6 | -5 | -4 | -3 | -5 | -4 | -3 | -5 | -4 | -3 | -5 | -4 | -3 | -5 | -4 | -3 | -2 | -1 | 0 | 1 | 2 |
| | 7 | -2 | -1 | 0 | -2 | -1 | 0 | -2 | -1 | 0 | -2 | -1 | 0 | -2 | -1 | 0 | 1 | 2 | 3 | 4 | 5 |
| | 8 | 1 | 2 | 3 | 1 | 2 | 3 | 1 | 2 | 3 | 1 | 2 | 3 | 1 | 2 | 3 | 4 | 5 | 6 | 7 | 8 |
| | 9 | 4 | 5 | 6 | 4 | 5 | 6 | 4 | 5 | 6 | 4 | 5 | 6 | 4 | 5 | 6 | 7 | 8 | 9 | 10 | 11 |
| | 10 | 7 | 8 | 9 | 7 | 8 | 9 | 7 | 8 | 9 | 7 | 8 | 9 | 7 | 8 | 9 | 10 | 11 | 12 | 13 | 14 |

| | No→ | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|---|
| | T→ | 0 | 1 | 2 | 3 | 4 | 5 | 3 | 4 | 5 | 3 | 4 | 5 | 3 | 4 | 5 | 3 | 4 | 5 | 3 | 4 | 5 |
| ADJST PITCH NO. n | 1 | -12 | -11 | -10 | -9 | -8 | -7 | -9 | -8 | -7 | -9 | -8 | -7 | -9 | -8 | -7 | -9 | -8 | -7 | -9 | -8 | -7 |
| | 2 | -9 | -8 | -7 | -6 | -5 | -4 | -6 | -5 | -4 | -6 | -5 | -4 | -6 | -5 | -4 | -6 | -5 | -4 | -6 | -5 | -4 |
| | 3 | -6 | -5 | -4 | -3 | -2 | -1 | -3 | -2 | -1 | -3 | -2 | -1 | -3 | -2 | -1 | -3 | -2 | -1 | -3 | -2 | -1 |
| | 4 | -3 | -2 | -1 | 0 | 1 | 2 | 0 | 1 | 2 | 0 | 1 | 2 | 0 | 1 | 2 | 0 | 1 | 2 | 0 | 1 | 2 |
| | 5 | 0 | 1 | 2 | 3 | 4 | 5 | 3 | 4 | 5 | 3 | 4 | 5 | 3 | 4 | 5 | 3 | 4 | 5 | 3 | 4 | 5 |
| | 6 | 3 | 4 | 5 | 6 | 7 | 8 | 6 | 7 | 8 | 6 | 7 | 8 | 6 | 7 | 8 | 6 | 7 | 8 | 6 | 7 | 8 |
| | 7 | 6 | 7 | 8 | 9 | 10 | 11 | 9 | 10 | 11 | 9 | 10 | 11 | 9 | 10 | 11 | 9 | 10 | 11 | 9 | 10 | 11 |
| | 8 | 9 | 10 | 11 | 12 | 13 | 14 | 12 | 13 | 14 | 12 | 13 | 14 | 12 | 13 | 14 | 12 | 13 | 14 | 12 | 13 | 14 |
| | 9 | 12 | 13 | 14 | 15 | 16 | 17 | 15 | 16 | 17 | 15 | 16 | 17 | 15 | 16 | 17 | 15 | 16 | 17 | 15 | 16 | 17 |
| | 10 | 15 | 16 | 17 | 18 | 19 | 20 | 18 | 19 | 20 | 18 | 19 | 20 | 18 | 19 | 20 | 18 | 19 | 20 | 18 | 19 | 20 |

Fig. 14C-2

IMAGE FORMING APPARATUS CAPABLE OF FORMING TEST IMAGES ON DIFFERENT SIDES OF RECORDING MATERIALS

FIELD OF THE INVENTION AND RELATED ART

The present invention relates to an image forming apparatus, such as a copying machine, a printer, a facsimile machine, of an electrophotographic type or an electrostatic recording type.

In an image forming apparatus of the electrophotographic type or the like, a toner image formed on an image bearing member such as a photosensitive member or an intermediary transfer member is transferred onto a recording material. The transfer of the toner image from an image bearing member to the recording material is performed by applying a transfer voltage to a transfer member such as a transfer roller which contacts the image bearing member to form a transfer portion in many instances. The transfer voltage can be determined based on a transfer portion part voltage corresponding to the electrical resistance of the transfer portion detected during a pre-rotation process before image formation, and a recording material part voltage depending on a kind of the recording material set in advance. By this, an appropriate transfer voltage can be set according to the environmental fluctuations, the transfer member usage history, the recording material kind, and the like.

However, there are various types and conditions of recording materials used in the image formation, and therefore, the preset recording material part voltage as a default may be higher or lower than the appropriate transfer voltage. Under the circumstances, an image forming apparatus operable in an adjustment mode in which a set voltage (value) of the transfer voltage is adjusted depending on the recording material actually used in the image formation is proposed.

In Japanese Laid-open Patent Application No. 2013-37185, an image forming apparatus capable of executing an operation in an adjustment mode in which a set voltage (value) of a secondary transfer voltage is proposed. In the operation in this adjustment mode, a chart formed by transferring a plurality of patches (test images) onto a single recording material while switching the secondary transfer voltage for each of the patches is outputted. Then, a density of each of the patches is detected, and depending on a detection result, an optimum secondary transfer voltage condition is selected.

However, in the case where adjustment of the transfer voltage during double-side printing in the operation in the adjustment mode as described above is performed, when a position of the patch on a first side of a recording material and a position of the patch on a second side overlap with each other on front and back sides of the recording material, detection of the patch density cannot be performed accurately by the influence of set-off in some instances. For example, the density of the patch on the first side of the recording material is erroneously detected as being thicker than original in some cases by the influence of the patch on the second side of the recording material.

Particularly, when the recording material used for outputting the chart is a small-size recording material, a margin when the patches are formed is small, and therefore, in the case where the adjustment of the transfer voltage during the double-side printing is performed, the patches are liable to overlap with each other on the front side and the back side of the recording material. For that reason, there is a possibility that the adjustment of the transfer voltage during the double-side printing depending on the detection result of the patch density is not appropriate.

SUMMARY OF THE INVENTION

A principal object of the present invention is to provide an image forming apparatus capable of appropriately performing adjustment of a transfer voltage during double-side printing even in the case where a recording material used for outputting a chart is a small-size recording material.

This object is accomplished by an image forming apparatus according to the present invention.

According to an aspect of the present invention, there is provided an image forming apparatus comprising: an image bearing member configured to bear a toner image; a transfer device configured to transfer the toner image from the image bearing member onto a recording material in a transfer portion; a voltage applying portion configured to apply a transfer voltage to the transfer device; a fixing device configured to fix the toner image, transferred on the recording material, on the recording material in a fixing portion; and a controller capable of executing an operation in a double-side mode in which toner images are formed on double sides of the recording material and capable of executing an operation in an output mode in which a chart formed by transferring, onto the recording material, a plurality of test images which are for adjusting the transfer voltage applied during the operation in the double-side mode and which are formed under application of different transfer voltages is outputted, wherein during execution of the operation in the output mode, the controller is capable of selectively executing: a first operation in which an image forming operation is controlled so that the test images formed on a first side of the recording material are fixed on the first side of the recording material by the fixing device and then the test images are transferred onto a second side of the recording material, and a second operation in which the test images formed on a first side of a first recording material are fixed by the fixing device and then the first recording material is outputted without forming the test images on a second side of the first recording material and then in which a second recording material is passed through the fixing device without forming the test images on a first side of the second recording material and then the test images are transferred onto a second side of the second recording material.

Further features of the present invention will become apparent from the following description of exemplary embodiments with reference to the attached drawings.

BRIEF DESCRIPTION OF THE DRAWINGS

FIG. 5 includes tables each showing table data of a recording material part voltage.

Figure 13:
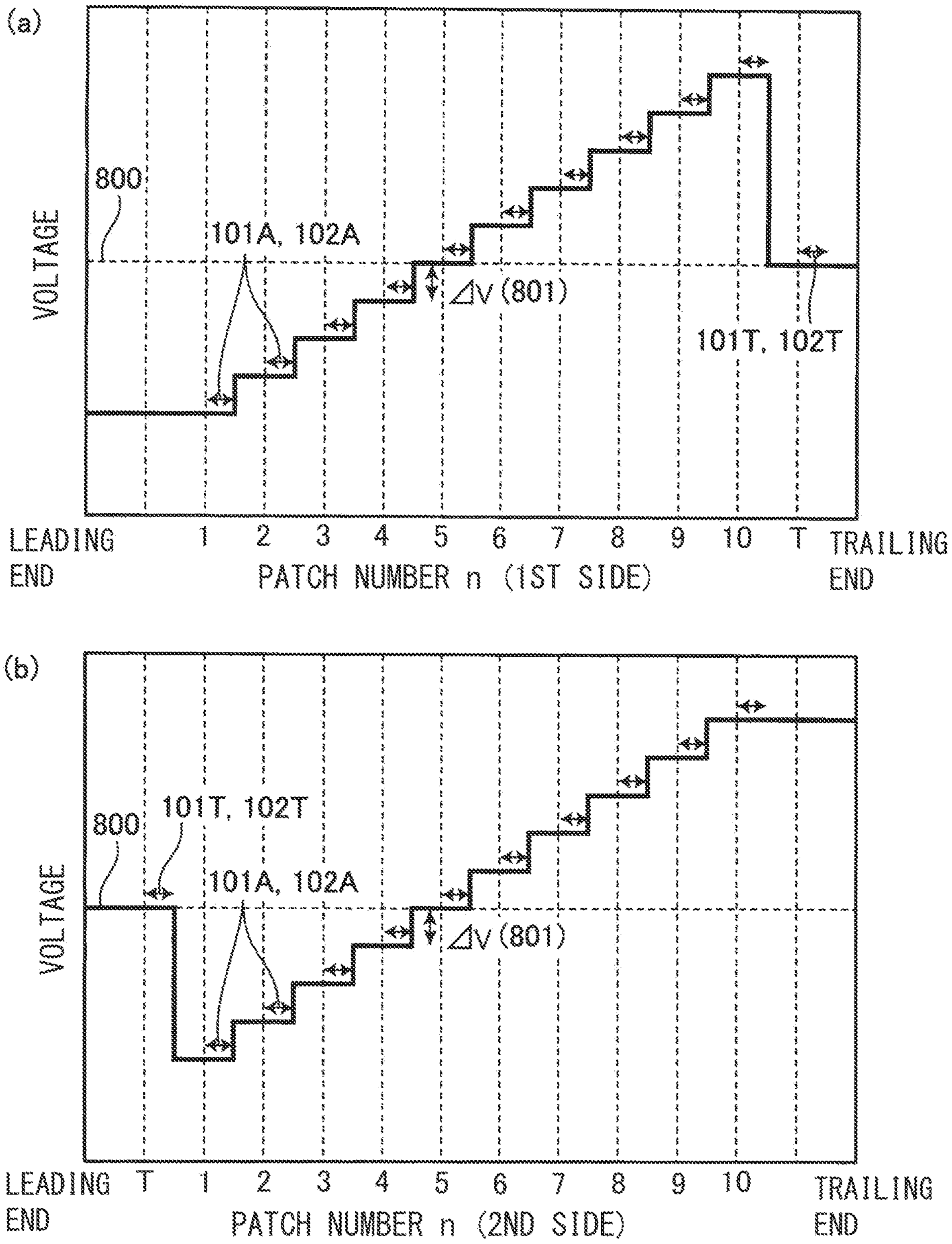

Parts (a) and (b) of FIG. 13 are graphs each showing progression of a secondary transfer voltage during output of a chart.

FIGS. 14A-1, 14A-2, 14B-1, 14B-2, 14C-1 and 14C-2 are tables each showing an example of a relationship between patch numbers and adjusting values in a chart.

Figure 15:
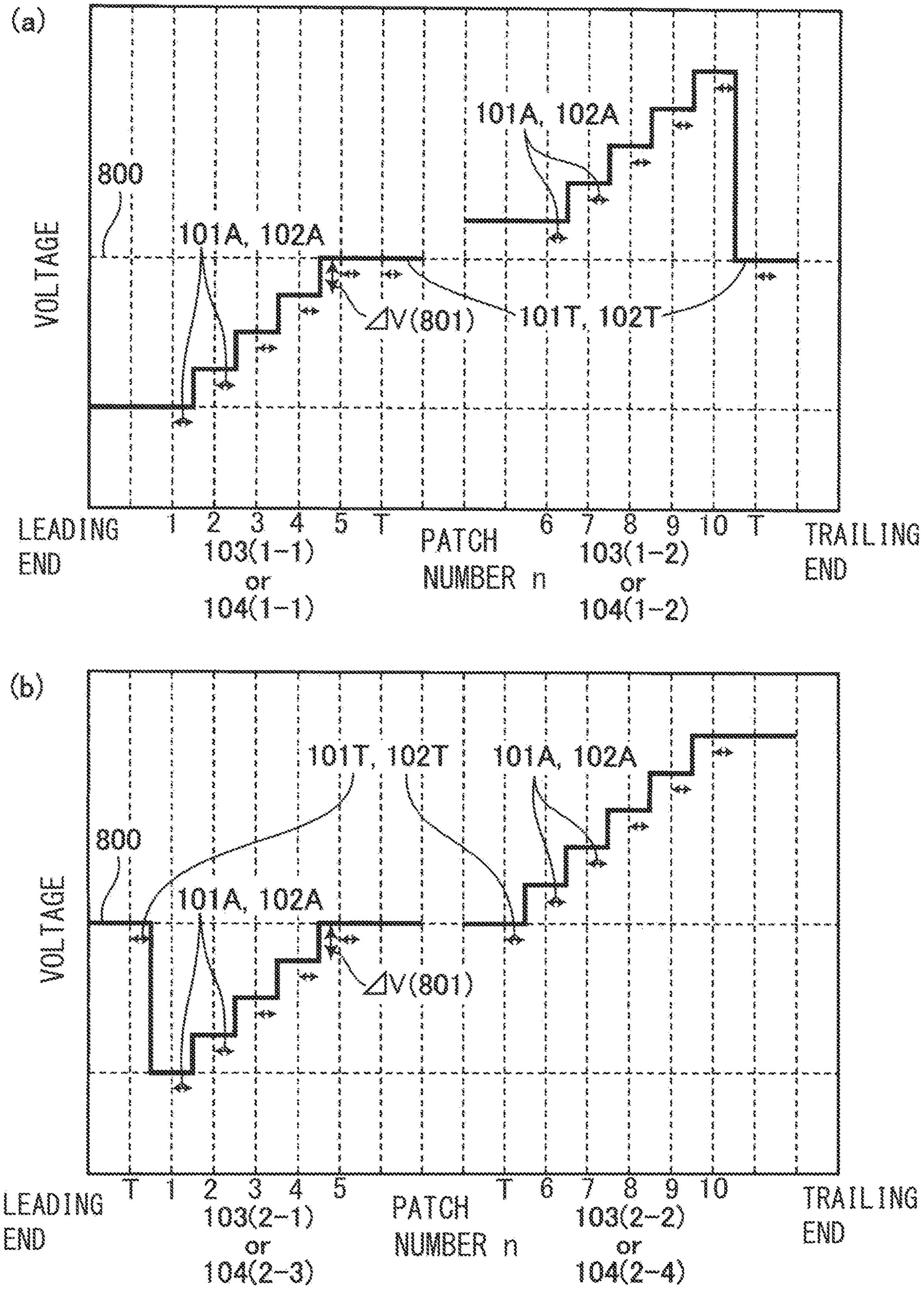

Parts (a) and (b) of FIG. 15 are graphs, each showing progression of a secondary transfer voltage during forming of a chart.

Figure 16:
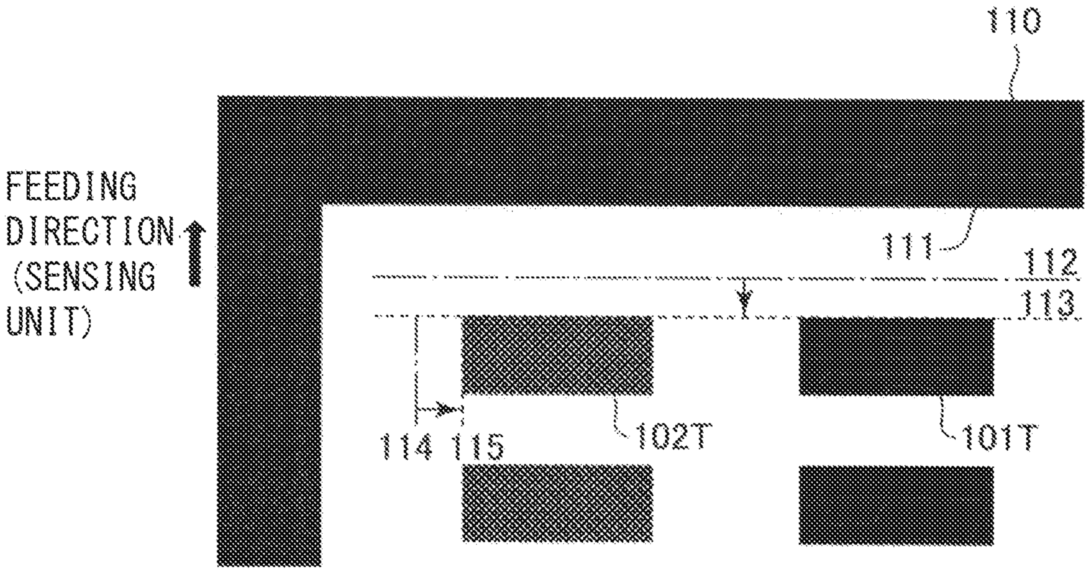

FIG. 16 is a schematic view for illustrating a transfer position detecting method.

Figure 17:
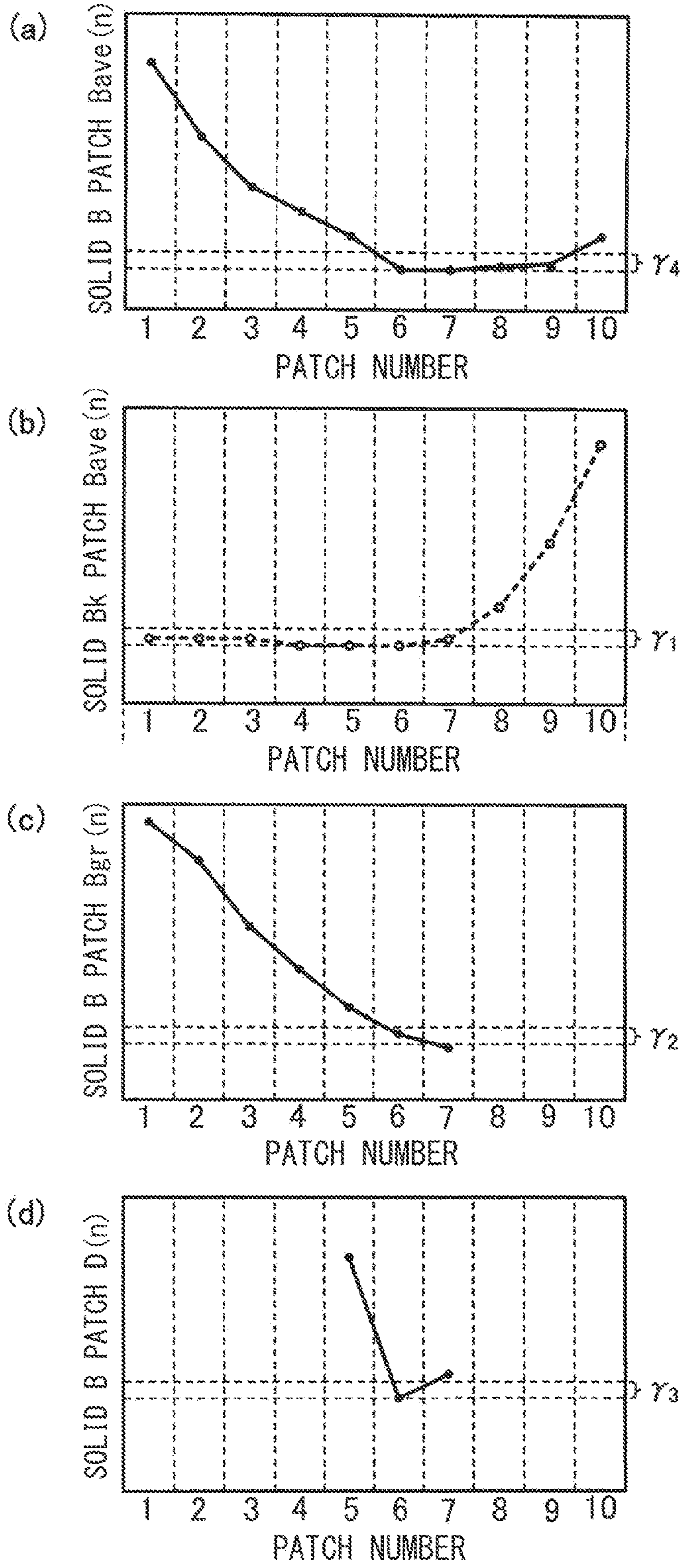

Parts (a) to (d) of FIG. 17 are graphs for illustrating a method of selecting a recommended adjusting value.

Figure 18:
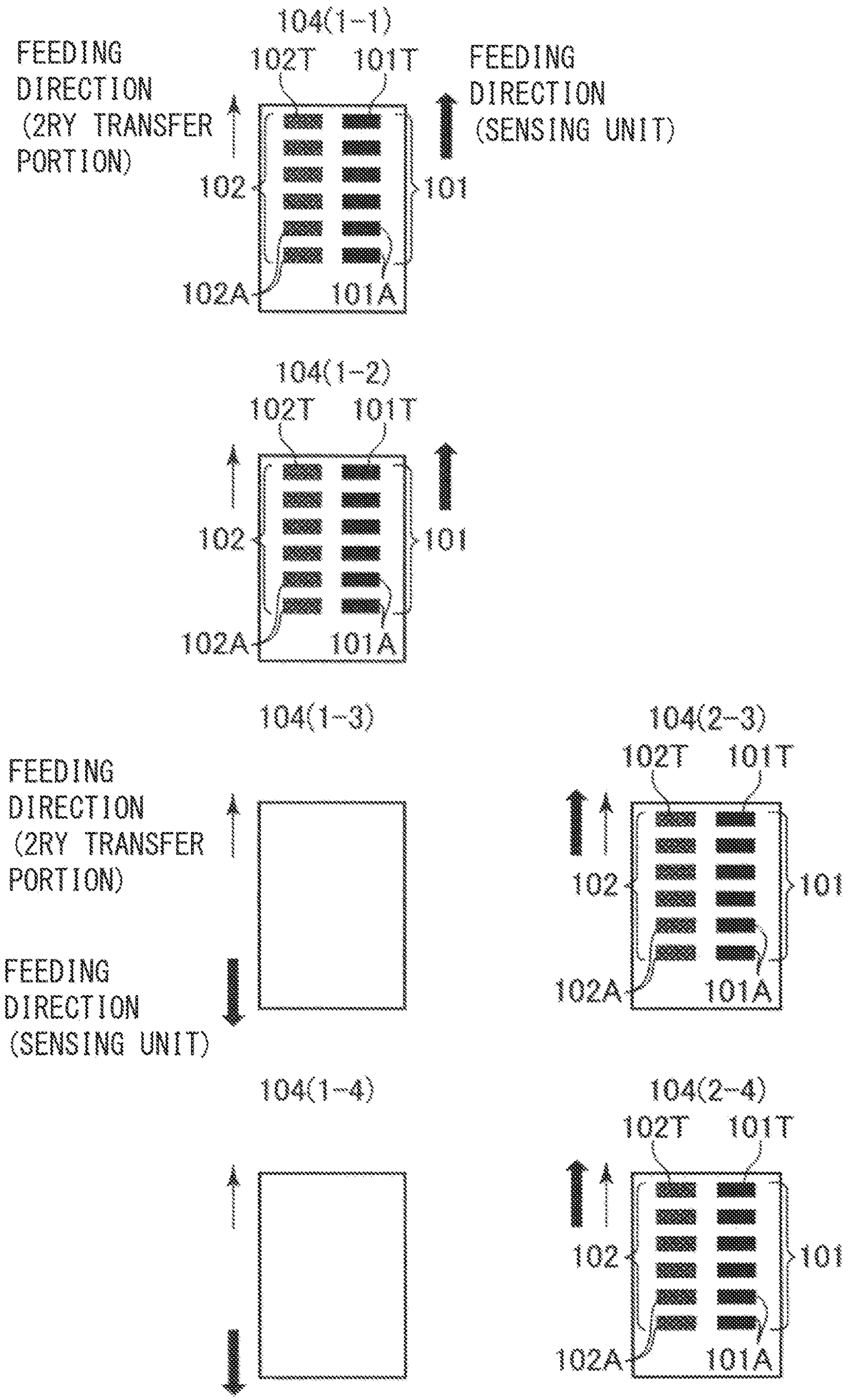

FIG. 18 includes schematic views each showing an R chart in an Embodiment 2.

Figure 19:
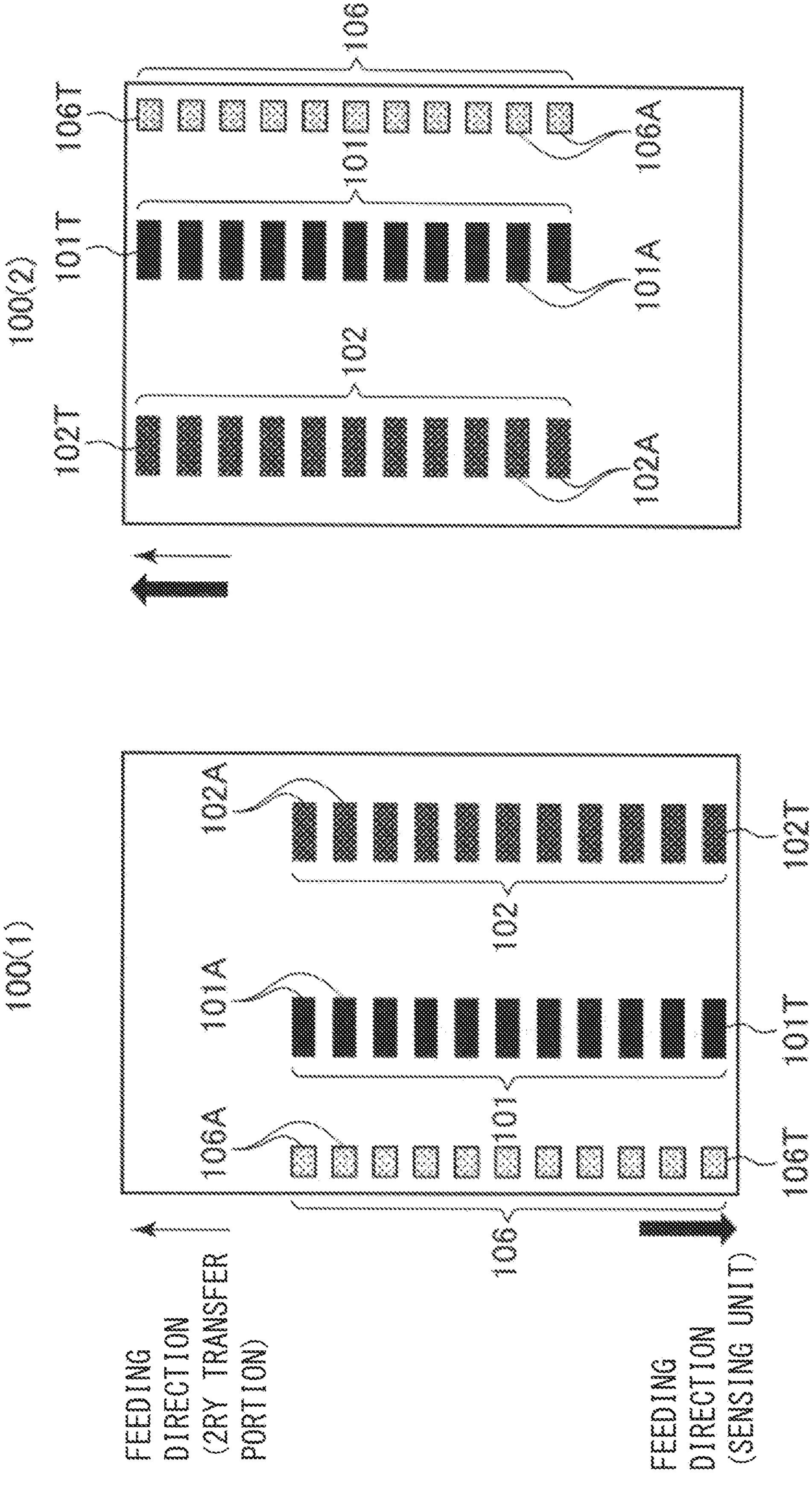

FIG. 19 includes schematic views each showing an L chart in an Embodiment 3.

Figure 20:
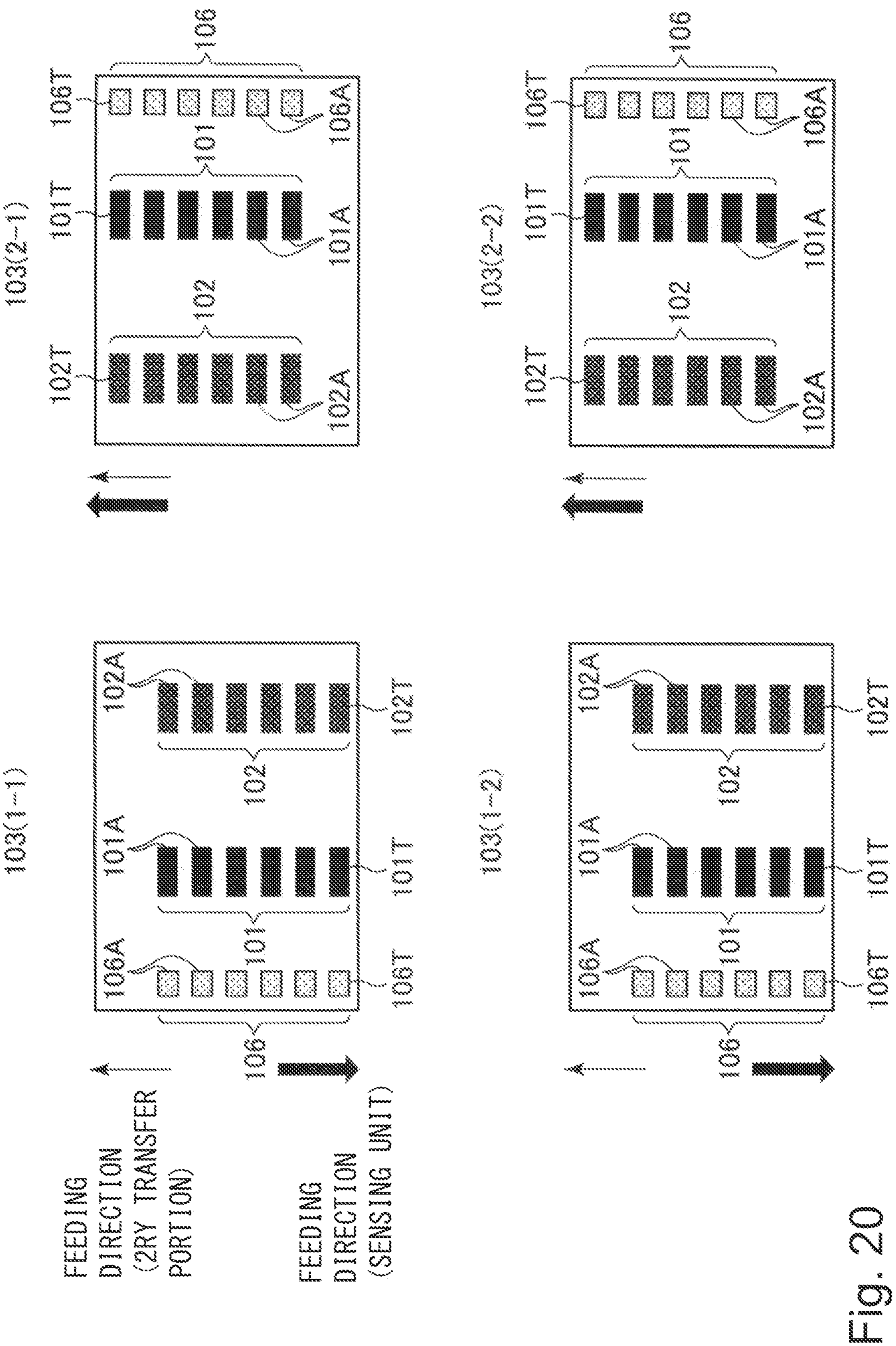

FIG. 20 includes schematic views each showing an S chart in the Embodiment 3.

DESCRIPTION OF EMBODIMENTS

Embodiment 11

1. Image Forming Apparatus

Figure 1:
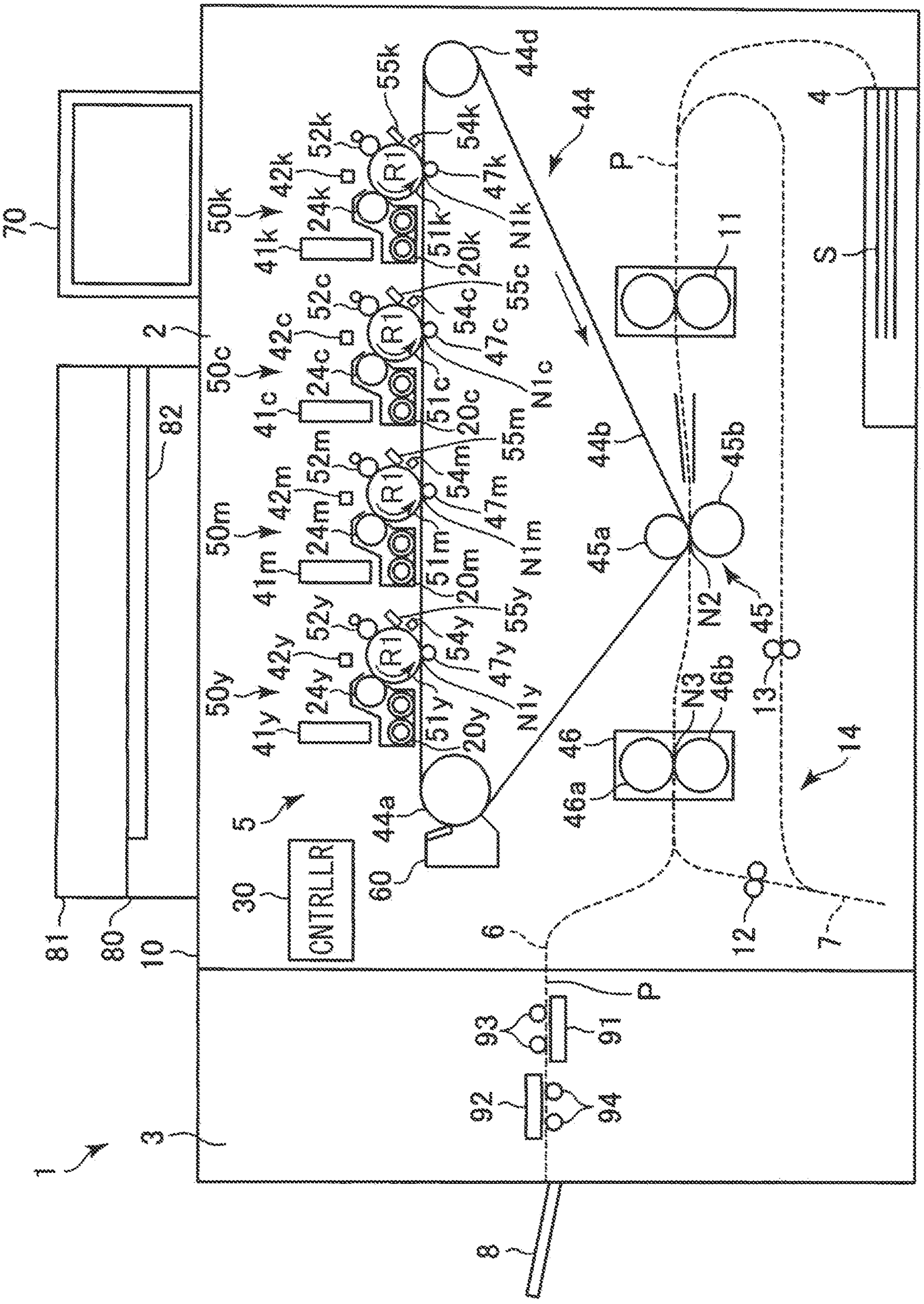
FIG. 1 is a schematic sectional view of an image forming apparatus

FIG. 1 is a schematic sectional view of an image forming apparatus (image forming system) 1 of embodiment 1. In this embodiment, the image forming apparatus 1 is constituted by connecting a printer unit 2 for carrying out image formation and a sensing unit 3 for reading a chart in order to adjust a secondary transfer voltage. In this embodiment, the printer unit 2 is a tandem type full-color printer capable of forming a full-color image on a recording material S by using an electrophotographic type system and employing an intermediary transfer type method. Incidentally, the recording material S is referred to as "paper (sheet)" in some instances, but the recording material is not limited to the paper as described later.

Figure 2:
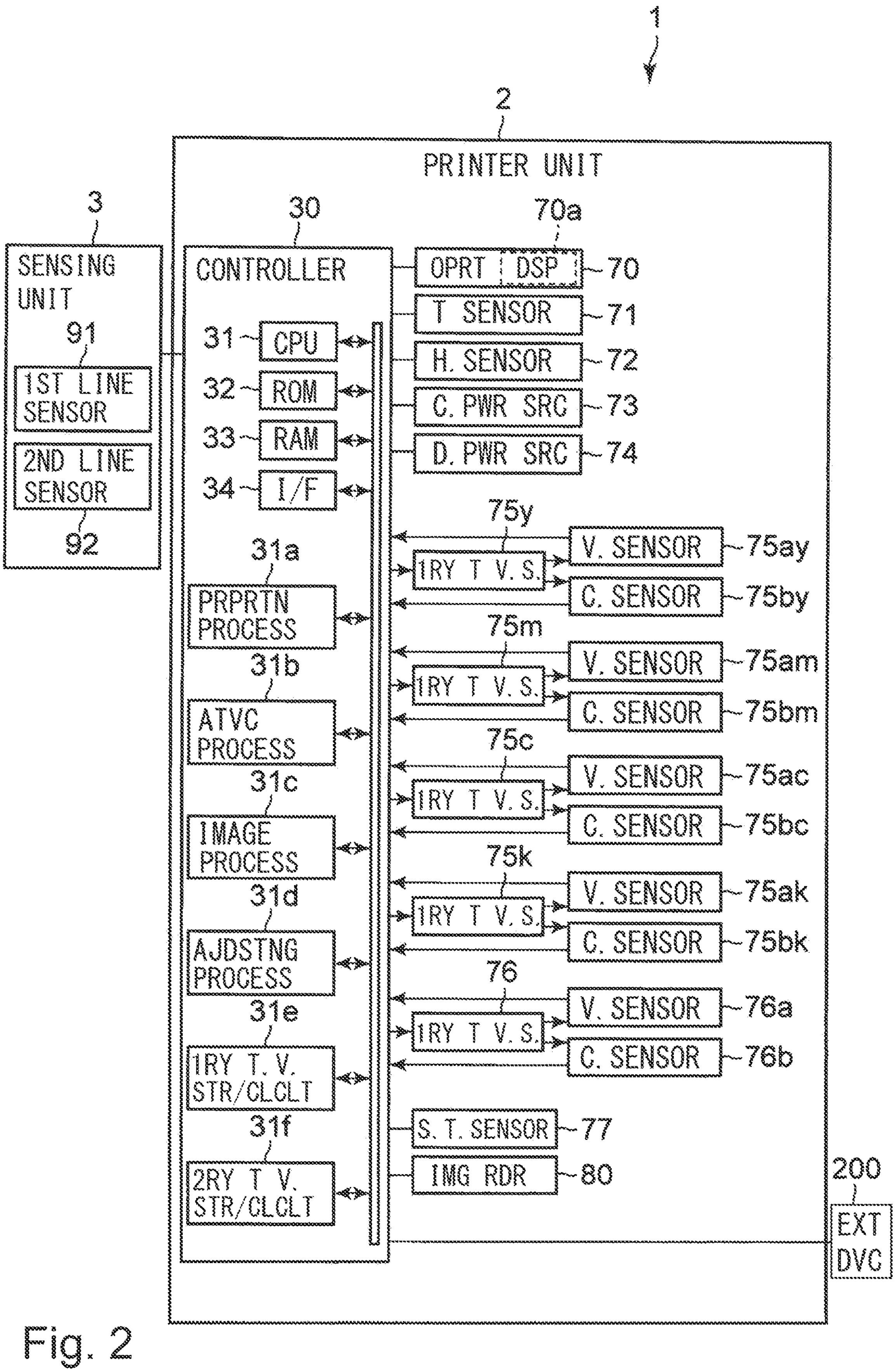
FIG. 2 is a block diagram showing a schematic structure of a control system of the image forming apparatus.

The printer unit 2 includes a sheet (paper) feeding portion 4, an image forming portion 5, a controller 20, a delivering portion 6 to the sensing unit 3, an operating portion 70, an image reading portion 80, and the like. In FIG. 1, only one sheet feeding portion 4 is shown, but a plurality of sheet feeding portions may be provided in the printer unit 2. Further, inside an apparatus main assembly 10 of the image forming apparatus 1 (printer unit 2), a temperature sensor 71 (FIG. 2) capable of detecting a temperature (inside temperature) on an inside of the apparatus main assembly 10 and a humidity sensor 72 (FIG. 2) capable of detecting a humidity (inside humidity) on an inside of the apparatus main assembly 10 are provided. Each of the temperature sensor 71 and the humidity sensor 72 is an example of an environment detecting means for detecting environment information which is at least one of a temperature and a humidity on at least one of an inside and an outside of the image forming apparatus 1. The printer unit 2 can form 4-color-based full-color image on a recording material S (sheet, transfer-receiving material) on the basis of image information (image signals supplied from the image reading portion 80 or from an external device 200 (FIG. 2). As the external device 200, it is possible to cite a host device, such as a personal computer, or a digital camera or a smart phone. Here, the recording material S is a material on which a toner image is formed, and specific examples thereof include in addition to papers such as plain paper and thick paper, synthetic resin sheet (synthetic paper) which are substitutes for the paper, and overhead projector sheets.

The image forming portion 5 can form the image on the recording material S fed from the sheet feeding portion 4 and moved through an inside of a feeding path (feeding passage) P, on the basis of the image information. The image forming portion 5 includes, as a plurality of image forming units, first to fourth image forming units 50*y*, 50*m*, 50*c* and 50*k* for forming images of yellow (Y), magenta (M), cyan (C), and black (Bk), respectively. Further, the image forming portion 5 includes an intermediary transfer unit 44, a secondary transfer device 45, and a fixing portion 46. Elements having the same or corresponding functions or structures in the respective image forming units 50*y*, 50*m*, 50*c*, and 50*k* are collectively described in some instances by omitting suffixes y, m, c and k of reference numerals or symbols representing the elements for associated colors of Y, M, C and Bk.

The image forming unit 50 includes a photosensitive drum 51 which is a rotatable drum-shaped (cylindrical) photosensitive member (electrophotographic photosensitive member) as a first image bearing member. Further, the image forming unit 50 includes a charging roller 52 which is a roller-shaped charging member as a charging means and an exposure device 42 as an exposure means. Further, the image forming unit 50 includes a developing device 20 as a developing means and a primary transfer roller 47 (constituting the intermediary transfer unit 44 described later) which is a roller-shaped primary transfer member as a primary transfer means. Further, the image forming unit 50 includes a pre-exposure device 54 as a charge-removing means and a drum cleaning device 55 as a photosensitive member cleaning means. Further, the image forming unit 50 includes a toner bottle 41 as a developer supplying container. The image forming unit 50 forms a toner image on the intermediary transfer belt 44*b* which will be described hereinafter.

The photosensitive drum 51 is movable (rotatable) while carrying an electrostatic image (electrostatic latent image) or a toner image. In this embodiment, the photosensitive drum 51 is a negatively chargeable organic photosensitive member (organic photoconductor: OPC) having an outer diameter of 30 mm. The photosensitive drum 51 has an aluminum cylinder as a base material and a surface layer formed on the surface of the base material. In this embodiment, the surface layer comprises three layers of an undercoat layer, a photo charge generation layer, and a charge transportation layer, which are applied and laminated on the substrate in the order named. When an image forming operation is started, the photosensitive drum 51 is driven to rotate in a direction indicated by an arrow R1 (counterclockwise) in the FIG. 1 at a predetermined peripheral speed (process speed) by a motor (not shown) as a driving means.

The surface of the rotating photosensitive drum 51 is uniformly charged to a predetermined polarity (negative in this embodiment) and a predetermined potential by the charging roller 52. In this embodiment, the charging roller 52 is a rubber roller which is disposed in contact with the surface of the photosensitive drum 51. The charging roller 52 is rotated with the rotation of the photosensitive drum 51. To the charging roller 52, a charging bias power source 73 (FIG. 2) as a charging voltage applying means (charging voltage applying portion) is connected. The charging bias power source 73 applies a predetermined charging voltage (charging bias) (charging voltage) to the charging roller 52 during the charging process.

The surface of the charged photosensitive drum 51 is scanned and exposed by the exposure device 42 in accordance with the image information, so that an electrostatic image is formed on the photosensitive drum 51. The exposure device 42 includes a laser scanner in this embodiment. The exposure device 42 emits laser beam in accordance with the separated color image information outputted from the controller 30, and scans and exposes the surface (outer peripheral surface) of the photosensitive drum 51.

The electrostatic image formed on the photosensitive drum 51 is developed (visualized) by supplying the toner thereto by the developing device 20, so that a toner image (developer image) is formed on the photosensitive drum 51. In this embodiment, the developing device 20 contains, as a developer, a two-component developer comprising nonmagnetic toner particles (toner) and magnetic carrier particles (carrier). The toner is supplied from the toner bottle 41 to the developing device 20. The developing device 20 includes a developing sleeve 24 as a developer carrying member (developing member). The developing sleeve 24 is made of a nonmagnetic material such as aluminum or nonmagnetic stainless steel (aluminum in this embodiment). Inside the developing sleeve 24, a magnet roller, which is a roller-shaped magnet, is fixed and arranged so as not to rotate relative to the main body (developing container) of the developing device 20. The developing sleeve 24 carries a developer and conveys it to a developing zone facing the photosensitive drum 51. A developing bias power source 74 (FIG. 2) as a developing applying means (developing voltage applying portion) is connected to the developing sleeve 24. The developing bias power source 74 applies a predetermined developing voltage (developing bias) to the developing sleeve 24 during the developing process operation. In this embodiment, on an exposure portion (image portion) on the photosensitive drum 51 lowered in absolute value of the potential by being exposed to light after being uniformly charged, toner charged to the same polarity (negative in this embodiment) as a charge polarity of the photosensitive drum 1 (reverse development type) is applied. In this embodiment, the normal charging polarity of the toner, which is a principal charging polarity of the toner during the development, is a negative polarity.

An intermediary transfer belt 44*b* which is an intermediary transfer member constituted by an endless belt as a second image bearing member is arranged so as to oppose the four photosensitive drums 51*y*, 51*m*, 51*c* and 51*k*. The intermediary transfer belt 44*b* is wound around a driving roller 44*a*, a tension roller 44*d*, and an inner secondary transfer roller 45*a*, which are used as a plurality of stretching rollers (supporting rollers), and is stretched by a predetermined tension. The intermediary transfer belt 44*b* is movable (rotatable) while carrying the toner image. The driving roller 44 is rotationally driven by a motor (not shown) as driving means, and rotates (circulates) the intermediary transfer belt 44*b*. The tension roller 44*d* is a tension roller which controls the tension of the intermediary transfer belt 44*b* to be constant. The tension roller 44*d* is subjected to a force which pushes the intermediary transfer belt 44*b* from an inner peripheral surface side toward the outer peripheral surface side by the urging force of a spring (not shown) as an urging means. By this force, to the intermediary transfer belt 44*d*, a tension of about 2 to 5 kg is applied in a circumferential direction (surface movement direction) of the intermediary transfer belt 44*b*. The inner secondary transfer roller 45*a* also constitutes the secondary transfer device 45 as will be described hereinafter. The driving force is transmitted to the intermediary transfer belt 44*b* by the driving roller 44*a*, and the intermediary transfer belt 44*b* is rotated (circulated and moved) in an arrow R2 direction (clockwise direction) in FIG. 1 at a predetermined peripheral speed (process speed) corresponding to the peripheral speed of the photosensitive drum 51. On the inner peripheral surface side of the intermediary transfer belt 44*b*, primary transfer rollers 47*y*, 47*m*, 47*c* and 47*k* are provided correspondingly to the four photosensitive drums 51*y*, 51*m*, 51*c* and 51*k*, respectively. In this embodiment, the primary transfer roller 47 is disposed in a position opposing the photosensitive drum 51 through the intermediary transfer belt 44*b*, and nips the intermediary transfer belt 40*b* between itself and the photosensitive drum 51. By this, the primary transfer roller 47 contacts the photosensitive drum 51 through the intermediary transfer belt 44*b*, and forms a primary transfer portion (primary transfer nip) N1 where the photosensitive drum 51 and the intermediary transfer belt 44*b* are in contact with each other. The stretching rollers other than the driving roller 44*a*, and the primary transfer rollers 47*y*, 47*m*, 47*c*, and 47*k* are rotationally driven with rotation of the intermediary transfer belt 44*b*. Further, on the outer peripheral surface side of the intermediary transfer belt 44*b*, in a position opposing the driving roller 44*a* through the intermediary transfer belt 44*b*, a belt cleaning device 60 as an intermediary transfer member cleaning means is provided. The intermediary transfer unit 44 is constituted by the intermediary transfer belt 44*b*, the stretching rollers 44*a*, 44*b*, and 45*a*, the primary transfer rollers 47*y*, 47*m*, 47*c*, and 47*k*, the belt cleaning device 60, and the like.

The toner image formed on the photosensitive drum 51 is primarily transferred onto the rotating intermediary transfer belt 44*b* by the action of the primary transfer roller 47 in the primary transfer portion N1. To the primary transfer roller 47, a primary transfer power source 75 (FIG. 2) as a primary transfer voltage applying means (primary transfer portion applying portion) is connected. The primary transfer power source 75 applies, to the primary transfer roller 47, a predetermined primary transfer voltage (primary transfer belt) which is a DC voltage of an opposite polarity (positive polarity in this embodiment) to a normal charge polarity of the toner. To the primary transfer power source 75, a voltage detecting sensor 75*a* as a voltage detecting means (voltage detecting portion) for detecting an output voltage and a current detecting sensor 75*b* as a control detecting means (current detecting portion) for detecting an output current are connected (FIG. 2). In this embodiment, the primary transfer power sources 75*y*, 75*m*, 75*c*, and 75*k* are provided correspondingly to the primary transfer roller 47*y*, 47*m*, 47*c*, and 47*k*, respectively, and are capable of individually controlling the primary transfer voltage applied to the primary transfer rollers 47*y*, 47*m*, 47*c*, and 47*k*. In this embodiment, by applying a positive primary transfer voltage to the primary transfer roller 47, a negative toner image on the photosensitive drum 51 is primarily transferred onto the intermediary transfer belt 44*b*. For example, when forming a full-color image, the yellow (Y), magenta (M), cyan (C) and black (Bk) toner images formed on the photosensitive drums 51*y*, 51*m*, 51*c*, and 51*k* are transferred so as to be sequentially superimposed on the intermediary transfer belt 44*b*.

On the outer peripheral surface side of the intermediary transfer belt 44*b*, in a position opposing the inner secondary transfer roller 45*a* as an opposing member through the intermediary transfer belt 44*b*, an outer secondary transfer roller 45*b* which is a roller-shaped secondary transfer member is disposed. The outer secondary transfer roller 45*b* constitutes the secondary transfer device 45 as a secondary transfer means in cooperation with the inner secondary transfer roller 45*a*. The outer secondary transfer roller 45*b* contacts the inner secondary transfer roller 45*a* through the intermediary transfer belt 44*b* and forms the secondary transfer portion (secondary transfer nip) N2 where the intermediary transfer belt 44*b* and the outer secondary transfer roller 45*b* are in contact with each other. The toner image formed on the intermediary transfer belt 44*b* is secondarily transferred onto the recording material S which is nipped and conveyed by the intermediary transfer belt 44*b* and the outer secondary transfer roller 45*a* (i.e., passes through the secondary transfer portion N2), by the action of the secondary transfer device 45 in the secondary transfer portion N2. In this embodiment, a positive secondary transfer voltage is applied to the outer secondary transfer roller 45*b*, whereby the negative toner image on the intermediary transfer belt 44*b* is secondarily transferred onto the recording material S. The recording material S is fed from the sheet feeding portion 4 in parallel with the above-described toner image forming operation, and the toner image on the intermediary transfer belt 44*b* is fed to the secondary transfer portion N2 by a registration roller pair 11 provided as a feeding member in the feeding path P by being timed to the toner image on the intermediary transfer belt 44*b*.

As described above, the secondary transfer device 45 is constituted by including the inner secondary transfer roller 45*a* as an opposing member and the outer secondary transfer roller 43*b* as a secondary transfer member. To the outer secondary transfer roller 45*b*, a secondary transfer power source 76 (FIG. 2) as a secondary transfer voltage applying means (secondary transfer voltage applying portion) is connected. During the secondary transfer process, the secondary transfer power source 76 applies a predetermined secondary transfer voltage, which is a DC voltage having a polarity opposite to the normal charging polarity of the toner (positive in this embodiment), to the outer secondary transfer roller 45*b*. To the secondary transfer power source 76, a voltage detecting sensor 76*a* as a voltage detecting means (voltage detecting portion) for detecting the output voltage and a current detecting sensor 76*b* as a current detecting means (current detecting portion) for detecting the output current (FIG. 2) are connected. In this embodiment, the core metal of the inner secondary transfer roller 45*a* is connected to the ground potential. And, when the recording material S is supplied to the secondary transfer portion N2, a secondary transfer voltage with constant-voltage-control having a polarity opposite to the normal charging polarity of the toner is applied to the outer secondary transfer roller 45*b*. In this embodiment, a secondary transfer voltage of 1 to 6.5 kV is applied, a current of about 15 to 100 μA, for example, is applied, and the toner image on the intermediary transfer belt 44*b* is secondarily transferred onto the recording material S. Here, in this embodiment, the inner secondary transfer roller 45*a* is connected to the ground potential, and a voltage is applied from the secondary transfer power source 76 to the outer secondary transfer roller 45*b*. On the other hand, a voltage from the secondary transfer power source 76 is applied to the inner secondary transfer roller 45*a* as the secondary transfer member, and the outer secondary transfer roller 45*b* as the opposing member may also be connected to the ground potential. In such a case, a DC voltage having the same polarity as the normal charge polarity of the toner is applied to the inner secondary transfer roller 45*a*.

The recording material S onto which the toner image has been transferred is fed to a fixing device 46 as a fixing means. The fixing device 46 includes a fixing roller 46*a* and a pressure roller 46*b*. The fixing roller 46*a* includes therein a heater as a heating means. The pressing roller 46*b* is pressed toward the fixing roller 46*a* and forms a fixing portion (fixing nip) N3 where the fixing roller 46*a* and the pressing roller 46*b* contact each other. The recording material S carrying the unfixed toner image is heated and pressed by being sandwiched and fed between the fixing roller 46*a* and the pressing roller 46*b* in the fixing nip N3. By this, the toner image is fixed (melted and fixed) on the recording material S. Here, the temperature of the fixing roller 46*a* (fixing temperature) is detected by a fixing temperature sensor 77 (FIG. 2) and is controlled by the controller 30.

In the case of one-side printing in which the image is formed on one side of the recording material S, the recording material S on which the toner image is fixed on the one side is delivered from a delivering portion 6 toward the sensing unit 3 as it is. On the other hand, in the case of double-side printing, the images are formed on double (both) sides of the recording material S, the recording material S on which the toner image is fixed on a first side (surface) as described above is fed to a reverse feeding path 7 by a reverse feeding roller 12 or the like as a reverse feeding member. In the reverse feeding path 7, the recording material S on which the toner image is fixed on the first side is turned upside-down and then is supplied again to the secondary transfer portion N2 by a double-side roller 13 or the like as a double-side feeding member. Thus, onto the recording material S fed to the secondary transfer portion 45*n* again, the toner image is transferred onto a second side and is fixed, and thereafter, the recording material S is delivered from the delivering portion 6 to the sensing unit 3 and then is stacked on the discharge tray 8. As described above, the printer unit 2 of this embodiment is capable of executing double-side printing (automatic double-side printing) in which images are formed on both sides of a single recording material S. A double-side mechanism 14 is constituted by the reverse feeding path 7, the reverse feeding roller 12, the double-side feeding roller 13, and the like. The recording material S on which the images are formed passes through an inside of the sensing unit 3 and is discharged (outputted) to a discharge portion 8 provided outside the sensing unit 3 (image forming apparatus 1). Incidentally, when a chart formed by transferring patches onto the recording material S in an operation in an adjusting mode described later, the patches on the chart are read during passing of the recording material S through the inside of the sensing unit 3, and then the recording material S is discharged to the discharge portion 8.

The surface of the photosensitive drum 51 after the primary transfer is electrically discharged (charge-removed) by the pre-exposure device 54. In addition, the toner remaining on the photosensitive drum 51 without being transferred onto the intermediary transfer belt 44*b* during the primary transfer process (primary transfer residual toner) is removed and collected from the surface of the photosensitive drum 51 by the drum cleaning device 55. The drum cleaning device 55 includes a cleaning blade as a cleaning member. The cleaning blade is a plate-like member which is in contact with the photosensitive drum 51 with a predetermined pressing force. The cleaning blade is in contact with the surface of the photosensitive drum 51 in a counter direction to a rotational direction of the photosensitive drum 51 so that a free end on a free end portion thereof faces an upstream side of the rotational direction of the photosensitive drum 51. In addition, toner remaining on the intermediary transfer belt 44*b* without being transferred onto the recording material S during the secondary transfer process (secondary transfer residual toner) or a deposited matter such as paper dust is removed and collected from the surface of the intermediary transfer belt 44*b* by the belt cleaning device 60. In this embodiment, the belt cleaning device 60 is constituted by including a cleaning blade similarly as the drum cleaning device. The collected matters such as the toners and the like collected by the drum cleaning device 55 and the belt cleaning device 60 are conveyed and accumulated into a collecting container (not shown).

Incidentally, the printer unit 2 is also capable of forming an image of a single color such as black or an image of a multi-color.

Here, in this embodiment, the primary transfer roller 47 includes an elastic layer of an ion-conductive foam rubber (NBR rubber) and a core metal. An outer diameter of the primary transfer roller 47 is 15-20 mm, for example. Further, as the primary transfer roller 47, a roller of which electrical resistance value of $1\times10^5$-$1\times10^8\Omega$ (in N/N (23° C./50% RH) environment, under application of 2 kV) can be suitably used.

Further, in this embodiment, the intermediary transfer belt 44*b* is an endless belt including a two-layer structure of a base layer and a surface layer from an inner peripheral surface side thereof. As a material constituting the base layer, a material in which carbon black as an antistatic agent is contained in an appropriate amount in a resin such as polyimide or polycarbonate or in various rubbers can be suitably used. A thickness of the base layer is 0.05-0.15 mm, for example. As a material of the surface layer, a resin such as a fluorine-containing resin can be suitably used. The surface layer decreases a depositing force of the toner onto the surface of the intermediary transfer belt 44*b*, so that the toner is easily transferred onto the recording material S in the secondary transfer portion N2. A thickness of the surface layer is 0.0002-0.020 mm, for example. As a material of the surface layer, it is possible to use, as a base material, one kind of a resin material such as polyurethane, polyester, or epoxy resin, or two kinds of elastic materials such as an elastic rubber, an elastomer, and a butyl rubber. Further, into this base material, as a material for enhancing a lubricating property by reducing surface energy, for example, powder or particles of fluorine-containing resin and dispersed singly or in combination of two kinds or more or by being made different in particle size can be added. In this embodiment, the intermediary transfer belt 44*b* is $5\times10^8$-$1\times10^{14}$ $\Omega\cdot$cm (23° C., 40% RH) in volume resistivity and is 0.15-0.6 (23° C., 50% RH, measured with "HEIDON Type 94i", manufactured by Shinto Scientific Co., Ltd.) in coefficient of static friction. Incidentally, the intermediary transfer belt 44*b* had the two-layer structure in this embodiment, but may also have a single-layer constitution of a material corresponding to the material of the above-described base layer.

Further, in this embodiment, the outer secondary transfer roller 45*b* includes an elastic layer of an ion-conductive foam rubber (NBR rubber) and a core metal. An outer diameter of the outer secondary transfer roller 45*b* is 20-25 mm, for example. Further, as the outer secondary transfer roller 45*b*, a roller of which electrical resistance value of $1\times10^5$-$1\times10^8\Omega$ (in N/N (23° C./50% RH) environment, under application of 2 kV) can be suitably used.

Further, in each of the image forming units 50, the photosensitive drum 1 and, as a process means actable on the photosensitive drum 1, at least one of the charging roller 52, the developing device 20, and the drum cleaning device 55 may be integrally assembled into a unit as a process cartridge. In addition, this unit may be detachably mountable to the apparatus main assembly.

Further, at an upper portion of the apparatus main assembly 10, an automatic original feeding device 81 and an image reading portion 80 are provided. The automatic original feeding device 81 as an original feeding means automatically feeds, toward a reading position (which may be constituted by at least a part of a platen glass 82 described later) of the image reading portion 80, a sheet such as the recording material S on which an original image (text or image) is formed. The image reading portion 80 as a reading means is capable of reading the image on the sheet fed to the above-described reading position by the automatic original feeding device 81. Further, the image reading portion 80 is capable of reading the image on the sheet such as the recording material S which is disposed on the platen glass 82 and on which the image (text or image) of the original is formed. The image reading portion 80 illuminates the sheet with light from a light source (not shown) and is constituted so as to read the image on the sheet, in terms of a dot density determined in advance, by an image reading element (not shown). That is, the image reading portion 80 optically reads the image on the sheet and covers the read image into an electric signal.

2. Control Mode

FIG. 2 is a block diagram showing a schematic constitution of a control system of the image forming apparatus 1 of this embodiment. As shown in FIG. 2, the controller 30 is constituted by a computer. The controller 30 includes, for example, a CPU 31, a ROM (including a readable one) 32 for storing a program for controlling the respective portions, a RAM for temporarily storing data 33, and an input/output circuit (I/F) 34 for inputting/outputting signals to and from the outside. The CPU 33 is a microprocessor which controls the entire image forming apparatus 1 and is a main part of the system controller. The CPU 31 is connected to the sheet reading portion 4, the image forming portion 5, the delivering portion 6, the operation portion 70, the sensing unit 3, the image reading portion 80, and the like via the input/output circuit 34, and exchanges signals with these portions, and controls the operation of each of these portions. The ROM 32 stores an image formation control sequence for forming an image on the recording material S. For example, the controller 30 is connected to a charging power source 73, a developing power source 74, a primary transfer power source 75, and a secondary transfer power source 76, which are controlled by signals from the controller 30, respectively. In addition, the controller 30 is connected to a temperature sensor 71, a humidity sensor 72, a voltage detection sensor 75*a* and a current detection sensor 75*b* of the primary transfer power supply 75, a voltage detection sensor 76*a* and a current detection sensor 76*b* of the secondary transfer power supply 76, and a fixing temperature sensor 77 are connected. Signals detected by the respective sensors are inputted to the controller 30.

The operation portion 70 includes an operation button (such as numerical keys) as an input means, and a display portion 70*a* including a liquid crystal panel as a display means. Incidentally, in this embodiment, the display portion 70*a* is constituted as a touch panel, and also has a function as the input means. The operators such as a user or a service person can input an instruction to the controller 30 so as to execute a job (described later). The controller 30 receives the signal from the operating portion 70 and operates various devices of the image forming apparatus 1, so that the controller 30 is capable of controlling the image forming apparatus 1 so as to execute the job. Incidentally, the image forming apparatus 1 can also execute the job on the basis of an image forming signal (image data, control instruction) supplied from the external device 200 such as the personal computer.

In this embodiment, the controller 30 includes an image formation pre-preparation process portion 31*a*, an ATVC process portion 31*b*, an image formation process portion 31*c*, and an adjustment process portion 31*d*. In addition, the controller 30 includes a primary transfer voltage storage/operation portion 31*e* and a secondary transfer voltage storage/operation portion 31*f* Here, each of these process portions and storage/operation portions may be provided as a portion or portions of the CPU 31 or the RAM 33. For example, the controller 30 (specifically the image formation process portion 31*c*) is capable of carrying out control so as to execute a print job as described above. In addition, the controller 30 (specifically the ATVC process portion 31*b*) is capable of carrying out control so as to execute ATVC (setting mode) for the primary transfer portion N1 and the secondary transfer portion N2. The ATVC will be specifically described hereinafter. In addition, the controller 30 (specifically the adjustment process portion 31*d*) is capable of carrying out control so as to execute an operation in an adjustment mode for adjusting a set value of the secondary transfer voltage. The operation in the adjustment mode will be described specifically hereinafter. In this embodiment, the controller 30 (specifically the adjustment process portion 31*d*) has a function of an executing portion for executing an operation (output mode) for outputting a chart in an operation in the adjustment mode described later. Further, in this embodiment, the sensing unit 3 constitutes an acquiring portion for acquiring density information on a density of test images on a chart in the operation in the adjustment mode described later. Further, in this embodiment, the controller 30 (specifically the adjustment process portion 31*d*) has a function of a setting portion for setting the secondary transfer voltage on the basis of the density information acquired by the acquiring portion.

Here, the image forming apparatus 1 executes the job (image output operation, print job), which is a series of operations, to form and output an image or images on a single or a plurality of recording materials S started by one start instruction. The job includes an image forming step, a pre-rotation step, a sheet (paper) interval step in the case where the images are formed on the plurality of recording materials S, and a post-rotation step, in general. The image forming step is performed in a period in which formation of an electrostatic image for the image actually formed and outputted on the recording material S, formation of the toner image, primary transfer of the toner image, secondary transfer of the toner image, and fixing of the toner image are carried out, in general, and during image formation (image forming period) refer refers to this period. Specifically, timing during the image formation is different among positions where the respective steps of the formation of the electrostatic image, the toner image formation, the primary transfer of the toner image, the secondary transfer of the toner image, and the fixing of the toner image are performed. The pre-rotation step is performed in a period in which a preparatory operation, before the image forming step, from an input of the start instruction until the image is started to be actually formed, is carried out. The sheet interval step (image interval step) is performed in a period corresponding to an interval between a recording material S and a subsequent recording material S when the images are continuously formed on a plurality of recording materials S (continuous image formation). The post-rotation step is performed in a period in which a post-operation (preparatory operation) after the image forming step is performed. During non-image formation (non-image formation period) is a period other than the period of the image formation (during image formation) and includes the periods of the pre-rotation step, the sheet interval step, the post-rotation step and further includes a period of a pre-multi-rotation step which is a preparatory operation during turning-on of a main switch (power source) of the image forming apparatus 1 or during restoration from a sleep state.

3. Sensing Unit

Next, a structure of the sensing unit 3 having a function of reading the chart outputted in the operation in the adjustment mode in which the secondary transfer voltage is adjusted will be described.

As shown in FIG. 1, inside the sensing unit 3, a feeding path P along which the recording material S passes is provided, and first and second line sensors 91 and 92 are provided so as to sandwich the feeding path P from front and back sides. The first line sensor 91 is disposed on a side upstream of the second line sensor 92 with respect to the feeding direction of the recording material S so as to oppose the feeding path P from below in FIG. 1. Further, the second line sensor 92 is disposed on a side downstream of the first line sensor 91 with respect to the feeding direction so as to oppose the feeding path P from above in FIG. 1. In this embodiment, in the case where the adjustment of the secondary transfer voltage during the double-side printing is made in the operation in the adjustment mode, the recording material S on which the chart is formed passes through the feeding path P inside the sensing unit 3 so that an upper side in FIG. 1 is a second side and a lower side in FIG. 1 is a first side. That is, the first line sensor 91 opposes the first side of the recording material S and the second line sensor 91 opposes the second side of the recording material S, so that the images (patches) of the chart formed on both (double) sides of the recording material S can be read by single passing of the recording material S.

Further, a first pressing roller 93 is provided in a position opposing the first line sensor 91, and a second pressing roller 94 is provided in a position opposing the second line sensor 92. During the reading of the chart, the first and second pressing rollers 93 and 94 stabilize an attitude of the recording material S and thus stabilize a reading result. The recording material S having passed through the sensing unit 3 is discharged to the discharge portion 8.

As each of the first and second line sensors 91 and 92, for example, a CIS (contact image sensor) or the like can be suitably used. In this embodiment, each of the first and second line sensors 91 and 92 is capable of reading the chart with resolution of about 300 dpi. In this embodiment, image data read by each of the first and second line sensors 92 and 92 is processed as a brightness value of 0-255 for each of RGB in the controller 30.

As shown in FIG. 2, the sensing unit 3 is connected to the controller 30 and is capable of delivering, to the controller 30, information (density information on the density) read by the first and second line sensors 91 and 92.

4. Control of Secondary Voltage

Figure 3:
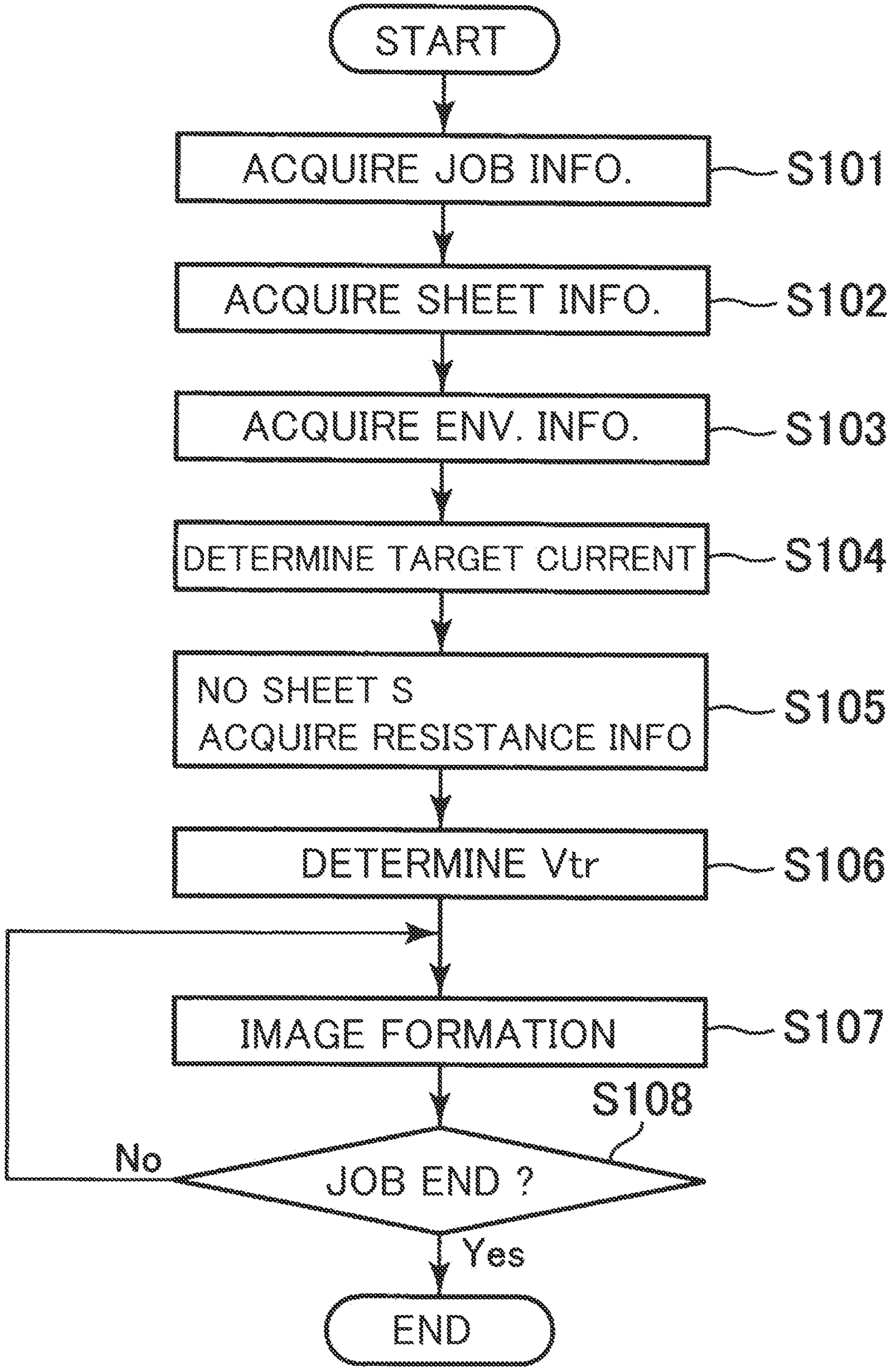
FIG. 3 is a flowchart showing an outline of a procedure of secondary transfer voltage control.

Next, control of the secondary transfer voltage will be described. FIG. 3 is a flowchart showing an outline of a procedure relating to the control of the secondary transfer voltage in this embodiment. Generally, the control of the secondary transfer voltage includes constant-voltage control and constant-current control, and in this embodiment, the constant-voltage control is used.

First, the controller 30 (image formation pre-preparation process portion 31*a*) causes the image forming portion to start an operation of a job when it acquires information on the job from the operation portion 70 or the external device 200 (S101). In the information on this job, image information designated by the operator and information on the recording material S are included. The information on the recording material S includes information on a size of the recording material S and information on a kind (so-called "category of paper kind") of the recording material S such as "thin paper, plain paper, thick paper, . . . ". Incidentally, the kind of the recording material S includes those based on general characteristics such as plain paper, thick paper, thin paper, glossy paper, and coated paper, and any distinguishable information on the recording material S, such as brand, product number, basis weight, and thickness. The controller 30 (image formation pre-preparation process portion 31*a*) writes this job information in the RAM 33 (S102).

Next, the controller 30 (image formation pre-preparation process portion 31*a*) acquires environment information detected by the temperature sensor 71 and the humidity sensor 72 (S103). In the ROM 32, information showing correction between the environment information and a target current Itarget for transferring the toner image from the intermediary transfer belt 44*b* onto the recording material S is stored. The controller 30 (secondary transfer voltage storage/operation portion 31*f*) acquires the target current Itarget corresponding to the environment from the information showing the correlation between the environment information and the target current Itarget, on the basis of the environment information read in S103. Then, the controller 30 (secondary transfer voltage storage/operation portion 30*f*) writes this target current Itarget in the RAM 33 (or the secondary transfer voltage storage/operation portion 31*f*) (S104). Incidentally, why the target current Itarget is changed depending on the environment information is that the toner charge amount varies depending on the environment. As regards the target current Itarget in this embodiment, a secondary transfer current value at which a toner image (a secondary-color whole suppress image in this embodiment) with a maximum toner application amount can be transferred onto the recording material S by the image forming apparatus 1 has been acquired in each environment in advance.

Figure 4:
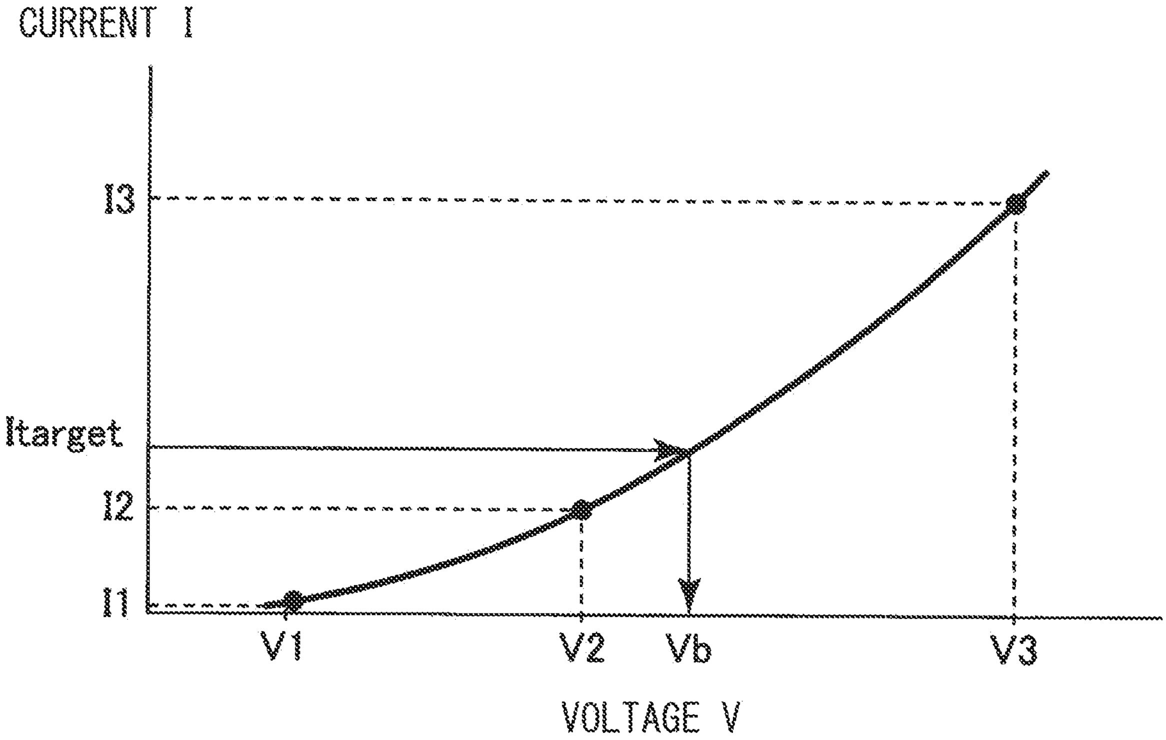
FIG. 4 is a graph showing an example of a voltage-current characteristic acquired in the secondary transfer voltage control.

Next, the controller 30 (ATVC process portion 31*b*) acquires information on an electric resistance of the secondary transfer portion N2 by the ATVC (Active Transfer Voltage Control) before the toner image on the intermediary transfer belt 44*b* and the recording material S onto which the toner image is transferred reach the secondary transfer portion N2 (S105). That is, in a state in which the outer secondary transfer roller 45*b* and the intermediary transfer belt 44*b* are in contact with each other, predetermined voltages of a plurality of levels are applied (supplied) from the secondary transfer power source 76 to the outer secondary transfer roller 45*b*. Then, current values when the predetermined voltages are applied are detected by the current detecting sensor 76*b*, so that a relationship between the voltage and the current (voltage-current characteristic) as shown in FIG. 4 is acquired. The controller 30 (ATVC process portion 31*b*) writes information on this relationship between the voltage and the current in the RAM 33 (or secondary transfer voltage storage/operation portion 31*f*). This relationship between the voltage and the current changes depending on the electric resistance of the secondary transfer portion N2. Incidentally, a plurality levels of predetermined currents are supplied from the secondary transfer power source 76 to the secondary transfer roller 45*b*, and values of voltages generated at that time may be detected by the voltage detection sensor 76*a*. In the constitution of this embodiment, the relationship between the voltage and the current is not such that the current changes linearly relative to the voltage (i.e., is linearly proportional to the voltage), but is such that the current changes so as to be represented by a polynomial expression consisting of two or more terms of the voltage. For that reason, in this embodiment, in order that the relationship between the voltage and the current can be represented by the polynomial expression, the number of predetermined voltages or currents supplied when the information on the electric resistance of the secondary transfer portion N2 is acquired is three or more (levels).

Then, the controller 30 (secondary transfer voltage storage/operation portion 31*f*) acquires a voltage value to be applied from the secondary transfer power source 76 to the outer secondary transfer roller 45*b* (S106). That is, on the basis of the target current Itarget written in the RAM 33 in S104 and the relationship between the voltage and the current acquired in S105, the controller 30 (secondary transfer voltage storage/operation portion 31*f*) acquires a voltage value Vb necessary to cause the target current Itarget to flow in a state in which the recording material S is absent in the secondary transfer portion 45*n*. This voltage value Vb corresponds to a secondary transfer portion part voltage (transfer voltage corresponding to the electric resistance of the secondary transfer portion N2). Further, in the ROM 32, pieces of information for acquiring a recording material part voltage (transfer voltage corresponding to the electric resistance of the recording material S) Vp as shown in FIG. 5 are stored. The information is set as table data showing a relationship between ambient water content (absolute water content) and the recording material part voltage Vp for each of sections (corresponding to paper kind categories) of basis weights of recording material S. Further, the recording material S once passed through the fixing portion 46 increases in electric resistance by a lowering in water content of an external environment, and therefore, separate table data are prepared for the first side and the second side. On the basis of the information on the job acquired in S101 and the environment information acquired in S103, the controller 30 (secondary transfer voltage storage/operation portion 31*f*) acquires the recording material part voltage Vp from the above-described table data. Incidentally, the table data for acquiring the recording material part voltage Vp as shown in FIG. 5 has been acquired in advance by an experiment or the like. Further, the controller 30 is capable of acquiring the ambient water content on the basis of the temperature information acquired by the temperature sensor 71 and the humidity information acquired by the humidity sensor 72. Further, in the case where the adjusting value is set by the operation in the adjustment mode, described later, for setting the set value of the secondary transfer voltage, the controller 30 (secondary transfer voltage storage/operation portion 31*f*) acquires an adjusting value ΔV depending on the adjusting value. As described later, this adjusting value ΔV is stored in the RAM 33 (or the secondary transfer voltage storage/operation portion 31*f*) in the case where the adjusting value is set by the operation in the adjustment mode. The controller 30 (secondary transfer voltage storage/operation portion 31*f*) acquires Vb+Vp+ΔV which is the sum of the above-described voltage values Vb, Vp and ΔV, as a secondary transfer voltage Vtr applied from the secondary transfer power source 76 to the outer secondary transfer roller 45*b* when the recording material S passes through the secondary transfer portion N2. Then, the controller 30 writes this Vtr (=Vb+Vp+ΔV) in the RAM 33 (or the secondary transfer voltage storage/operation portion 31*f*).

Here, the recording material part voltage Vp also changes depending on a surface property of the recording material S other than the information (thickness, basis weight or the like) relating to the electric resistance of the recording material S in some instances. For that reason, the table data may also be set so that the recording material part voltage Vp changes also depending on the information relating to the surface property of the recording material S. Further, in this embodiment, the information relating to the electric resistance of the recording material S (and in addition, the information relating to the surface property of the recording material S) are included in the job information acquired in S101. However, a measuring means for detecting the thickness of the recording material S and the surface property of the recording material S is provided in the image forming apparatus 1, and the recording material part voltage Vp may also be acquired on the basis of information acquired by this measuring means.

Next, the controller 30 (the image formation process portion 31*c*) controls the image forming portion to form the image and to send the recording material S to the secondary transfer portion N2 and controls the secondary transfer device to perform the secondary transfer by applying the secondary transfer voltage Vtr determined as described above (S107). Thereafter, the controller 30 (the image formation process portion 31*c*) repeats the processing of S107 until all the image in the job are transferred and completely outputted on the recording material S (S108).

Incidentally, also as regards the primary transfer portion N1, the ATVC similar to the above-described ATVC is carried out in a period from a start of the job until the toner image is fed to the primary transfer portion N1, but detailed description thereof will be omitted in this embodiment.

5. Outline of Adjustment Mode

Next, an operation in a simple adjustment mode (hereinafter simply referred to as an "adjustment mode") for setting the set voltage of the secondary transfer voltage will be described. Depending on the type and condition of the recording material S used in image formation, the water (moisture) content and electrical resistance value of the recording material S may differ greatly from the standard recording material S. In this case, there is a possibility that appropriate transfer cannot be performed with the set voltage of the secondary transfer voltage using the default recording material part voltage Vp set in advance as described above.

First, when the secondary transfer voltage is insufficient, the toner on the intermediary transfer belt 44*b* cannot be sufficiently transferred onto the recording material S, so that the image density lowers. For example, the case where a resistance value of the recording material S is higher than a value (corresponding to the recording material part voltage Vp) assumed for each paper kind category, or the case where the recording material S lowers in water content (dries) depending on a storage condition of the recording material S and thus an electric resistance value increases, would be considered. In such a case, it is desirable to increase (an absolute value of) the set voltage of the secondary transfer voltage by increasing the recording material part voltage Vp.

On the other hand, when the secondary transfer voltage is higher than necessary, abnormal (electric) discharge occurs and image defect is caused to occur, or electric charge of the toner is reversed by the influence of the discharge in the secondary transfer portion N2, and thus the transfer property lowers in some instances. For example, the case where the electric resistance value of the recording material S is lower than the value (corresponding to the recording material part voltage Vp) assumed for each paper kind category, or the case where the recording material S increases in water content (absolute moisture) depending on the storage condition and thus the electric resistance value increases, would be considered. In this case, it is desirable to decrease (an absolute value of) the set voltage of the secondary transfer voltage by reducing the recording material part voltage Vp.

Therefore, it is desired that the operator such as a user or a service person adjusts (changes) the recording material part voltage Vp depending on the recording material S actually used for image formation, for example, to optimize the setting voltage of the secondary transfer voltage during the execution of the job. In other words, it is only required that an optimum "recording material part voltage Vp+Vb (adjusting amount)" depending on the recording material S actually used for image formation is selected. This adjustment may be performed by the following method. For example, the operator outputs the images while switching the secondary transfer voltage for each recording material S. and confirms the presence or absence of an image defect occurring in the output image to obtain an optimal secondary transfer voltage, on the basis of which setting voltage (specifically. (recording material part voltage) Vp+(adjusting amount) ΔV) of the optimum secondary transfer voltage is determined. However, in this method, since the outputting operation of the image and the adjustment of the setting voltage of the secondary transfer voltage are repeated, the recording material S which is wasted increases, and it takes time in some instances.

Therefore, in this embodiment, the image forming apparatus 1 is capable of executing the operation in the adjustment mode in which the set voltage of the secondary transfer voltage is adjusted. In this operation in the adjustment mode, a chart on which a plurality of representative color patches (test images, test patterns, test toner images) are transferred and formed on the recording material S, while the secondary transfer voltage is switched for each of the patches, is formed. And, the set voltage of an optimum secondary transfer voltage (specifically, (recording material part voltage) Vp+(adjusting amount) ΔV) is determined on the basis of a result of reading of the outputted chart by the sensing unit 3. Particularly, in this embodiment, on the basis of brightness information (density information) of a solid path (solid image patch of an image which is a maximum toner coverage) on the chart, the adjusting amount ΔV (specifically, an adjusting value N corresponding thereto) recommended for optimizing a solid image density is presented. By this, necessity that the operator confirms the presence or absence of the image defect by eye observation is reduced, so that it becomes possible to appropriately adjust the set voltage to a set voltage of a more appropriate secondary transfer voltage while alleviating an operation load of the operator.

6. Chart

Next, the chart outputted in the operation in the adjustment mode in this embodiment will be described. In this embodiment, depending on a size of the recording material S used for outputting the chart, different charts are outputted. Incidentally, a length of the recording material S in the feeding direction of the recording material S is simply referred to as a "feeding direction length", and a length of the recording material S in a direction substantially perpendicular to the feeding direction of the recording material S is simply referred to as a "width". The feeding direction of the recording material S is substantially parallel to a sub-scan direction (surface movement direction of the photosensitive drum 51 and the intermediary transfer belt 44*b*), and the direction (herein, also referred to as a "widthwise direction") substantially perpendicular to the feeding direction of the recording material S is substantially parallel to a main scan direction (direction substantially perpendicular to the surface movement direction of the photosensitive drum 51 and the intermediary transfer belt 44*b*). Incidentally, also, as regards the chart, image data defining the chart, or patches formed on the chart, the above-described "feeding direction length" of the recording material S and the above-described length of the recording material S in the direction corresponding to the "width" are also simply referred to as the "feeding direction length" and the "width", respectively.

Figure 6:
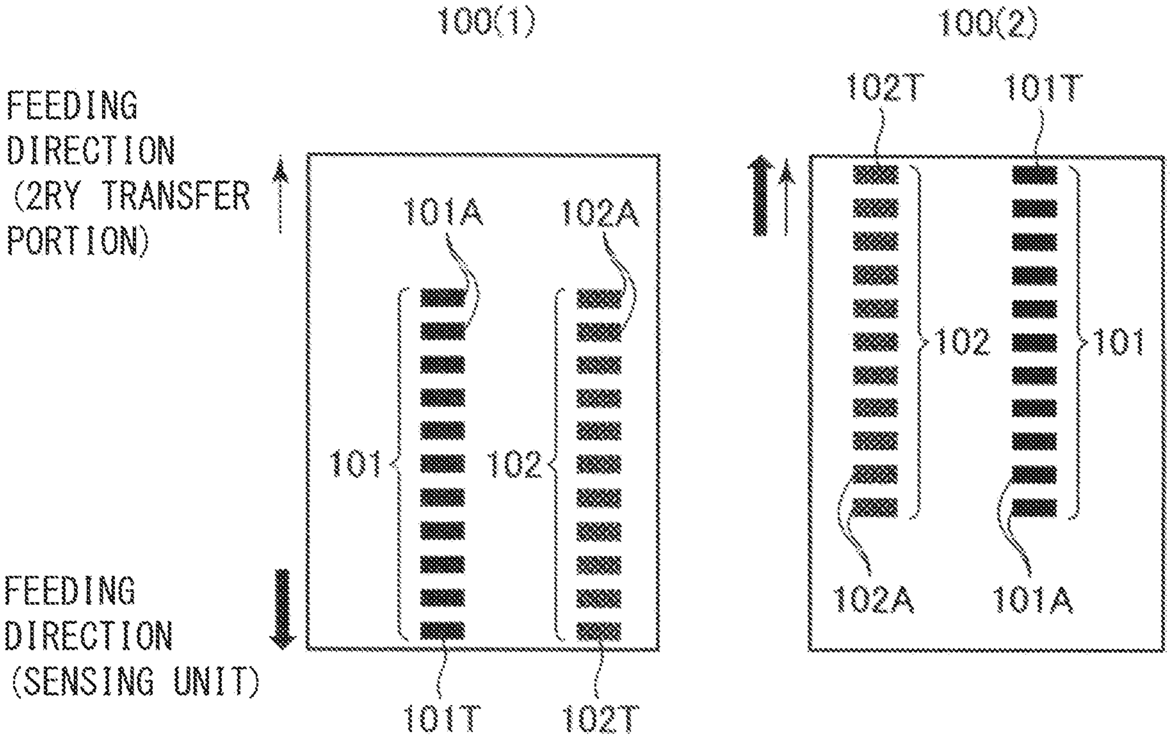
FIG. 6 includes schematic views each showing an L (large) chart outputted in an operation in an adjustment mode.

FIG. 6 is a schematic view showing a large chart (also referred to as an "L chart") 100 in the case where a length in the feeding direction of the recording material S is 420 mm (long side of A3-size sheet) or more and a width of the recording material S is 279.4 mm (long side of LTR-size sheet) or more.

Figure 7:
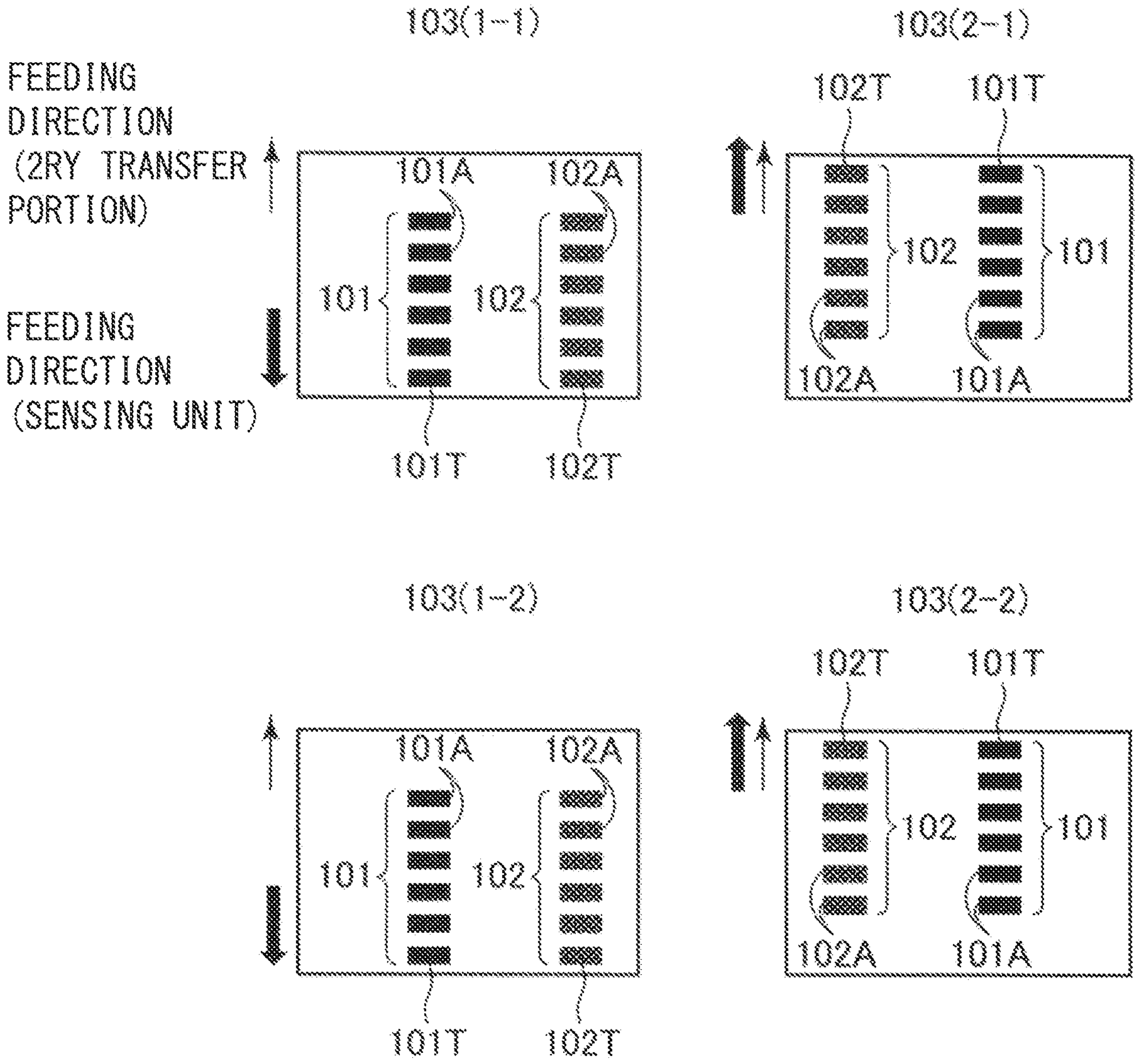
FIG. 7 includes schematic views each showing an S (small) chart outputted in the operation in the adjustment mode.

Large chart data (also referred to as an "L chart data" which is image data defining the L chart 100 corresponds to the maximum sheet passing size. An image size of the L chart data is approx. 13 inches (nearly equal to 330 mm) (width)×19.2 inches (nearly equal to 487 mm) (feeding direction length). An L chart 100 corresponding to image data cut out from this L chart data is outputted according to the size of the recording material S. At this time, the image data is cut out from the L chart data in accordance with the size of the recording material S based on a leading end with respect to a reading direction and a center with respect to the widthwise direction. FIG. 7 shows the case where the size of the recording material S is an A3 size (short edge feeding). For example, in the case where the recording material S used for outputting the L chart 100 is the A3 size (short edge feeding) (width: 297 mm×feeding direction length: 420 mm), the image data having a size of 292 mm (width)×415 mm (feeding direction length) is cut out from the L chart data. And, the image corresponding to the cut-out image data is formed on an A3-size recording material S (short edge feeding) with a margin of 2.5 mm at each end portion on the basis of the leading end with respect to the reading direction and on the center with respect to the widthwise direction. Incidentally, this margin is typically about 2-10 mm.

On the L chart 100, solid blue (B) patches 101 and solid black (Bk) patches 102 are arranged in the widthwise direction, and 11 sets of these patches in total are arranged in the feeding direction of the recording material S. Further, a large chart 100(1) shown in FIG. 6 shows the first side of the recording material S, and a large chart 100(2) shown in FIG. 6 corresponds to the second side of the recording material S. The second side passes through the secondary transfer portion N2 and then passes through an inside of the sensing unit 3 with no change in direction, but the first side once passes through the reverse feeding portion. For that reason, the first side is different in direction between when it passes through the secondary transfer portion N2 and when it passes through the inside of the sensing unit 3. In FIG. 6, the feeding direction of the chart when it passes through the secondary transfer portion N2 is indicated by a thin arrow, and the feeding direction of the chart when it passes through the inside of the sensing unit 3 is indicated by a thick arrow. In this embodiment, a leading end patch of the solid B patches 101 and a leading end patch of the solid Bk patches 102 when the chart passes through the inside of the sensing unit 3 are patches 101T and 102T, respectively (in this case, these patches are also referred to as "trigger patches") for detecting positional information. The trigger patches 101T and 102T are used for accurately detecting positions of a patch line (array) when they are read by the first and second line sensors 91 and 92. Of the solid B patches 101 and the solid Bk patches 102, remaining 10 patches each thereof excluding the trigger patches 101T and 102T are patches for acquiring brightness information (density information) (herein, referred to as "adjusting patches") 101A and 102A. The adjusting patches 101A and 102A are transferred onto the recording material S under application of different secondary transfer voltages Vtr.

In this embodiment, a size of each of the patches (adjusting patches, trigger patches) is 15 mm (feeding direction length)×40 mm (width), and the solid B patches 101 and the solid Bk patches 102 are arranged with an interval of 15 mm between two adjacent patches thereof in the feeding direction of the recording material S. In FIG. 6, the feeding direction of the chart when it passes through the secondary transfer portion N2 is indicated by a thin arrow, and the feeding direction of the chart when it passes through the inside of the sensing unit 3 is indicated by a thick arrow. In this embodiment, a leading end patch of the solid B patches 101 and a leading end patch of the solid Bk patches 102 when the chart passes through the inside of the sensing unit 3 are patches 101T and 102T, respectively (in this case, these patches are also referred to as "trigger patches") for detecting positional information. As regards the size of each of the patches (particularly the adjusting patches) in the case where reading thereof by the first and second line sensors 91 and 92 is taken into consideration, when the size is excessively small, a variation in reading result is increased by the influence of texture non-uniformity (unevenness or the like due to fibers of paper) of the recording material S. For this reason, the size of each patch (particularly the adjusting patch) may desirably be large to some extent and may desirably be 600 $mm^2$ or more. However, when each patch size is excessively large, the number of the secondary transfer voltage Vtr changeable in the chart becomes small. In this embodiment, in the L chart, the patch size is such that the secondary transfer voltage Vtr can be changed at about 10 levels. Further, the patch interval with respect to the feeding direction is set so as to permit switching of the secondary transfer voltage, and may desirably be 15 mm or more.

Further, on the first side 100(1) and the second side 100(2) of the L chart 100, the solid B patches 101 and the solid Bk patches 102 are arranged so as not overlap with each other between the front side and the back side of the recording material S. This is because as specifically described later, when these patches are read by the first and second line sensors 91 and 92, the influence of the set-off on detected brightness is avoided.

FIG. 7 is a schematic view showing a small chart (also referred to as an "S chart") 103 in the case where a length in the feeding direction of the recording material S is 210 mm (short side of A4-size sheet) or more and less than 420 mm (long side of A3-size sheet), and a width of the recording material S is 160 mm or more.

Small chart data (also referred to as "S chart data"), which is image data defining the S chart 103, corresponds to half of the maximum sheet passing size. An image size of the L chart data is approx. 13 inches (nearly equal to 330 mm) (width)×9.6 inches (nearly equal to 243 mm) (feeding direction length). In the case where the size of the recording material S is an A4 size (long edge feeding) or an LTR size (long edge feeding), an S chart 100 corresponding to image data cut out from this L chart data is outputted according to the size of the recording material S. At this time, the image data is cut out from the S chart data in accordance with the size of the recording material S based on a leading end with respect to a reading direction and a center with respect to the widthwise direction. FIG. 7 shows the case where the size of the recording material S is an A4 size (long edge feeding). For example, in the case where the recording material S used for outputting the S chart 103 is the A4 size (long edge feeding) (width: 210 mm×width length: 297 mm), the image data having a size of 205 mm (feeding direction length)×292 mm (width) is cut out from the L chart data. And, the image corresponding to the cut-out image data is formed on an A4-size recording material S (long edge feeding) with a margin of 2.5 mm at each end portion on the basis of the leading end with respect to the reading direction and on the center with respect to the widthwise direction. Incidentally, this margin is typically about 2-10 mm.

On the L chart 100, solid blue (B) patches 101 and solid black (Bk) patches 102 are arranged in the widthwise direction over two recording materials S, and 12 sets of these patches in total are arranged in the feeding direction of the recording material S over the two recording materials S. In the S chart 103, the two recording material S are used for forming the chart, so that the same patch number as the patch number of the L chart is ensured and thus similar adjustment can be performed. In the S chart 103 shown in FIG. 7, a chart 103(1-1) shows a first side of a first sheet, a chart 103(1-2) shows a first side of a second sheet, a chart 103(2-1) shows a second side of the first sheet, and a chart 103(2-2) shows a second side of the second sheet. The second side passes through the secondary transfer portion N2 and then passes through an inside of the sensing unit 3 with no change in direction, but the first side once passes through the reverse feeding portion. For that reason, the first side is different in direction between when it passes through the secondary transfer portion N2 and when it passes through the inside of the sensing unit 3. In FIG. 6, the feeding direction of the chart when it passes through the secondary transfer portion N2 is indicated by a thin arrow, and the feeding direction of the chart when it passes through the inside of the sensing unit 3 is indicated by a thick arrow. In this embodiment, a leading end patch of the solid B patches 101 and a leading end patch of the solid Bk patches 102 when the chart passes through the inside of the sensing unit 3 are patches 101T and 102T, respectively (in this case, these patches are also referred to as "trigger patches") for detecting positional information. The trigger patches 101T and 102T are used for accurately detecting positions of a patch line (array) when they are read by the first and second line sensors 91 and 92. Of the solid B patches 101 and the solid Bk patches 102, remaining 10 patches each thereof excluding the trigger patches 101T and 102T are adjusting patches 101A and 102A for acquiring brightness information (density information). The adjusting patches 101A and 102A are transferred onto the recording material S under application of different secondary transfer voltages Vtr.

As described above, in this embodiment, a size of each of the patches (adjusting patches, trigger patches) is 15 mm (feeding direction length)×40 mm (width), and the solid B patches 101 and the solid Bk patches 102 are arranged with an interval of 15 mm between two adjacent patches thereof in the feeding direction of the recording material S. In FIG. 7, the feeding direction of the chart when it passes through the secondary transfer portion N2 is indicated by a thin arrow, and the feeding direction of the chart when it passes through the inside of the sensing unit 3 is indicated by a thick arrow. In this embodiment, with respect to the patches formed on a single side of the recording material S, a leading end patch of the solid B patches 101 and a leading end patch of the solid Bk patches 102 when the chart passes through the inside of the sensing unit 3 are trigger patches 101T and 102T, respectively, for detecting positional information.

Further, on the first sides 103(1-1) and 103(1-2) and the second sides 103(2-1) and 103(2-2) of the S chart 103, the solid B patches 101 and the solid Bk patches 102 are arranged so as not overlap with each other between the front side and the back side of the recording material S. This is because as specifically described later, when these patches are read by the first and second line sensors 91 and 92, the influence of the set-off on detected brightness is avoided.

Figure 8:
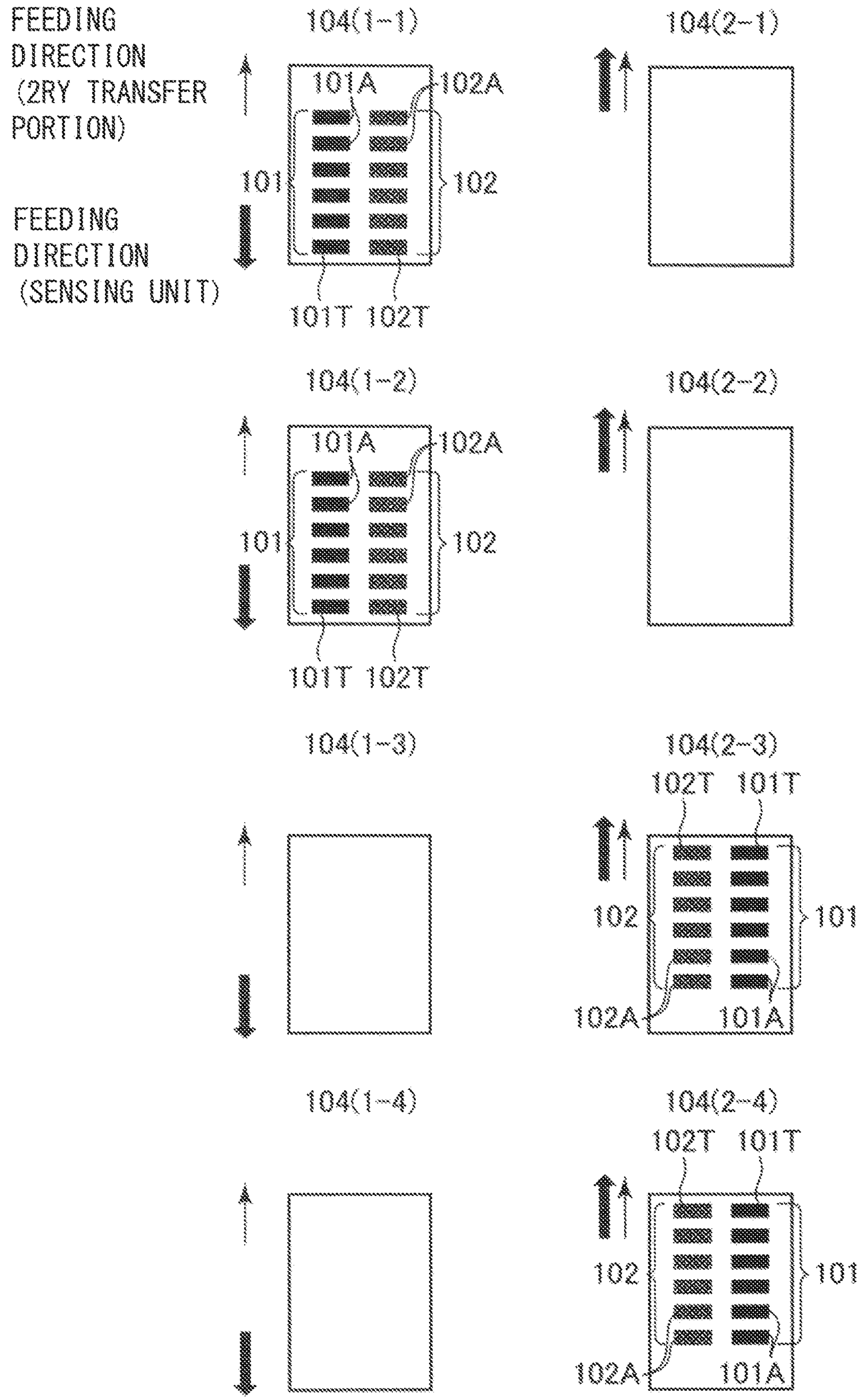
FIG. 8 includes schematic views each showing an R chart outputted in the operation in the adjustment mode.

FIG. 8 is a schematic view showing a small size short edge feeding chart (also referred to as an "R chart") 104 in the case where a length in the feeding direction of the recording material S is 210 mm (short side of A4-size sheet) or more and less than 420 mm (long side of A3-size sheet), and a width of the recording material S is 139.7 mm (short side of STMT-size sheet) or more and less than 160 mm.

R chart data, which is image data defining the R chart 104, corresponds to half of the maximum sheet passing size similarly as in the S chart data. An image size of the S chart data is approx. 13 inches (nearly equal to 330 mm) (width)×9.6 inches (nearly equal to 243 mm) (feeding direction length). In the case where the size of the recording material S is A5R (148.5 mm (width)×210 mm (feeding direction length)) or STMTR (139.7 mm (width)×215.9 mm (feeding direction length)), an R chart 104 corresponding to image data cut out from this R chart data is outputted according to the size of the recording material S. At this time, the image data is cut out from the R chart data in accordance with the size of the recording material S based on a leading end with respect to a reading direction and a center with respect to the widthwise direction. FIG. 8 shows the case where the size of the recording material S is an 5R size. For example, in the case where the recording material S used for outputting the R chart 104 is the A5 size (short edge feeding) (width: 148.5 mm×feeding direction length: 210 mm), the image data having a size of 148.5 mm (width)×210 mm (feeding direction length) is cut out from the R chart data. And, the image corresponding to the cut-out image data is formed on an A5-size recording material S (short edge feeding) with a margin of 2.5 mm at each end portion on the basis of the leading end with respect to the reading direction and on the center with respect to the widthwise direction. Incidentally, this margin is typically about 2-10 mm.

On the R chart 100, solid blue (B) patches 101 and solid black (Bk) patches 102 are arranged in the widthwise direction over two recording materials S, and 12 sets of these patches in total are arranged in the feeding direction of the recording material S over the two recording materials S. In the R chart 104, with respect to the chart on a single side of the recording material S, similarly as in the case of the S chart 103, the two recording materials S are used for forming the chart, so that the same patch number as the patch number of the L chart is ensured and thus similar adjustment can be performed. In the R chart 104 shown in FIG. 8, a chart 104(1-1) shows a first side of a first sheet, a chart 104(2-1) shows a second side of the first sheet, a chart 104(1-2) shows a first side of the second sheet, a chart 104(2-2) shows a second side of the second sheet, a chart 104(1-3) shows a first side of a third sheet, a chart 104(2-3) shows a second side of the third sheet, a chart 104(1-4) shows a first side of a fourth sheet, and a chart 104(2-4) shows a second side of the fourth sheet. The second side passes through the secondary transfer portion N2 and then passes through an inside of the sensing unit 3 with no change in direction, but the first side once passes through the reverse feeding portion. For that reason, the first side is different in direction between when it passes through the secondary transfer portion N2 and when it passes through the inside of the sensing unit 3. In FIG. 8, the feeding direction of the chart when it passes through the secondary transfer portion N2 is indicated by a thin arrow, and the feeding direction of the chart when it passes through the inside of the sensing unit 3 is indicated by a thick arrow. In this embodiment, with respect to the patches formed on a single side of the recording material S, a leading end patch of the solid B patches 101 and a leading end patch of the solid Bk patches 102 when the chart passes through the inside of the sensing unit 3 are trigger patches 101T and 102T, respectively, for acquiring positional formation. The trigger patches 101T and 102T are used for accurately detecting positions of a patch line (array) when they are read by the first and second line sensors 91 and 92. Of the solid B patches 101 and the solid Bk patches 102, remaining 10 patches each thereof excluding the trigger patches 101T and 102T are patches 101A and 102A for acquiring brightness information (density information). The adjusting patches 101A and 102A are transferred onto the recording material S under application of different secondary transfer voltages Vtr.

As described above, in this embodiment, a size of each of the patches (adjusting patches, trigger patches) is 15 mm (feeding direction length)×40 mm (width), and the solid B patches 101 and the solid Bk patches 102 are arranged with an interval of 15 mm between two adjacent patches thereof in the feeding direction of the recording material S.

Thus, in the R chart 104, on the first side of the recording material S on which the patches are formed on the second side, the patches are not formed and a blank state is maintained. Further, on the second side of the recording material S on which the patches are formed on the first side, the patches are not formed and a blank state is maintained. This is because a margin portion excluding the patches becomes small in the recording material S with a narrow width, and different from the L chart 100 and the S chart 103, it becomes difficult to arrange the patches that do not overlap with each other on the front side and the back side. When the patches overlap with each other on the front side and the back side, there is a possibility that accurate brightness detection cannot be performed by the influence of the first-side patches on detected brightness of the second-side patches due to the set-off and by the influence of the second-side patches on detected brightness of the first-side patches due to the set-off. For that reason, in order to more accurately detect the brightness, as regards the recording material S having a size such that there is a possibility that the patches overlap with each other between the front side and the back side, the first-side patches and the second-side patches are transferred onto separate recording materials S.

There is a tendency that this influence of the set-off on the detected brightness becomes conspicuous particularly on the recording material S with a small basis weight. For example, there is a tendency that the influence of the set-off on the detected brightness becomes conspicuous on the recording material S with a basis weight of 150 $g/m^2$ or less. Further, as the thickness of the recording material S becomes thinner (smaller), the influence thereof becomes more conspicuous.

Further, in this embodiment, as regards the second side of the recording material S on which the patches are formed on the first side, the blank state is maintained, and the recording material S is subjected to the image forming operation of the double-side printing and then is outputted. By this, the brightness of the patches after the patches formed on the first side pass through the fixing device 46 twice is detected, so that a surface state of the toner image which is the same as the toner image during actual double-side printing is detected and thus a more appropriate adjusting value can be selected.

Whether or not the patches overlap with each other between the front side and the back side is determined by a relationship between the width of the patches, the number of arrangement of the patches with respect to the width direction, and the width of the recording material S. When the number of arrangement of the patches is N and the width of the patches is L, in the case where the width of the recording material S is narrower than N×L×2, the patches cannot be disposed so that the patches do not overlap with each other. For that reason, at least in the case where the chart is outputted by using the recording material S with a width narrower than N×L×2, the first-side patches and the second-side patches are transferred onto separate recording materials S. In this embodiment, the patch width L is 40 mm and the number of arrangement of the patches is 2, and therefore, in the case where the chart is outputted by using the recording material S with the width of 160 mm or less, the R chart 104 is outputted. Incidentally, even when the recording material S with a width of N×L×2 or more is used, in the case where the patches overlap with each other between the front side and the back side depending on a patch arrangement position or the like, the first-side patches and the second-side patches may be transferred onto separate recording materials S.

Here, it is preferable to prevent patches from being formed in the neighborhood of the leading and trailing ends of the recording material S in the process advance direction (for example, in the range of about 20 mm inward from the edge). This is because there may be an image defect that occurs only at the leading end or the trailing end in some instances, and there is a possibility that it is hard to determine whether or not such an image defect has occurred due to the secondary transfer voltage.

In this embodiment, the size of the recording material S usable for outputting the chart is 210 mm (short side of A4 size) or more in length with respect to the feeding direction and is 139.7 mm (short side of STMT size) or more in width. However, the size of the recording material S usable for outputting the chart is not limited to those in this embodiment, but may be appropriately set depending on the maximum sheet passing size or the like of the image forming apparatus 1. Further, not only recording materials S of regular sizes but also recording materials S of arbitrary sizes may be made usable by designation thereof through input from the operating portion 70 or the external device 200 by the operator.

Further, in this embodiment, in the case where adjustment of only the secondary transfer voltage during one-side printing (herein, also referred to as "one-side adjustment") is performed, the following operation is carried out. In the case where the L chart 100 is outputted, in the image forming operation of the one-side printing, the chart of 100(2) in FIG. 6 is formed and outputted on a first side of a single recording material S. Further, in the case where the S chart 103 is outputted, in the image forming operation of the one-side printing, the chart of 103(2-1) and the chart of 103(2-2) in FIG. 7 are formed and outputted on a first side of a first recording material S and a first side of a second recording material S, respectively. Further, in the case where the R chart 104 is outputted, in the image forming operation of the one-side printing, the chart of 104(2-3) and the chart of 104(3-4) in FIG. 8 are formed and outputted on a first side of a first recording material S and a first side of a second recording material S, respectively. That is, the chart for a second side in the case where adjustment of the secondary transfer voltages for the first side and the second side during the double-side printing (herein, also referred to as "double-side adjustment") is performed is outputted without being passed through the reverse feeding path 7. Further, reading of the chart is made by using the second line sensor 92 of the sensing unit 3. By this, a direction of the read image is not changed from the direction during the double-side adjustment and the recording material S does not pass through the reverse feeding path 7, so that the one-side adjustment can be executed while minimizing a downtime (time when the image cannot be outputted for adjustment or the like). Incidentally, an adjustment result for the first side during the double-side printing can be used for setting the secondary transfer voltage during the one-side printing.

Further, design of the chart is not limited to those in this embodiment. For example, the adjusting patches are not limited to the solid B image and the solid Bk image. The adjusting patches may be, for example, either one of the solid B image and the solid Bk image, or may be another single-color solid image, another solid image of mixed color such as a secondary color or a multiple-order color consisting of three or more colors, or a half-tone image. Further, for example, a shape and the number of the adjusting patches may be changed depending on the size, a reading type, or the like of the recording material S which meets the output of the chart. Further, the shape and the like of the trigger patches are not limited to those in this embodiment. Further, depending on the reading type of the chart, the trigger patches are not necessarily needed.

Further, for example, on assumption that the operator checks information by eyes, as identification (discrimination) information indicating setting of the secondary transfer voltage when the respective patches are transferred onto the recording material S, information such as a patch number described later may be printed in association with the patches of each set with respect to the feeding direction of the recording material S. Further, for example, on assumption that the operator checks information by eyes, as identification information indicating whether the chart is the adjusting chart for the first side or the adjusting chart for the second side, information such as the front side (first side) or the back side (second side) may be printed on a corresponding side.

7. Operation of Adjustment Mode

Figure 9:
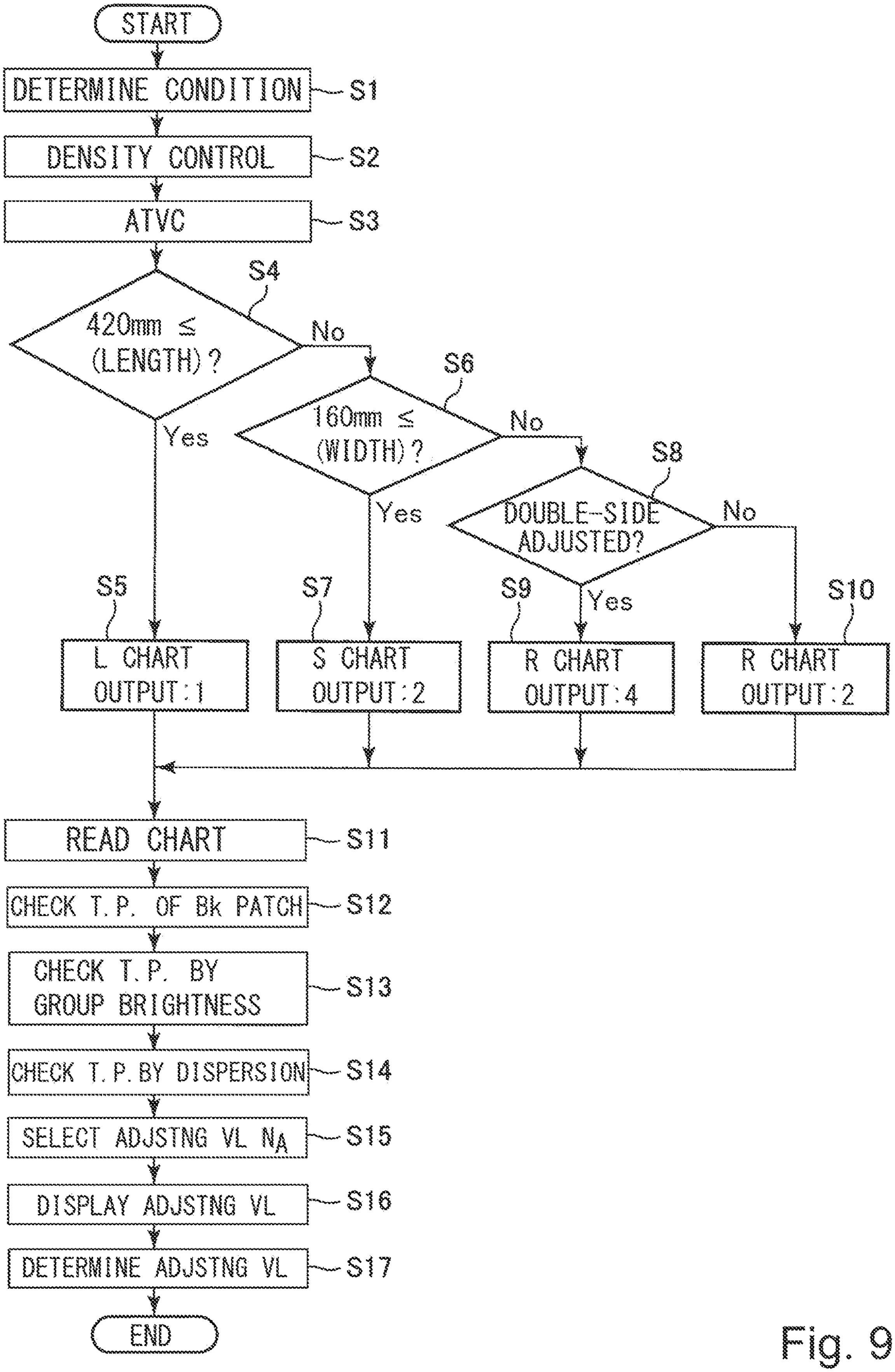
FIG. 9 is a flowchart showing an outline of a procedure of the operation in the adjustment mode.

Next, the operation in the adjustment mode in this embodiment will be described. FIG. 9 is a flowchart showing an outline of procedure of the operation in the adjustment mode in this embodiment. In this embodiment, the case where the operator causes the image forming apparatus 1 to execute the operation in the adjustment mode via the operating portion 70 of the image forming apparatus 1 will be described. A function of the operating portion 70 for causing the image forming apparatus 1 to execute the operation in the adjustment mode may also be performed by the external device 200 such as a personal computer, for example. Further, in the following description, symbols shown below will be used.

N: adjusting value (=−20 to +20)

$N_0$: present adjusting value (before execution of operation in adjustment mode)

NA: selected adjusting value n: adjusting patch number (n=1 to 10 from small adjusting value)

n0: patch number corresponding to present adjusting value (corresponding to adjusting value $N_0$)

nA: selected patch number (corresponding to adjusting value NA)

T: symbol indicating trigger patch

Figure 10:
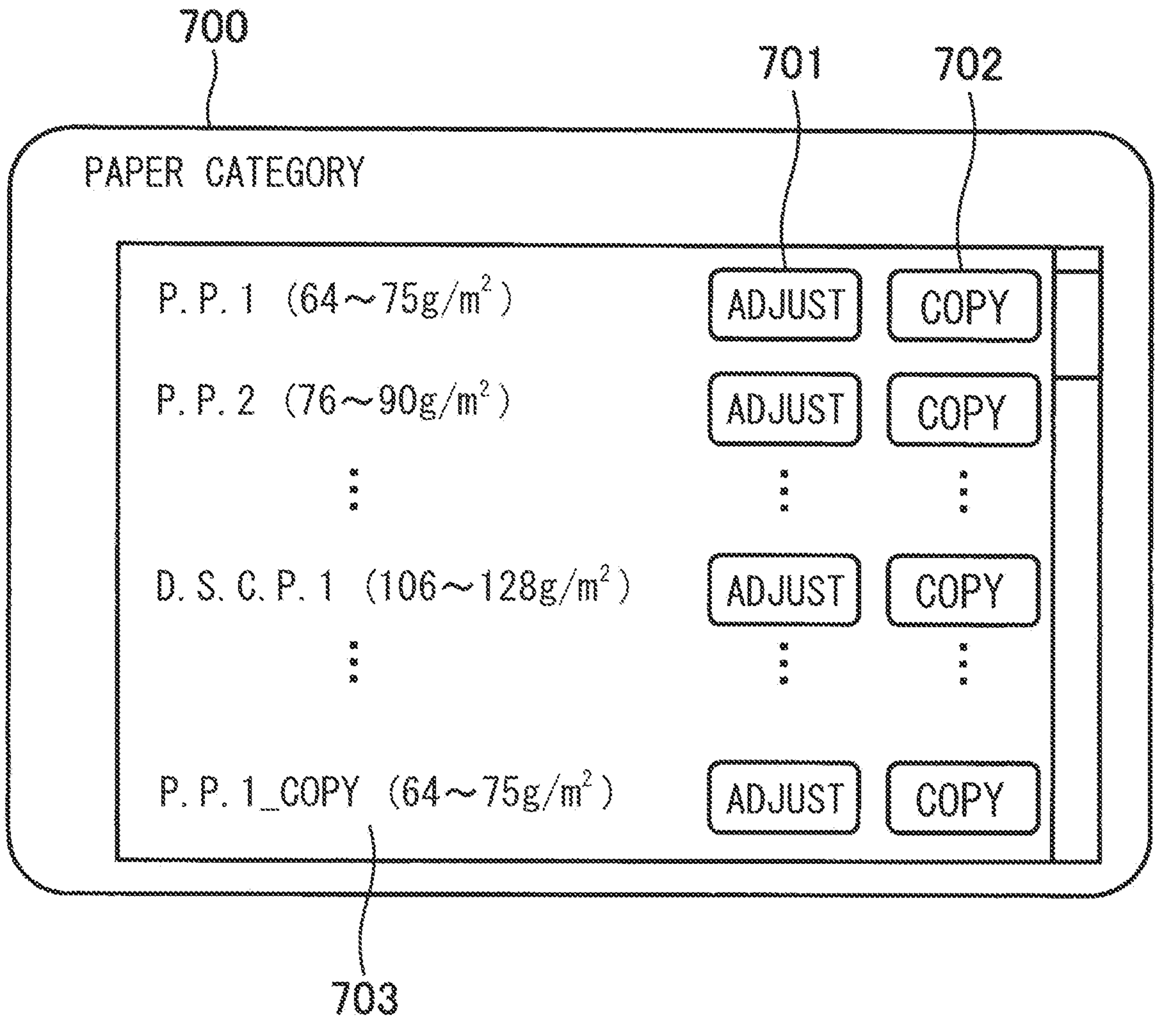
FIG. 10 is a schematic view of a paper kind category selecting screen.

First, the controller 3 (adjustment process portion 31*d*) acquires information of the recording material S (size and paper kind category of the recording material S) and information of an adjusting condition which are inputted by and intended to be adjusted by the operator (S1). FIG. 10 is a schematic view of a paper kind category selecting screen 700 displayed at the display portion 70*a* of the operating portion 70 through control by the controller (adjustment process portion 31*d*) in S1. On the paper kind category selecting screen 700, paper kind categories of the recording materials S settable in the image forming apparatus 2 are displayed. The operator presses (operates) an adjusting button 701, so that the sequence can go to the operation in the adjustment mode in which the set voltage of the secondary transfer voltage is adjusted.

Incidentally, in the paper kind category selecting screen 700, the operator may have access to changing screens not only for adjusting the secondary transfer voltage but also for other image forming conditions such as a fixing condition. Further, in order to leave default setting of each of the paper kind categories as it is, the paper kind category is copied in the RAM 33 or the ROM 32 by a copy button 702, and then the operation in the adjustment mode may also be enabled. The copied paper kind category 703 is stored in another image in the RAM 33 or the ROM 32, and then, as regards the paper kind category 703, the image is formed in the default setting except for a condition in which the setting is changed.

Figure 11:
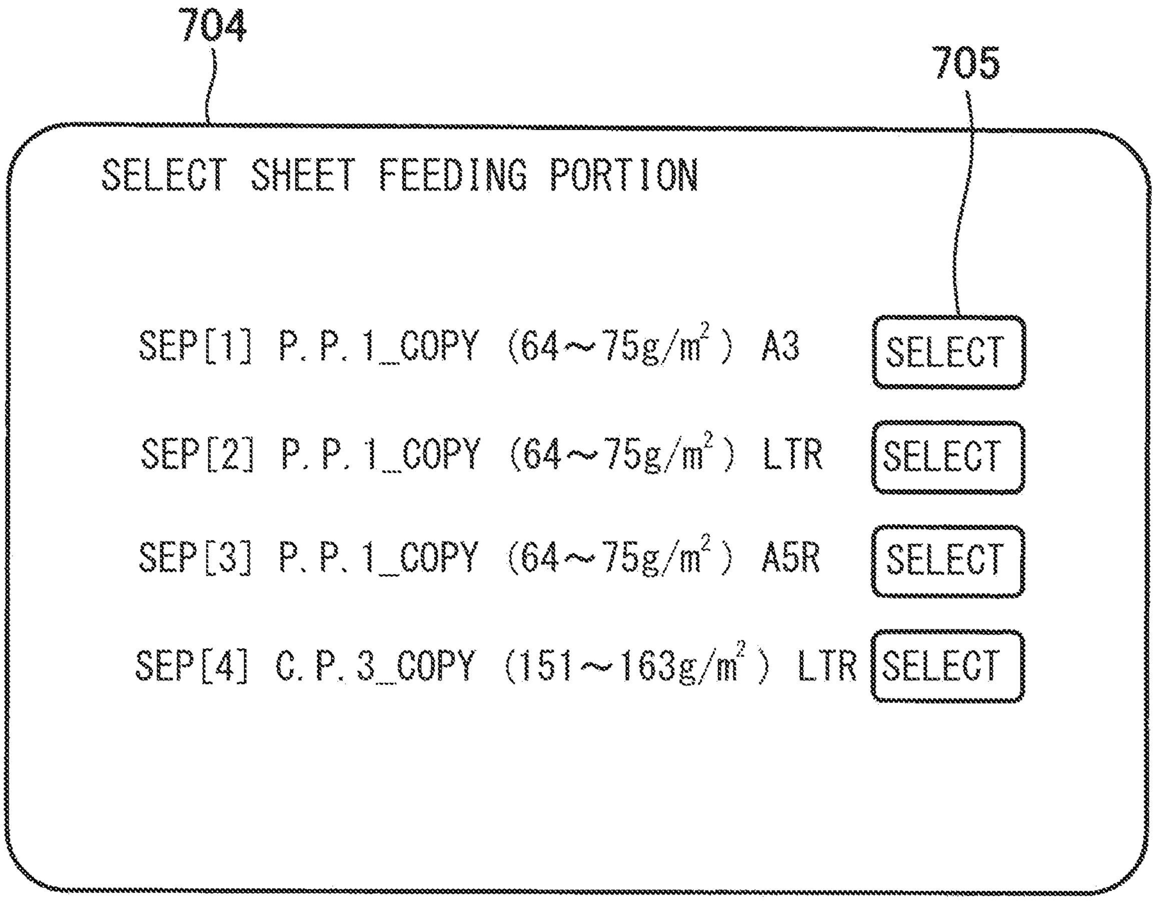
FIG. 11 is a schematic view of a sheet feeding portion selecting screen.

FIG. 11 is a schematic view of a sheet feeding portion selecting screen 704 displayed at the display portion 70*a* of the operating portion 70 through control by the controller 30 (adjustment process portion 31*d*) in S1. When the paper kind category of the recording material S subjected to execution of the operation in the adjustment mode is selected, the sheet feeding portion selecting screen 704 shown in FIG. 11 is displayed. On the sheet feeding portion selecting screen 704, the paper kind categories of the recording materials S accommodated in the sheet feeding portions 4 set through the operating portion 70 or the like in advance by the operator and sizes detected by a recording material size detecting sensor (not shown) provided in each of the sheet feeding portions 4 are displayed. For example, the case where "Plain paper 1_copy (P.P.I. COPY) (64-75 g/$m^2$)" is selected and the operation in the adjustment mode is executed will be described.

In the example shown in FIG. 11, the same "P.P.I. COPY (64-75 g/$m^2$)" is stored in a plurality of sheet feeding portions (sheet feeding portion [1], sheet feeding portion [2], and sheet feeding portion [3]).

Further, in the case of sizes of the recording materials S capable of meeting the operation in the adjustment mode, the operator is capable of pushing (operating) a selection button 705. In the case of the paper kind category and the paper size which do not meet the operation in the adjustment mode, the selection button 705 is displayed in a gray-out state, and thus the operator may be made not to press (operate) the selection button 705. Further, in the case where the recording material S for executing the operation in the adjustment mode is not stored in either one of the sheet feeding portions 4 or in the like case, by a return(ing) button (not shown) or the like, the operator may be capable of getting out of the sheet feeding portion selecting screen 704 once.

Figure 12:
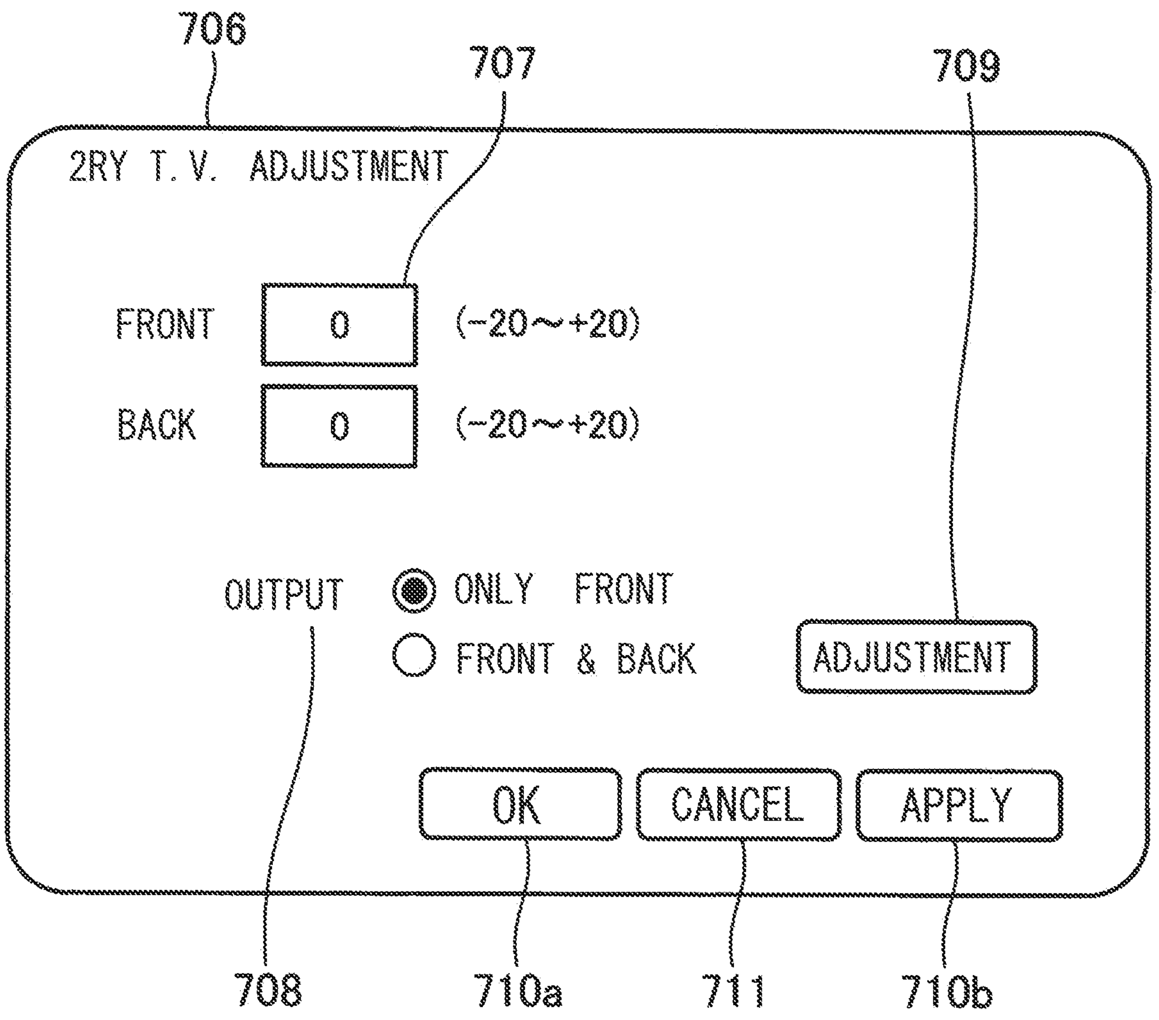
FIG. 12 is a schematic view of a secondary transfer voltage adjusting screen.

FIG. 12 is a schematic view of a secondary transfer voltage adjusting screen 706 displayed at the display portion 70*a* of the operating portion 70 by control of the controller 30 (adjusting process portion 31*d*) in S1. When the paper kind category of the recording material S for executing the operation in the adjustment mode is selected and the sheet feeding portion 4 in which the recording material S is stored is selected, the secondary transfer voltage adjusting screen 706 is displayed. The secondary transfer voltage adjusting screen 706 includes an adjusting value display portion 707 on which a present adjusting value is displayed, a one-side/double-side (printing) selecting portion 708 for selecting whether an execution object of the operation in the adjustment mode is one side or double (both) sides, an adjustment execution button 709 for starting formation of the chart, and the like. A value is inputted to the adjusting value display portion 707, whereby the secondary transfer is enabled in a state in which with respect to the corresponding paper kind category, the recording material part voltage is offset from a default recording material part voltage Vp stored in the ROM 32. In this embodiment, in the adjusting value display portion 707, an integer value from −20 to +20 is capable of being inputted as an adjusting value N, and a default thereof is 0. In the case where the adjusting value N is 0, the default recording material part voltage Vp corresponding to the paper kind category stored in the ROM 32 is used as it is. As regards the value (adjusting value N) at the adjusting value display portion 707, $\Delta N=1$ is caused to correspond to $\Delta V=150$ V (that is, when the adjusting value N is changed by 1, an adjusting value $\Delta V$ changes by 150 V). For example, in the case where $N=-5$ is inputted to the adjusting value display portion 707, as the recording material part voltage, a value obtained by offsetting the default recording material part voltage Vp by −750 V ($=-5\times150$) is used. In the case where the operator executes the operation in the adjustment mode, the operator selects whether to perform the double-side printing or the one-side printing at the one side/double side selecting portion 708 and then presses (operates) the adjustment execution button 709.

When the adjustment execution button 709 is pressed (operated), the controller 30 (adjusting process portion 31*d*) executes density correction control (S2). The density correction control is carried out for forming a state in which before the secondary transfer voltage is adjusted, the toner in a proper toner amount is placed on the intermediary transfer belt 44*b*. The controller 30 (adjusting process portion 31*d*) forms toner patches for density correction control while changing outputs of the charging power source 73, the developing power source 74, the exposure device 42, and the like, and carries out control so that the toner patches are primary-transferred onto the intermediary transfer belt 44*b*. Then, the controller 30 (adjusting process portion 31*d*) determines an image forming condition during output of the chart by measuring a toner amount of the toner patches, formed on the intermediary transfer belt 40*b*, by a patch detecting sensor (not shown). Incidentally, the density correction control is not necessarily required to be executed every execution of the operation in the adjustment mode. For example, on the basis of the number of times of image formation, a change in environment, or an elapsed time from the last execution of the density correction control, the controller 30 (adjusting process portion 31*d*) may discriminate whether or not the density correction control is executed.

Thereafter, the controller 30 (adjusting process portion 31*d*, ATVC process portion 31*b*) executes ATVC (S3). Details of the ATVC are as described above.

Thereafter, the controller 30 (adjusting process portion 31*d*) executes the output of the chart (S4 to S10). At this time, the controller 30 (adjusting process portion 31*d*) selects a chart depending on a size of the recording material S and operations outputs the selected chart. First, the controller 30 (adjusting process portion 31*d*) discriminates whether or not the feeding direction length of the recording material S is 420 mm or more (S4). In the case where the controller 30 (adjusting process portion 31*d*) discriminated in S4 that the feeding direction length is 420 mm or more ("Yes"), the controller 30 carries out control so that a single L chart 100 of FIG. 6 is outputted (S5). Incidentally, at this time, depending on whether the adjustment is one-side adjustment or the double-side adjustment, the controller 30 (adjusting process portion 31*d*) carries out control so that the chart is formed on the one side or the two sides and then is outputted as described above. Further, in the case where the controller 30 (adjusting process portion 31*d*) discriminated in S4 that the feeding direction length is less than 420 mm ("No"), the controller 30 discriminates whether or not the width of the recording material S is 160 mm or more (S6). In the case where the controller 30 (adjusting process portion 31*d*) discriminated in S6 that the width of the recording material S is 160 mm or more ("Yes"), the controller 30 carries out control so that two S charts of FIG. 7 are outputted (S7). Incidentally, at this time, depending on whether the adjustment is the one-side adjustment or the double-side adjustment, the controller 30 (adjusting process portion 31*d*) carries out control so that the charts are formed on the one side or the two sides and then are outputted as described above. Further, in the case where the controller 30 (adjusting process portion 31*d*) discriminated in S6 that the width of the recording material S is less than 160 mm ("No"), the controller 30 discriminates whether or not the adjustment is the double-side adjustment (S8). In the case where the controller 30 (adjusting process portion 31*d*) discriminated in S8 that the adjustment is the double-side adjustment ("Yes"), the controller 30 carries out control so that four R charts of FIG. 8 are outputted in the image forming operation of the double-side printing (S9). Further, in the case where the controller 30 (adjusting process portion 31*d*) discriminated in S8 that the adjustment is the one-side adjustment ("No"), the controller 30 carries out control so that the two R charts of 103(2-3) and 104(2-4) of FIG. 8 are outputted by the image forming operation of the one-side printing (S10).

Parts (a) and (b) of FIG. 12 are graphs each showing progression of output of the secondary transfer power source 76 when the chart of the case of the L chart 100 is secondary-transferred onto the recording material S. Part (a) of FIG. 13 shows the case of the first side during the double-side adjustment, and part (b) of FIG. 13 shows the case of the second side during the double-side adjustment. In the case of the first side, 10 adjusting patches 101A and 10 adjusting patches 102A are continuously secondary-transferred onto the recording material S and then the trigger patches 101T and 102T are secondary-transferred onto the recording material S. The adjusting patches 101A and the adjusting patches 102A are arranged so that the adjusting values N thereof increase from the lowest adjusting value N. Further, as regards the patch numbers of the adjusting patches 101A and 102A, the patch-number corresponding to the smallest adjusting value N is referred to as n=1 and the patch number corresponding to the largest adjusting value N is referred to as n=10, and these numbers increase correspondingly to an increase in adjusting value. Further, in the case of the first side, as the secondary transfer voltage part voltage Vp, a value for the first side in the table stored in the ROM 32 is used. A switching timing of the secondary transfer voltage when the chart is secondary-transferred onto the recording material S is after passing of the patches 101 and 102 through the secondary transfer portion N2. There is some time lag for switching the output of the secondary transfer power source 76, but the switching is made at the above-described timing, whereby the current of the secondary transfer power source 76 is switched in the margin portion between the patches. In the case of the second side, the arrangement between (the adjusting patches 101A and 102A) and (the trigger patches 101T and 102T) is reversed from the arrangement in the case of the first side, and as regards the recording material part voltage Vp, a table stored for the second side in the ROM 32 is used. However, switching of the secondary transfer voltage and other operations are carried out similarly as in the case of the first side.

In this embodiment, a change range ΔV (801 in FIG. 13) (one-level (stage) change range) of the secondary transfer voltage when the chart is secondary-transferred onto the recording material S is switched depending on the secondary transfer portion part voltage Vb. In this embodiment, when the secondary transfer portion part voltage Vb is 2000 V or more, the change range ΔV of the secondary transfer voltage is 450 V corresponding to the adjusting value change range ΔN=3 (corresponding to 3 levels (stages) of the adjusting value N). Further, in the case where the secondary transfer portion part voltage Vb is 1500 V or more and less than 2000 V, the change range ΔV of the secondary transfer voltage is 300 V corresponding to the adjusting value change range ΔN=2 (corresponding to 2 levels of the adjusting value N). In the case where the secondary transfer portion part voltage Vb is less than 1500 V, the secondary transfer voltage change range ΔV is 150 V corresponding to the adjusting value change range ΔN=1 (corresponding to 1 level of the adjusting value N). This is because in order to check current sensitivity of a secondary transfer property, when the change range of the secondary transfer voltage at the 1 level is made larger with an increasing secondary transfer portion part voltage Vb, it would be considered that a change range of a secondary transfer current in entirety of the chart can be made wide and is efficient. In this embodiment, the secondary transfer voltage change range ΔV (adjusting value change range ΔN) when the chart is secondary-transferred on the recording material S is automatically selected depending on a result of the ATVC, but may be made selectable directly in the secondary transfer voltage adjusting screen 706 or the like by the operator. Further, the secondary transfer voltage change range ΔV (adjusting value change range ΔN) when the chart is secondary-transferred on the recording material S may be made selectable by the operation as to whether in an "automatic selection" manner or in a "direct designation" manner.

In each of FIGS. 14A-1 to 14C-2, a list including present adjusting values $N_0$ and secondary transfer voltage adjusting values N applied for each of patch numbers n is shown for each adjusting average value change range ΔN and each side (first side or second side) in this embodiment. FIGS. 14A-1 and 14A-2 show the case of ΔN=1, FIGS. 14B-1 and 14B-2 show the case of ΔN=2, and FIGS. 14C-1 and 14C-2 show the case of ΔN=3. In the case where the present adjusting value $N_0$ is "0", a patch number n=5 corresponds to the present adjusting value $N_0$=0, n=1 to n=4 correspond to a lower adjusting value side in ΔN interval, and n=6 to n=10 correspond to a higher adjusting value side in ΔN interval. In the case where the present adjusting value $N_0$ is a value other than 0, the adjusting values corresponding to the adjusting patches 101A and 102A are offset uniformly. Further, in the case where the present adjusting value $N_0$ is large on a "+side" or "−side" when the present adjusting value $N_0$ is fixed to n=5, there is a case that all the patches of n=1 to 10 do not always fall within an adjusting range of "±20". In such a case, the patch corresponding to the present adjusting value $N_0$ is deviated from n=5, so that all the adjusting patches 101A and 102A are caused to fall within the adjusting range of "±20". By this, all the adjusting patches 101A and 102A can be effectively utilized.

In the case of the L chart 100, when the chart is secondary-transferred onto the recording material S, on a first-side trailing end side of the recording material S and on a second-side leading end side of the recording material S, the trigger patches 101T and 102T exist. The trigger patches 101T and 102T are used for detecting patch positions when the sensing unit 3 reads the patches. For that reason, there is a need that these trigger patches 101T and 102T are transferred at a minimum required density for that purpose. At an extremely high secondary transfer voltage or at an extremely low secondary transfer voltage, there is a risk that these trigger patches cannot be read. For this reason, in this embodiment, a voltage corresponding to the patch number n=5 (voltage indicated by a broken line of 800 in FIG. 13) is applied when the trigger patches 101T and 102T are secondary-transferred onto the recording material S. Incidentally, a setting method of the secondary transfer voltage applied when the trigger patches 101T and 102T are secondary-transferred onto the recording material S is not limited to the above-described method in this embodiment. For example, a method in which the secondary transfer voltage is set at a high value (large in absolute value) to at least suppress a lowering (improper transfer due to a low transfer voltage), a method in which the secondary transfer voltage is subjected to constant-current control and the trigger patches are transferred at a minimum required density, and the like method would be considered.

Parts (a) and (b) of FIG. 15 are graphs each showing progression of output of the secondary transfer power source 76 when the chart in each of the cases of the S chart 103 and the R chart 104 is secondary-transferred onto the recording material S. Part (a) of FIG. 15 shows the first side during the double-side adjustment, and part (b) of FIG. 15 shows the second side during the double-side adjustment. In the cases of the S chart 103 and the R chart 104, each chart is divided into a plurality of charts for a first side of a first sheet (103(1-1) or 104(1-1)), a first side of a second sheet (103 (1-2) or 104(1-2)), a second side of the first sheet (103(2-1) or 104(2-1)), and a second side of the second sheet (103) 2-2) or 104(2-2)), and the trigger patches 101T and 102T are disposed on each of the divided charts. However, in the case of the S chart 103 and the R chart 104, a magnitude and a timing of the overlap of the secondary transfer power source 76 are basically similar to those in the case of the L chart 100. Incidentally, in this embodiment, as regards blank sides (104(2-1), 104(2-2), 104(1-3), and 104(1-4)), the voltage corresponding to the patch number n=5 (voltage value indicated by the broken line 800 in FIG. 15) is applied over an entire surface.

Incidentally, as described above, in the case where the one-side adjustment is selected in the one-side/double-side selecting portion 708 of the secondary transfer voltage adjusting screen 706 by the operator, the following operation is performed. In the case where the L chart 100 is outputted, the chart of 100(2) in FIG. 6 is outputted. Further, in the case where the S chart 103 is outputted, the chart of 103(2-1) and the chart of 103(2-2) in FIG. 7 are outputted. Further, in the case where the R chart 104 is outputted, the chart of 104(2-3) and the chart of 104(2-4) in FIG. 8 are outputted. That is, the charts for the second side in the case where the double-side adjustment is performed are outputted in the image forming operation of the one-side printing without being passed through the reverse feeding path 7. Further, reading of each of the charts is made using the line sensor 92 of the sensing unit 3. By this, the one-side printing can be executed with a minimum downtime since a direction of the reading image is unchanged from during the double-side adjustment and the recording material S does not pass through the reverse feeding path 7.

When the chart is outputted, the controller 3 (adjusting process portion 31*d*) causes the sensing unit 3 to read the chart, and carries out control so as to calculate brightness and a dispersion of each of the patches 101A and 102A in the following manner (S11). The first and second line sensors 91 and 92 of the sensing unit 3 read the charts on each of the first side and the second side at a resolution of "300 dpi". Incidentally, information of the images read by the first and second line sensors 91 and 92 of the sensing unit 3 is stored in the RAM 33. Then, on the basis of positions of the trigger patches 101T and 102T of the chart, the controller 30 (adjusting process portion 31*d*) calculates positions of the adjusting patches 101A and 102A in the following manner.

FIG. 16 is schematic view for illustrating, as an example, a method in which the positions of the trigger patches 101T and 102T are identified from an image 110 read by the first and second line sensors 91 and 92. First, with respect to the feeding direction of the recording material S passing through an inside of the sensing unit 3, a line 112 positioned at a margin portion between an edge 111 of the adjusting chart and the trigger patches 101T and 102T is set from a roughly positional relationship. Then, the average brightness value of the line 112 is read from information of the read chart. At this time, when the average brightness value is smaller than a preset threshold (when the density is larger than a predetermined value), the controller 30 discriminates that an edge line of the trigger patches 101T and 102T exists. When this edge (line) discrimination is not made, this discrimination is repeated every (one) line toward an upstream side of the feeding direction of the recording material S passing through the inside of the sensing unit 3, and the controller 30 finds out an edge line 113. Then, with respect to the widthwise direction, a line 114 positioned at a margin portion between the edge 111 of the chart (recording material S) and the trigger patches 102T is set from a roughly positional relationship. Then, average brightness value of the line 114 is read from information of the read chart. At this time, when the average brightness value is smaller than a preset threshold, the controller 30 discriminates that an edge line of the trigger patches 102T exists. When this edge (line) discrimination is not made, this discrimination is repeated every line toward a right-hand side of the widthwise direction in FIG. 16, and the controller 30 finds out an edge line 115. The right-hand side of the widthwise direction in FIG. 16 is the right-hand side in the case where sides of the recording material S on the first and second line sensors 91 and 92 are viewed in a state in which a leading end side of the recording material S with respect to the feeding direction when the recording material S passes through the inside of the sensing unit 3 is an upper side. Incidentally, the above-described edge detecting method is an example, and the edge detecting method in the present invention is not limited to the method described above. For example, a method different from the method in this embodiment may be used depending on a design of the chart.

When the positions of the adjusting patches 101A and 102A can be identified, the controller 30 (adjusting process portion 31*d*) calculates the average brightness value and a dispersion value and stores these values in the RAM 33. That is, as regards the n-th patch, the average brightness value $B_{ave}$ and the dispersion value D(n) calculated by the following formulas are stored in the RAM 33.

$$B_{ave}(n) = \frac{1}{M} \times \sum_{m=1}^{M} B(m)$$

$$D(n) = \frac{1}{M} \times \sum_{m=1}^{M} (B(m) - B_{ave}(n))^2$$

In the above formulas, B(m) represents brightness of a m-th read pixel, M represents the number of read pixels, and m is 1 to M (M pixels are read at this time).

The average brightness value (brightness average value) is a parameter close to the density (i.e., correlating with the density). Further, by study of the present inventor, it turns out that the dispersion value is a parameter sensitive to a transfer property in the case where the recording material S is uneven. In this embodiment, calculation of the average brightness value and the dispersion value is carried out for both the solid B patch 101 and the solid Bk patch 102. In this embodiment, by using the average brightness value and the dispersion value, a recommended adjusting amount ΔV (specifically, a corresponding adjusting value N) of the set voltage (value) of the secondary transfer voltage is acquired.

In this embodiment, as the brightness to be read from the information of the image read by the sensing unit 3, B brightness is used for the solid B patches 101, and G brightness is used for the solid Bk patches 102. Incidentally, whether which of brightness values of RGB may be different from the above brightness values, an average of these three brightness values or brightness of gray scale which is not color-separated into RGB may be used.

Further, when the dispersion value is calculated there is a need that brightness per read pixel is temporarily stored, but this leads to a high load on the controller 30 and a long time of the operation in the adjustment mode in some instances. In such a case, the brightness values from "0 to 255" are divided into sections and a frequency per pixel is counted, and then the dispersion value may be calculated from a digital histogram. The number of divisions of the brightness values and whether to employ which interval can be changed depending on a characteristic of the first and second line sensors 91 and 92 or throughput of the controller 30. Further, the brightness histogram is also different depending on the paper kind category, so that these factors may also be changed depending on the paper kind category.

Next, the controller 30 (adjusting process portion 31*d*) carries out control so that patches with a good transfer property are selected from the average brightness values and the dispersion values of the adjusting patches 101A and 102A in the following manner (S12 to S15). Incidentally, in the following description of a process for selecting the patches with the good transfer property, the solid B patches 101 and the solid Bk patches 102 are the adjusting patches 101A and the adjusting patches 102A, respectively.

Part (a) of FIG. 17 shows an example of an acquisition result of the average brightness value of the solid B patches 101, part (b) of FIG. 17 shows an example of an acquisition result of the average brightness value of the solid Bk patches 102, part (c) of FIG. 17 shows an example of an acquisition result of the average brightness value of grouped solid B patches 101, and part (d) of FIG. 17 shows an example of an acquisition result of the dispersion value of the solid B patches 101.

First, the controller 30 (adjusting process portion 31*d*) seeks a lowest average brightness value from those for the solid Bk patches 102. Then, the controller 30 carries out control so as to narrow down the patch numbers (i.e., adjusting values) therefrom to those falling within a range of a preset threshold γ1 set from the lowest average brightness value to a high brightness side (S12). In the case of part (b) of FIG. 17, the patch numbers of the lowest average brightness value (lowest brightness) are n=4, 5, 6, and the patch numbers narrowed down are n=1, 2, 3, 4, 5, 6, 7. By this, the patch numbers (adjusting values) at which the solid Bk patches can be transferred to some extent can be narrowed down. The threshold γ1 may be decreased in the case where the solid Bk patch transfer property is regarded as important and may be increased in the case where the solid B patch transfer property is regarded as important.

Next, the controller 30 calculates, for example, an average brightness value of three solid B patches 101 consisting of a preceding solid B patch, a present solid B patch, and a subsequent solid B patch (herein, this average brightness value is referred to as "group brightness" with respect to the narrowed-down patch numbers (i.e., adjusting values)). Then, the controller 30 (adjusting process portion 31*d*) selects a group in which the calculated group brightness is smallest (S13). Group brightness Bgr (n) for an n-th path is represented by the following formula.

$$B_{gr}(n)=(B_{ave}(n=1)+B_{ave}(n)+B_{ave}(n))/3$$

Part (a) of FIG. 17 shows the average brightness value of the solid B patches 101, and part (c) of FIG. 17 shows group brightness converted from the average brightness values of the solid blue patches 101. In the case of part (c) of FIG. 17, the group brightness of a group of the patch number n=7 (i.e., a group of patches with patch numbers n=6, 7, 8) is lowest.

Here, in the adjustment using the chart, the adjustment can be made only for patches with a certain density. For this reason, the selected group may be changed. For example, a threshold γ2 for the lowest group brightness is set. Then, the controller 30 checks whether or not on a side of the patch number (i.e., the adjusting value) smaller than the patch numbers of group in which the group brightness is lowest, there is group brightness falling within the range of the threshold γ2 from the lowest group brightness toward a high-brightness side. Then, in the case where the group brightness exists, the selected group may be changed to the group of the patch numbers (i.e., the adjusting values) with the group brightness. By this change (correction), it is possible to select a patch number (i.e., adjusting value) of a group close to the group during rising of the secondary color transfer to the extent possible. As a result, it is possible to suppress an occurrence of the case such that the secondary transfer voltage Vtr is excessively high, for a user who principally outputs a single color image or a halftone image through image formation. In this Embodiment, the above-described correction (front-loaded correction) of the adjusting value by the threshold γ2 is employed. In the case of part (c) of FIG. 17, the group of the patch number n=6 (i.e., patches of the patch numbers n=6, 7, 8 is selected.

Next, the controller 30 (adjusting process portion 31*d*) selects the patch lowest in dispersion value in the selected group (S14). In the case of part (d) of FIG. 17, the dispersion value of the patch number n=6 is smallest.

Here, as described above, in the adjustment using the chart, the adjustment can be made only for the chart with a certain density. For that reason, the patch number (i.e., the adjusting value) selected in this embodiment may be corrected. In the case where the user who principally outputs the single-color image or the halftone image in image formation is assumed, correction for decreasing the adjusting value to the extent possible can be made. In this case, for example, similarly as in the case of the group brightness, a threshold γ3 for the smallest dispersion value is set in advance. Further, a possible small patch number (i.e., the adjusting value) may be selected from the patch numbers with dispersion values falling within the threshold γ3 on a side from the smallest dispersion value toward a large dispersion value. On the other hand, in the case where transfer of the secondary color image with reliability is regarded as important, correction for increasing the adjusting value to the extent possible can be made. In this case, as shown in part (a) of FIG. 17, with respect to an average brightness value of the selected patch number, a threshold γ4 is set in advance on a side higher in average brightness value. Further, for example, a difference in average brightness value between the selected patch number n=6 and a preceding patch number n=5 is compared with the threshold γ4. In the case where the difference in average brightness value is larger than the threshold γ4, a resultant state can be discriminated as a state in which the secondary color (image) transfer property is maintained in the patch number n=5. In such a case, depending on a toner charge amount fluctuation, a water content fluctuation of the recording material S, or the like, there is a risk of an insufficient transfer electric field for the secondary color image. In this embodiment, the above-described correction for transferring the secondary color image with reliability is employed. Further, in the case of part (a) of FIG. 17, the difference between the average brightness value of the selected patch number n=6 and the average brightness value of the previous patch number n=5 is larger than the threshold γ4, and therefore a patch number n=7 larger by one level than the selected patch number n=6 is selected.

Along the above-described adjusting value selection flow, a patch number $n_A$ of which transfer property is preferred and a corresponding adjusting value $N_A$ are determined by the controller 30 (adjusting process portion 31*d*) (S15).

Incidentally, the above-described adjusting value selecting flow in this embodiment is an example, and the adjusting value selection flow is not limited thereto. For example, a group brightness $B_{gr}$ was calculated using three patches, but may also be calculated using four or more patches or using two patches. Further, the group brightness $B_{gr}$ is effective for stably selecting an adjusting range in which the transfer property is good, but the adjusting value may also be selected directly from the average brightness value and the dispersion value without using the group brightness. Particularly, depending on the setting of the threshold γ1 or the transfer property of the recording material S, there is a case that the group brightness cannot be selected, but in that case, the adjusting value may be selected directly from the average brightness value and the dispersion value without using the group brightness. Further, the dispersion value is effective for detecting the density non-uniformity in the patches, but is not necessarily required to be used. Further, the transfer property of the solid Bk patches may also be adjusted by a method other than the narrowing-down by the threshold γ1. For example, a patch number (i.e., an adjusting value) at which the average brightness value of the solid Bk patch is lowest (density is highest) and at which the average brightness value of the solid B patch is lowest (density is highest) may also be selected.

The controller 30 (adjusting process portion 31*d*) causes the display portion 70*a* of the operating portion 70 to display the adjusting value $N_A$ selected as described above at the adjusting value display portion 707 of the secondary transfer voltage adjusting screen 706 as shown in FIG. 12 (S16). The operator discriminates whether or not the display contents of the secondary transfer voltage adjusting screen 706 are appropriate, and selects the confirmation portion 710 (OK button 710*a*, application button 710*b*) in the case where the displayed adjusting value $N_A$ is not changed. On the other hand, the operator inputs a desired value to the adjusting value display portion 707 by operating numeric keys (not shown) of the operating portion 70 in the case where the operator desires that the adjusting value is changed from the displayed adjusting value $N_A$, and then selects the finalizing portion 710 (OK button 710*a*, application button 710*b*). In the case where the adjusting values are changed, the controller 30 (adjustment process portion 31*d*) causes the RAM 33 (or the secondary transfer voltage storage/operation portion 31*f*) to store the adjusting values inputted by the operator (S17). The operator can discriminate whether or not display contents of the secondary transfer voltage adjusting screen 706 are appropriate, by checking the outputted chart by eyes or the like. On the other hand, in the case where the adjusting values are not changed and the confirmation portion 710 is selected, the controller 30 (adjustment process portion 31*d*) causes the RAM 33 (or the secondary transfer voltage storage/operation portion 31*f*) to store the determined adjusting value as it is (S17). The operation in the adjustment mode is thus ended.

8. Effect

An experiment for confirming an effect of this embodiment was conducted between this embodiment and a comparison example. In the comparison example, in a condition such that the double-side adjustment is executed by outputting the R chart in this embodiment, the double-side adjustment is executed by outputting charts different in patch between the front side and the back side of the recording material S. That is, in the comparison example, the chart of 104(1-1) of FIG. 8 is outputted as a chart on a first side of a first sheet, and the chart of 104(2-3) of FIG. 8 is outputted as a chart on a second side of the first sheet. Further, the chart of 104(1-2) of FIG. 8 is outputted as a chart on a first side of a second sheet, and the chart of 104(2-4) of FIG. 8 is outputted as a chart on a second side of the second sheet.

In the experiment, after the execution of the operation in the adjustment mode, an image quality when each of the solid B image and the solid Bk image was outputted was checked. The experiment was conducted using, as the recording material S, paper of 68 g/m$^2$ in basis weight which is high-quality paper with a smooth surface and paper of 87 g/m$^2$ in basis weight which is embossed paper with a non-smooth surface.

A result is shown in a table 1 below. The table 1 shows the adjusting values after execution of the operation in the adjustment mode and the image qualities when each of the solid B image and the solid Bk image was outputted in the double-side printing. As regards the image quality, the case where there is no problem was evaluated as "○ (good)", and the case where an image defect due to the setting of the secondary transfer voltage occurred was evaluated as "X (poor)". Incidentally, a similar effect was obtained for both the first side and the second side, and therefore, the result on one side is shown as a representative in the table 1.

TABLE 1

| | | EMB. 1 | COMP. EX. |
|---|---|---|---|
| HQP*[1] | AV*[3] | +1 | −2 |
| | Solid blue | ○ | X (TV*[4]) |
| | Solid black | ○ | ○ |
| EMP*[2] | AV*[3] | +1 | +4 |
| | Solid blue | ○ | ○ |
| | Solid black | ○ | X (RO*[5]) |

*[1]HQP is the high-quality paper.
*[2]EMP is the embossed paper.
*[3]AV is the adjusting value.
*[4]TV is a transfer void.
*[5]RO is roughening.

In the case of using the high-quality paper, there was no abnormality in image quality in this embodiment, whereas in the comparison example, an adjusting value for the secondary transfer voltage lower than the adjusting value for the secondary transfer voltage in this embodiment was selected and the transfer void was observed. It would be considered that in the operation in the adjustment mode in the comparison example, the set-off of the patch occurred and erroneous detection such that the density of the solid B patch corresponding to a low secondary transfer voltage is high (thick) is made and thus the adjusting value becomes inappropriate.

Further, in the case of using the embossed paper, in this embodiment, there was no abnormality in image quality, whereas in the comparison example, an adjusting value for the secondary transfer voltage higher than the adjusting value for the secondary transfer voltage in this embodiment was selected and the density non-uniformity (roughening) was observed in the solid Bk image. It would be considered that in the operation in the adjustment mode in the comparison example, the set-off of the patch occurred and erroneous detection such that the density of the solid Bk patch corresponding to a high secondary transfer voltage is high is made and thus the adjusting value becomes inappropriate. That is, in the case of the paper of the embossed paper type, a void is liable to generate between the paper surface and the intermediary transfer belt 44*b* due to a recessed surface of the paper in the secondary transfer portion N2, so that in the case where the secondary transfer voltage is high, the image density is liable to become low (thin) by the influence of electric discharge in this gap. However, it would be considered that erroneous detection due to the set-off such that the image density does not become low is made, and thus the secondary transfer voltage is set at a high level. In this embodiment, there is no influence of the set-off, so that the adjustment is appropriately performed.

Incidentally, in this embodiment, in each of the L chart 100 and the S chart 103, all the patches are arranged so as not to overlap with each other between the front side and the back side of the recording material S, but the present invention is not limited to such an Embodiment. It may only be required that at least the patches are disposed so that a portion of the patches transferred onto the first side are used for adjusting the secondary transfer voltage and a portion of the patches transferred onto the second side are used for adjusting the secondary transfer voltage do not overlap with each other between the front side and the back side of the recording material S. For example, as regards the adjusting patches, the patches do not overlap with each other as a whole between the front side and the back side of the recording material S, whereas as regards the trigger patches and the identification information such as the patch numbers in the case of the printing, entirety or a part thereof may overlap with each other between the front side and the back side of the recording material S. Further, also, as regards the adjusting patches, as described above, it may only be required that at least portions where the density information is read for adjusting the secondary transfer voltage overlap with each other between the front side and the back side of the recording material S.

Further, as described above, the influence of the set-off on the detected brightness tends to become conspicuous particularly in the recording material S small in basis weight. For that reason, only in the case where the basis weight of the recording material S used for outputting the R chart 104 is a predetermined basis weight or less, the adjusting chart on the first side and the adjusting chart on the second side may be formed and outputted on separate recording materials S. For example, in the case of the recording material S of 150 $g/m^2$ or less in basis weight, the adjusting chart on the first side and the adjusting chart on the second side may be formed and outputted on separate recording materials S. In this case, when the basis weight of the recording material S used for outputting the R chart 104 is larger than the above-described predetermined basis weight, the R chart 104 can be outputted similarly as in the above-described comparison example. That is, in the case of the recording material S for which there is a possibility that the patches overlap with each other between the front and back sides and of which basis weight is the predetermined basis weight or less, the patches on the first side and the patches on the second side are transferred onto separate recording materials S. On the other hand, even the recording material S with a size such that there is a possibility that the patches overlap with each other between the front and back sides, in the case of the recording material S of which basis weight is larger than the above-described predetermined basis weight, the patches on the first side and the patches on the second side can be transferred onto the first side and the second side, respectively, of a single recording material S. In the case of the recording material S with a size such that the patches can be disposed so as not to overlap with each other between the front and back sides, it is preferable from the viewpoint of reduction in downtime that irrespective of the basis weight, the first-side patches and the second-side patches are transferred onto the first side and the second side, respectively, of the single recording material S.

Thus, in this embodiment, the image forming apparatus 1 includes the image bearing member 44*b* for bearing the toner image, the transfer means 45 for transferring the toner image from the image bearing member 44*b* onto the recording material S in the transfer portion N2, the applying means 76 for applying the transfer voltage to the transfer means 45, the fixing means 46 for fixing the toner image, transferred on the recording material S, on the recording material S in the fixing portion N3, the double-side mechanism 14 for feeding the recording material S in order to carry out the double-side printing in which the toner image is transferred onto the first side of the recording material S in the transfer portion N2 and is fixed on the first side of the recording material S in the fixing portion N3 and then in which the toner image is transferred onto the second side of the recording material S in the transfer portion N2 and is fixed on the second side of the recording material S in the fixing portion N3, and the executing portion 31*d* for executing the operation in the output mode in which the chart formed by transferring the plurality of test images onto the recording material S under application of different transfer voltages for adjusting the transfer voltage. Further, the executing portion 31*d* is capable of executing the following operations in the first mode and the second mode when the operation in the output mode in which the chart for adjusting the transfer voltage in the double-side printing is outputted. In the case where a width, with respect to the direction substantially perpendicular to the feeding direction of the recording material S, of the recording material S on which the test images are transferred is a first width, the executing portion 31*d* executes the operation in the first output mode in which the charts 100 and 103 formed by transferring the test images for adjusting the transfer voltage for the first side in the double-side printing and the test images for adjusting the transfer voltage for the second side in the double-side printing onto the first side and the second side, respectively, of the single recording material S are outputted. Further, in the case where the width of the recording material S on which the test images are transferred is a second width narrower than the above-described first width, the executing portion 31*d* executes the operation in the second output mode in which the charts 104 formed by transferring the test images for adjusting the transfer voltage for the first side in the double-side printing and the test images for adjusting the transfer voltage for the second side in the double-side printing onto one side of a recording material S and one side of another recording material S, respectively, are outputted.

In this embodiment, the executing portion 31*d* carries out control so as to execute the operation in the second output mode in the case where the width of the recording material S on which the test images are transferred is narrower than a predetermined width. Further, the executing portion 31*d* executes so as to carry out the operation in the second output mode in the case where the width of the recording material S on which the test images are transferred is narrower than N×L×2 when the width of each test image with respect to the widthwise direction substantially perpendicular to the feeding direction of the recording material S is L and the number of the test images with respect to the widthwise direction is N. Further, in this embodiment, the executing portion 31*d* carries out control so that a portion used for adjusting the transfer voltage for the test images transferred onto the first side of the recording material S and a portion used for adjusting the transfer voltage for the test images transferred onto the second side of the recording material S do not overlap with each other between the front and back sides of the recording material S in the operation in the first output mode. Particularly, in this embodiment, the executing portion 31*d* carries out control so that entirety of the test images transferred onto the first side of the recording material S and entirety of the test images transferred onto the second side of the recording material S do not overlap with each other between the front and back sides of the recording material S in the operation in the first output mode. Further, in this embodiment, the executing portion 31*d* carries out control so that the test images for adjusting the transfer voltage for the second side of the recording material S in the double-side printing are transferred onto the recording material S which has the first side onto which the test images are not transferred and which is fed to the transfer portion N2 by the double-side mechanism 14 in the operation in the first output mode. Further, in this embodiment, the executing portion 31*d* carries out control so that in the operation in the second output mode, the recording material S having the first side on which the test images for adjusting the transfer voltage for the first side in the double-side printing are transferred is conveyed to the transfer portion N2 by the double-side mechanism 14 and is discharged from the image forming apparatus 1 after having passed through the transfer portion N2 and the fixing portion N3 without transferring the test images onto the second side of the recording material S. Further, in this embodiment, the image forming apparatus 1 includes the acquiring portion 3 for acquiring the density information on the density of the test images on the chart and includes the setting portion 30 for setting the transfer voltage on the basis of the density information acquired by the acquiring portion 3. In this embodiment, the acquiring portion 3 acquires the density information of the test images on the chart when the recording material S on which the chart is formed is discharged from the image forming apparatus 1.

As described above, according to this embodiment, even in the case where the size of the recording material S used for outputting the chart in the operation in the adjusting mode is small, it is possible to avoid that the density information is detected in a state in which the patches overlap with each other between the front and back sides of the recording material S. For that reason, according to this embodiment, it becomes possible to detect the appropriate secondary transfer voltage depending on the patch density information. Therefore, according to this embodiment, even in the case where the recording material S used for outputting the chart is the recording material S small in size, it is possible to appropriately adjust the secondary transfer voltage during the double-side printing.

Embodiment 21

Next, another Embodiment (Embodiment 2) of the present invention will be described. Basic structure and operation of an image forming apparatus of this embodiment are the same as those of the image forming apparatus of the Embodiment 1. Accordingly, in the image forming apparatus of this embodiment, elements having identical or corresponding to those of the image forming apparatus of the Embodiment 1 are represented by the same reference numerals or symbols and will be omitted from detailed description.

In this embodiment, the R charts 104 are different from those in the Embodiment 1. Incidentally, in this embodiment, the L charts 100 and the S charts 103 are similar to those in the Embodiment 1.

FIG. 18 is a schematic view showing the R charts 104 in this embodiment. Also, in this embodiment, similarly as in the Embodiment 1, each of the R charts 104 is a chart in the case where a feeding direction length of the recording material S is 210 mm (short side of A4 size) or more and less than 420 mm (long side of A3 size) and a width of the recording material S is 139.7 mm (short side of STMT size) or more and less than 160 mm. In the R charts 104 of FIG. 18, a chart of 104(1-1) shows a first side of a first sheet, a chart of 104(1-2) shows a first side of a second sheet, a chart of 104(1-3) shows a first side of a third sheet, a chart of 104(2-3) shows a second side of the third sheet, a chart of 104(1-4) shows a first side of a fourth sheet, and a chart of 104(2-4) shows a second side of the fourth sheet. A constitution of patches formed on the R charts 104 in this embodiment is the same as the constitution of the patches in the R charts 104 in the Embodiment 1.

As shown in FIG. 18, in this embodiment, as regards the first sheet and the second sheet, the patches are formed on only the first side, and the first sheet and the second sheet pass through the secondary transfer portion N2 and then pass through the inside of the sensing unit 3 without changing a direction thereof. Further, the patches are not formed on the first side of the recording material S for forming the patches on the second side and are formed on only the second side, and the recording material S passes through the secondary transfer portion N2 and then passes through the inside of the sensing unit 3 without changing a direction thereof. In FIG. 18, a feeding direction of the charts when the recording material S passes through the secondary transfer portion N2 is indicated by a thin arrow, and a feeding direction of the charts when the recording material S passes through the inside of the sensing unit 3 is indicated by a thick arrow.

That is, in this embodiment, the charts of 104(1-1) and 104(1-2) of the R charts 104 of FIG. 18 are formed and outputted on the first side of the recording material S in the image forming operation in the double-side printing and are read by the second line sensor 92 of the sensing unit 3 without changing the direction thereof. Further, the charts of 104(2-3) and 104(2-4) of the R charts 104 of FIG. 18 are formed and outputted on the second side of the recording material S in the image forming operation in the double-side printing and are read by the second line sensor 92 of the sensing unit 3 without changing the direction thereof. In this embodiment, the recording material S having the first side on which the charts for adjusting the first side are formed and having the second side moves toward the sensing unit 3 without passing through the reverse feeding path 7, and therefore a downtime can be reduced.

Similarly as in the Embodiment 1, in this embodiment, on the patch-formed side, the leading end patches of the solid B patches 101 and the solid Bk patches 102 when passing through the sensing unit 3 are the trigger patches 101T and 102T, respectively, for detecting the positional information. Further, of the solid B patches 101 and the solid Bk patches 102, remaining 10 patches excluding the trigger patch 101T and remaining 10 patches excluding the trigger patch 102T are adjusting patches 101A and 102A, respectively, for acquiring brightness information (density information).

Thus, also, in this embodiment, similarly as in the Embodiment 1, as regards the R charts 104, the first sides of the recording materials S each having the second side on which the patches are formed are kept in a blank state without forming the patches thereon. Further, the second sides of the recording materials S having the first side on which the patches are formed are kept in a blank state without forming the patches thereon.

In this embodiment, in the case where the one-side adjustment is performed, in the image forming operation of the one-side printing, the charts of 104(1-1) and 104(1-2) of FIG. 18 are formed and outputted on the first side of the first recording material S and the first side of the second (subsequent) recording material S, respectively. Further, in this case, the charts are outputted without being passed through the reverse feeding path 7, and reading of the charts is made using the second line sensor 92 of the sensing unit 3.

Incidentally, an adjusting result of the first side during the double-side adjustment can also be used for setting the secondary transfer voltage during the one-side printing.

Further, in this embodiment, the secondary transfer voltage applied during the output of the chart is the voltage as shown in part (b) of FIG. 15 for the side on which the patches are formed and is the voltage corresponding to the patch number n=5 (i.e., the voltage indicated by the broken line 800 in FIG. 15) for the blank side.

Thus, in this embodiment, in the operation in the above-described second output mode (in the outputting operation of the R charts), the executing portion 31*d* carries out control so that the recording material S having the first side on which the test images for adjusting the transfer voltage for the first side in the double-side printing are transferred is discharged from the image forming apparatus 1 without being fed to the transfer portion N2 by the double-side mechanism 14.

As described above, according to this embodiment, not only an effect similar to the effect of the Embodiment 1, but also a downtime for the operation in the adjustment mode using the R charts can be reduced more than in the Embodiment 1.

Embodiment 3

Next, another Embodiment (Embodiment 3) of the present invention will be described. Basic structure and operation of an image forming apparatus of this embodiment are the same as those of the image forming apparatus of the Embodiment 1. Accordingly, in the image forming apparatus of this embodiment, elements having identical or corresponding to those of the image forming apparatus of the Embodiment 1 are represented by the same reference numerals or symbols and will be omitted from detailed description.

In this embodiment, the L charts 100 and the S charts 103 are different from those in the Embodiment 1. On the other hand, as described later, the R charts 104 are similar to those in the Embodiment 1 or the Embodiment 2.

FIG. 19 is a schematic view showing the L charts 100 in this embodiment. Also, in this embodiment, similarly as in the Embodiment 1, each of the L charts 100 is a chart in the case where a feeding direction length of the recording material S is 420 mm (long side of A3 size) or more and a width of the recording material S is less than 279.4 mm (long side of LTR size).

In this embodiment, on each of the L charts 100, 11 sets in total each consisting of the solid blue (B) patch 101, the solid black (Bk) patch 102, and the half-tone black (Bk) patch 106 which are arranged in the widthwise direction are arranged in the feeding direction of the recording material S. As regards the L charts 100 of FIG. 19, a chart of 100(1) shows a first side, and a chart of 100(2) shows a second side. Further, in FIG. 19, a feeding direction of the charts when the recording material S passes through the secondary transfer portion N2 is indicated by a thin arrow, and a feeding direction of the charts when the recording material S passes through the inside of the sensing unit 3 is indicated by a thick arrow.

In the Embodiment 1, in this embodiment, the leading end patches of the solid B patches 101, the solid Bk patches 102, and half-tone Bk patches 106 which pass through the inside of the sensing unit 3 are the trigger patches 101T, 102T, and 106T, respectively, for detecting the positional information. This trigger patches 101T, 102T, and 106T are used for accurately detecting positions of patch arrays when these trigger patches are read by the first and second line sensors 91 and 92. Of the solid B patches 101, the solid Bk patches 102, and the half-tone Bk patches 106, remaining 10 patches excluding the trigger patch 101T, remaining 10 patches excluding the trigger patch 102T, and remaining 10 patches excluding the trigger patch 106T are adjusting patches 101A, 102A and 106A, respectively, for acquiring brightness information (density information). Each of the adjusting patches 101A, 102A, and 106A are transferred onto the recording materials S under application of different secondary transfer voltages Vtr, respectively.

Thus, as regards the L charts 100 in this embodiment, in addition to the solid B patches 101 and the solid Bk patches 102 similar to those in the L charts 100 in the Embodiment 1 shown in FIG. 6, the half-tone Bk patches 106 are disposed. The solid B patches 101 and the solid Bk patches 102 are similar to the solid B patches 101 and the solid Bk patches 102, respectively, in the Embodiment 1. Here, in the case where the sides of the recording material S facing the first and second line sensors 91 and 92 in a state in which the leading end side of the recording material S with respect to the feeding direction when passing through the inside of the sensing unit 3 is an upper side are viewed, the recording material S is disposed as follows. That is, in this embodiment, the solid Bk patches 106 are disposed adjacent to the solid B patches 102 on the right side and are disposed adjacent to an end portion (edge) of the chart (recording material S). Further, in this embodiment, the half-tone Bk patches (gray patches) 106 are formed in a toner application amount which is 50% of a toner application amount of the solid Bk patches 102. Further, in this embodiment, a size of each of the half-tone Bk patches 106 is about 15 mm (feeding direction length)×about 15 mm (width), and an interval between adjacent half-tone Bk patches 106 with respect to the feeding direction is 15 mm.

Here, in the case where the width of the recording material S is broad, behavior of the recording material S at the end portion with respect to the above-described is liable to become unstable, for example, such that only the widthwise end portion of the recording material S absorbs moisture and waves. For that reason, in the case where the width of the recording material S is broad, an image defect due to electric discharge is liable to occur at the widthwise end portion of the recording material S during the secondary transfer. Such an image defect due to the electric discharge is liable to be detected in the half-tone image. For that reason, the half-tone Bk patches 106 may desirably be disposed adjacent to the widthwise end portion of the recording material S. The half-tone Bk patches 106 may preferably be disposed in a range of about 50 mm, more preferably about 10-30 mm from the widthwise edge of the recording material S toward the inside. The half-tone Bk patches 106 may be disposed continuously to the widthwise edge (end portion) of the recording material S and may also be disposed with a margin of about 2.5 mm from the widthwise edge of the recording material S similarly as in the Embodiment 1. Incidentally, this margin is typically about 2-10 mm. Further, when the toner application amount of the solid Bk patches 102 is 100%, the half-tone Bk patches 106 can be formed in the toner application amount of about 10-80%, typically about 40-60%. Incidentally, the color of the half-tone patches is not limited to black, but the half-tone patches may be other single-color half-tone images or other half-tone images of secondary colors or multiple-order colors more than the secondary colors.

Further, as regards the first side 100(1) and the second side 100(2) of the L chart 100, the solid B patches 101, the solid Bk patches 102, and the half-tone Bk patches 106 are disposed so as not to overlap with each other between the front and back sides of the recording material S. This is because, as described in the Embodiment 1, the influence of the set-off on the detected brightness when the patches are read by the first and second line sensors 91 and 92 is avoided.

FIG. 20 is a schematic view showing the S charts 103 in this embodiment. Also, in this embodiment, similarly as in the Embodiment 1, each of the S charts 103 is a chart in the case where a feeding direction length of the recording material S is 210 mm (short side of A4 size) or more and less than 420 mm (long side of A3 size) and a width of the recording material S is 160 mm or more.

In this embodiment, on each of the S charts 103, 12 sets in total each consisting of the solid blue (B) patch 101, the solid black (Bk) patch 102, and the half-tone black (Bk) patch 106, which are arranged in the widthwise direction, are arranged in the recording material feeding direction over the two recording materials S. As regards the S charts 103 of FIG. 20, a chart of 103(1-1) shows a first side of a first sheet, a chart of 103(2-1) shows a second side of the first sheet, a chart of 103(1-2) shows a first side of a second sheet, and a chart of 103(2-2) shows a second side of the second sheet. Further, in FIG. 20, a feeding direction of the charts when the recording material S passes through the secondary transfer portion N2 is indicated by a thin arrow, and a feeding direction of the charts when the recording material S passes through the inside of the sensing unit 3 is indicated by a thick arrow.

In the Embodiment 1, in this embodiment, the leading end patches of the solid B patches 101, the solid Bk patches 102, and half-tone Bk patches 106, which pass through the inside of the sensing unit 3, are the trigger patches 101T, 102T, and 106T, respectively, for detecting the positional information. These trigger patches 101T, 102T, and 106T are used for accurately detecting positions of patch arrays when these trigger patches are read by the first and second line sensors 91 and 92. Of the solid B patches 101, the solid Bk patches 102, and the half-tone Bk patches 106, remaining 10 patches excluding the trigger patch 101T, remaining 10 patches excluding the trigger patch 102T, and remaining 10 patches excluding the trigger patch 106T are adjusting patches 101A, 102A and 106A, respectively, for acquiring brightness information (density information). Each of the adjusting patches 101A, 102A, and 106A are transferred onto the recording materials S under application of different secondary transfer voltages Vtr, respectively.

Thus, as regards the S charts 103 in this embodiment, in addition to the solid B patches 101 and the solid Bk patches 102 similar to those in the S charts 103 in the Embodiment 1 shown in FIG. 7, the half-tone Bk patches 106 are disposed. The solid B patches 101 and the solid Bk patches 102 are similar to the solid B patches 101 and the solid Bk patches 102, respectively, in the Embodiment 1. Here, in the case where the sides of the recording material S facing the first and second line sensors 91 and 92 in a state in which the leading end side of the recording material S with respect to the feeding direction when passing through the inside of the sensing unit 3 is an upper side are viewed, the recording material S is disposed as follows. That is, in this embodiment, the solid Bk patches 106 are disposed adjacent to the solid B patches 102 on the right side and are disposed adjacent to an end portion (edge) of the chart (recording material S). Further, in this embodiment, the half-tone Bk patches (gray patches) 106 are formed in a toner application amount which is 50% of a toner application amount of the solid Bk patches 102. Further, in this embodiment, a size of each of the half-tone Bk patches 106 is about 15 mm (feeding direction length)×about 15 mm (width), and an interval between adjacent half-tone Bk patches 106 with respect to the feeding direction is 15 mm. As regards the arrangement and the density of the half-tone Bk patches 106, they can be set similarly as described for the L charts 100.

Further, as regards the first sides 103(1-1) and 103(1-2) and the second sides 103(2-1) and 103(2-2) of the S chart 103, the solid B patches 101, the solid Bk patches 102, and the half-tone Bk patches 106 are disposed so as not to overlap with each other between the front and back sides of the recording material S. This is because, as described in the Embodiment 1, the influence of the set-off on the detected brightness when the patches are read by the first and second line sensors 91 and 92 is avoided.

On the other hand, in this embodiment, the R charts 104 are similar to those in the Embodiment 1 (FIG. 8) or the Embodiment 2 (FIG. 18). That is, on the R charts 104, the solid B patches 101 and the solid Bk patches 102 are disposed, but the half-tone Bk patches 106 are not disposed. Further, as regards the R charts 104, the first sides of the recording materials S each having the second side on which the patches are formed are kept in a blank state without forming the patches thereon. Further, the second sides of the recording materials S having the first side on which the patches are formed are kept in a blank state without forming the patches thereon. This is because as regards the recording material S with a narrow width, it is difficult to dispose the three kinds of patches in the widthwise direction and it becomes difficult to realize arrangement such that the patches do not overlap with each other between the front and back sides of the recording material S.

That is, as described above, in the case where the width of the recording material S is broad, the behavior of the recording material S at the widthwise end portion is liable to become unstable, and therefore, the image defect due to the electric discharge is liable to occur in the widthwise end portion of the recording material S during the secondary transfer. Such an image defect due to the electric discharge is liable to be detected in the half-tone image, and therefore, on the L charts 100 and the S charts 103, the half-tone Bk patches 106 were disposed adjacent to the widthwise end portion of the recording material S. On the other hand, in the case where the width of the recording material S is narrow, the behavior of the recording material S at the widthwise end portion is easily stabilized. For that reason, there is a low necessity that the image defect due to the electric discharge at the widthwise end portion of the recording material S is taken into consideration. On the other hand, a density change due to a change in secondary transfer voltage is more easily detected in the solid image than in the half-tone image. For that reason, on the R charts 104, the half-tone Bk patches 106 are not disposed, but the solid B patches 101 and the solid Bk patches 102 are left as they are.

In this embodiment, the operation in the adjusting mode is similar to the operation in the adjusting mode described in the Embodiment 1 with reference to FIG. 9. However, in this embodiment, in the case where the L charts 100 and the S charts 103 are used, on the basis of a reading result of the solid B patches 101, the solid Bk patches 102, and the half-tone Bk patches 106 by the sensing unit 3, a recommended adjusting amount (specifically, an adjusting value corresponding thereto) of the secondary transfer voltage is determined (S12 to S15). In the Embodiment 1, as described above with reference to FIG. 17, an optimum range of the secondary transfer voltage was narrowed down using the brightness information (density information) of the solid Bk patches (solid single-color patches) 102. In addition, by using the brightness information (density information) of the solid B (solid secondary color) patches, from the narrowed-down range, an optimum adjusting amount (specifically, an adjusting value corresponding thereto) of the secondary transfer voltage was determined. In this embodiment, similarly as this, optimum ranges of the secondary transfer voltages can be narrowed down using the brightness information (density information) of the solid Bk patches (slid single color patches) 102 and the brightness information (density information) of the half-tone Bk patches (half-tone patches) 106. For example, similarly as in the Embodiment 1, the optimum ranges of the solid Bk patches 102 and the half-tone Bk patches 106 are narrowed down, and further, it is possible to narrow down the optimum ranges to a range in which both the optimum ranges overlap with each other or the like. In addition, by using the brightness information (density information) of the solid B (secondary color) patches, from the narrowed-down range, an optimum adjusting amount (specifically, an adjusting value corresponding thereto) of the secondary transfer voltage can be determined. By this, it becomes possible to set the optimum secondary transfer voltage into which the above-described image defect, due to the electric discharge, which is liable to occur at the widthwise end portion of the recording material S is also taken into consideration. Incidentally, a process for determining the recommended adjusting amount of the secondary transfer voltage in the case where the R charts 104 are used may only be required to be made the same as the process in the Embodiment 1.

Thus, in this embodiment, the number of the test images with respect to the widthwise direction substantially perpendicular to the feeding direction of the recording material S in the chart 104 outputted in the operation in the second output mode is smaller than the number of the test images with respect to the widthwise direction substantially perpendicular to the feeding direction of the recording material S in the charts 100 and 103 outputted in the operation in first output mode. Particularly, in this embodiment, the charts 100 and 103 outputted in the operation in the first output mode include the solid test images and the half-tone test images arranged in the widthwise direction, and the charts 104 outputted in the operation in the second output mode include only the solid test images of the above-described test images consisting of the solid test images and the half-tone test images. Further, in this embodiment, the half-tone test images are disposed adjacent to the widthwise end portion of the recording material S.

As described above, according to this embodiment, not only an effect similar to the effect of the Embodiment 1, but also in the case where the chart is outputted using the broad-width recording material S, it becomes possible to set a more appropriate secondary transfer voltage.

Embodiment 41

Next, another Embodiment (Embodiment 4) of the present invention will be described. Basic structure and operation of an image forming apparatus of this embodiment are the same as those of the image forming apparatus of the Embodiment 1. Accordingly, in the image forming apparatus of this embodiment, elements having identical or corresponding to those of the image forming apparatus of the Embodiment 1 are represented by the same reference numerals or symbols and will be omitted from detailed description.

In this embodiment, a modified Embodiment of the reading method of the charts outputted in the operation in the adjusting mode and the adjusting value selecting method will be described.

In the Embodiments 1 to 3, in the operation in the adjusting mode, the charts were read using in-line image sensors (first and second line sensors 91 and 92). By this, a load on the operator can be reduced. However, the present invention is not limited to such an Embodiment, but for example, a constitution in which the charts outputted in the operation in the adjusting mode are set at the image reading portion 80 as the acquiring portion by the operator and then the charts are read by the image reading portion 80 may also be employed. Thus, the acquiring portion 80 may acquire the density information of the test images on the charts in a state in which the recording material S which is discharged from the image forming apparatus 1 and on which the charts are formed is set. Further, for example, the charts outputted in the operation in the adjusting mode is read using an image reading means prepared by the operator separately from the image forming apparatus 1, and then the operator may input information on the read image or brightness information (density information) on read patches into the image forming apparatus 1. This input of the information can be carried out via a network or through the operating portion 70 via a recording medium, or can be directly carried out by the operator by input through keys or the like from the operating portion 70. In this case, on the basis of the inputted image information or the brightness information (density information), the controller 30 of the image forming apparatus 1 can present the recommended adjusting amount of the secondary transfer voltage similarly as in the above-described Embodiments.

Further, also, in the case where the operator checks the charts by eyes and then selects a preferred adjusting amount of the secondary transfer voltage, when the patches for the double-side adjustment overlap with each other between the front and back sides of the recording material S, there is a possibility that the operator makes erroneous discrimination for the transfer property. For that reason, also, in a constitution in which the image forming apparatus 1 does not have a function of selecting the adjusting value on the basis of a reading result of the charts and in which the operator discriminates the charts by eyes and then selects the preferred adjusting amount of the secondary transfer voltage, application of the present invention is effective. Also, in this case, in the case of the recording material S with a size such that there is a possibility that the patches overlap with each other between the front and back sides of the recording material S, the first-side patches and the second-side patches are transferred onto separate recording materials S, so that a possibility that the operator makes the erroneous discrimination for the transfer property can be reduced.

OTHER EMBODIMENTS

As described above, the present invention was described based on the specific Embodiments, but the present invention is not limited to the above-described Embodiments.

In the above-described Embodiments, the secondary transfer voltage was adjusted using the adjusting value corresponding to the predetermined adjusting amount, but for example, the adjusting amount may also be directly set by the adjusting screen.

Further, in the above-described Embodiments, the operation performed through the operating portion of the image forming apparatus can be made by the external device. That is, the case where the operator operates the image forming apparatus 1 through the operating portion 70 and executes the operation in the adjusting mode was described, but the operation in the adjusting mode may also be executed by the operation of the image forming apparatus 1 through the external device 200 such as the personal computer. In this case, it is possible to make settings similar to those in the above-described Embodiments through a screen displayed at a display portion of the external device 200 by a driver program of the image forming apparatus 1 installed in the external device 200.

Further, in the above-described Embodiments, the constitution in which the secondary transfer voltage is subjected to the constant-voltage control was described, but the secondary transfer voltage may also be subjected to constant-current control. In the above-described Embodiments, in the constitution in which the secondary transfer voltage is subjected to the constant-voltage control, the secondary transfer voltage was adjusted by adjusting the target voltage during the application of the secondary transfer voltage by the operation in the adjusting mode. In the case of the constitution in which the secondary transfer voltage is subjected to the constant-current control, the secondary transfer voltage can be adjusted by adjusting a target current during the application of the secondary transfer voltage by the operation in the adjusting mode.

Further, the current detection result and the voltage detection result may be an average of a plurality of sampling values acquired in a predetermined sampling interval at one detection timing. Further, in the case where the transfer voltage is subjected to the constant voltage control, the voltage value may be detected (discriminated) from an output instruction value to the power source, and in the case where the transfer voltage is subjected to the constant current control, the current value may be detected (discriminated) from an output instruction value to the power source.

Further, in the above-described Embodiments, as regards the image forming apparatus, the printer unit and the sensing unit were prepared as a unit, but the present invention is not limited thereto. By employing such a constitution, for example, these units are made separable, so that a function of the sensing unit can be prepared as an extension function of the image forming apparatus. However, the constitution of the printer unit and the constitution of the sensing unit in the above-described Embodiments may also be disposed and assembled into a unit in a single casing, for example.

Further, the image forming apparatus is not limited to the image forming apparatus of the tandem type, but may also be image forming apparatus of other types. In addition, the image forming apparatus is not limited to the image forming apparatus capable of forming a full-color image, but may also be an image forming apparatus capable of forming a monochromatic (white/black or mono-color) image forming apparatus. For example, the present invention may be applied to a transfer portion in the image forming apparatus having a constitution in which the toner image is formed on the photosensitive drum as the image bearing member and then is directly transferred onto the recording material in the transfer portion. Further, the image forming apparatus may be from among image forming apparatuses for various uses, such as printers, various printing machines, copying machines, facsimile machines, and multi-function machines.

According to the present invention, it is possible to appropriately adjust the transfer voltage during the double-side printing even in the case where the recording material used for outputting the chart is the recording material with the small size.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-013805 filed on Jan. 31, 2022, which is hereby incorporated by reference herein in its entirety.

What is claimed is:

1. An image forming apparatus comprising:

an image bearing member configured to bear a toner image;

a transfer device configured to transfer the toner image from the image bearing member onto a recording material in a transfer portion;

a voltage applying portion configured to apply a transfer voltage to the transfer device;

a fixing device configured to fix the toner image, transferred on the recording material, on the recording material in a fixing portion; and a controller capable of executing an operation in a double-side mode in which toner images are formed on both sides of the recording material and capable of executing an operation in an output mode in which a chart formed by transferring, onto the recording material, a plurality of test images including first test images and second test images, which are for adjusting the transfer voltage applied during the operation in the double-side mode and which are formed under application of different transfer voltages, is outputted, wherein during execution of the operation in the output mode, the controller is capable of selectively executing:

a first operation in which an image forming operation is controlled so that the first test images formed on a first side of the recording material are fixed on the first side of the recording material by the fixing device and then the second test images are transferred onto a second side of the recording material, and a second operation in which the first test images formed on a first side of a first recording material are fixed by the fixing device and then the first recording material is outputted without forming the plurality of test images on a second side of the first recording material and then in which a second recording material is passed through the fixing device without forming the plurality of test images on a first side of the second recording material and then the second test images are transferred onto a second side of the second recording material.

2. An image forming apparatus according to claim 1, wherein during the execution of the operation in the output mode, the controller executes the first operation when a width of a recording material onto which the test images are transferred is a first width and executes the second operation when the width of a recording material onto which the test images are transferred is a second width narrower than the first width.

3. An image forming apparatus according to claim 1, wherein the controller carries out control so as to execute the second operation in a case that the width of a recording material onto which the test images are transferred is narrower than N×L×2 when a width of each of the test images with respect to a widthwise direction substantially perpendicular to a recording material feeding direction is L and a number of the test images with respect to the widthwise direction is N.

4. An image forming apparatus according to claim 1, further comprising a double-side feeding mechanism configured to reverse and feed, to the transfer portion, the recording material after transferring the toner image on the first side of the recording material and then fixing the toner image on the first side of the recording material by the fixing device during the operation in the double-side mode, wherein during execution of the second operation, the controller carries out control so that the test images formed on the first side of the first recording material are fixed by the fixing device and then the first recording material is fed to the transfer portion by the double-side feeding mechanism and then so that the first recording material is discharged from the image forming apparatus after passing the first recording material through the transfer portion and the fixing portion without transferring the test images onto the second side of the first recording material by feeding.

5. An image forming apparatus according to claim 1, further comprising a double-side feeding mechanism configured to reverse and feed, to the transfer portion, the recording material during the operation in the double-side mode after transferring the toner image on the first side of the recording material and then fixing the toner image on the first side of the recording material by the fixing device, wherein during execution of the second operation, the controller carries out control so that the first test images formed on the first side of the first recording material are fixed by the fixing device and then the first recording material is discharged from the image forming apparatus without feeding the first recording material to the transfer portion by the double-side feeding mechanism.

6. An image forming apparatus according to claim 1, wherein during execution of the first operation, the controller carries out control so that a region of the recording material used to transfer first test images onto the first side of the recording material and a region of the recording material used to transfer second test images onto the second side of the recording material do not overlap with each other on a front side and a back side of the recording material.

7. An image forming apparatus according to claim 1, wherein during execution of the first operation, the controller carries out control so that entirety of the first test images transferred onto the first side of the recording material and entirety of the second test images transferred onto the second side of the recording material do not overlap with each other on a front side and a back side of the recording material.

8. An image forming apparatus according to claim 1, wherein with respect to a widthwise direction substantially perpendicular to a recording material feeding direction, a number of test images in the chart outputted in the second operation is less than a number of test images in the chart outputted in the first operation.

9. An image forming apparatus according to claim 8, wherein the chart outputted in the first operation includes solid test images and half-tone test images which are arranged in the widthwise direction, and the chart outputted in the second operation includes the solid test images but does not include the half-tone test images.

10. An image forming apparatus according to claim 8, wherein the half-tone test images are disposed adjacent to an end portion of the recording material with respect to the widthwise direction.

11. An image forming apparatus comprising:

an image bearing member configured to bear a toner image;

a transfer device configured to transfer the toner image from the image bearing member onto a recording material in a transfer portion;

a voltage applying portion configured to apply a transfer voltage to the transfer device;

a fixing device configured to fix the toner image, transferred on the recording material, on the recording material in a fixing portion; and a controller capable of executing an operation in a double-side mode in which toner images are formed on both sides of the recording material and capable of executing an operation in an output mode in which a chart formed by transferring, onto the recording material, a plurality of test images including first test images and second test images, which are for adjusting the transfer voltage applied during the operation in the double-side mode and which are formed under application of different transfer voltages, is outputted, wherein during execution of the operation in the output mode, the controller controls an image forming operation so that the first test images formed on a first side of a first recording material are fixed by the fixing device and then the first recording material is outputted without forming the test images on a second side of the first recording material and then so that a second recording material is passed through the fixing device without forming the test images on a first side of the second recording material and then the second test images are transferred onto a second side of the second recording material.

* * * * *